US011298657B2

(12) United States Patent
Durham et al.

(10) Patent No.: US 11,298,657 B2
(45) Date of Patent: *Apr. 12, 2022

(54) HOT-SIDE METHOD AND SYSTEM

(71) Applicant: ADA-ES, Inc., Highlands Ranch, CO (US)

(72) Inventors: Michael D. Durham, Castle Rock, CO (US); Sharon Sjostrom, Sedalia, CO (US); Kenneth E. Baldrey, Denver, CO (US)

(73) Assignee: ADA-ES, Inc., Highlands Ranch, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/910,901

(22) Filed: Jun. 24, 2020

(65) Prior Publication Data

US 2021/0001271 A1 Jan. 7, 2021

Related U.S. Application Data

(63) Continuation of application No. 16/186,187, filed on Nov. 9, 2018, now Pat. No. 10,730,015, which is a continuation of application No. 15/488,244, filed on Apr. 14, 2017, now Pat. No. 10,124,293, which is a continuation of application No. 14/604,153, filed on Jan. 23, 2015, now Pat. No. 9,657,942, which is a continuation of application No. 13/920,658, filed on Jun. 18, 2013, now Pat. No. 8,951,487, which is a continuation-in-part of application No. 13/281,066, filed on Oct. 25, 2011, now Pat. No. 8,524,179.

(60) Provisional application No. 61/422,026, filed on Dec. 10, 2010, provisional application No. 61/406,492, filed on Oct. 25, 2010.

(51) Int. Cl.
| F23J 7/00 | (2006.01) |
| F23J 15/02 | (2006.01) |
| F23J 15/04 | (2006.01) |
| B01D 53/64 | (2006.01) |
| B01D 53/96 | (2006.01) |

(52) U.S. Cl.
CPC ............ *B01D 53/96* (2013.01); *B01D 53/64* (2013.01); *F23J 7/00* (2013.01); *F23J 15/02* (2013.01); *F23J 15/04* (2013.01); *B01D 2251/108* (2013.01); *B01D 2253/1124* (2013.01); *B01D 2257/602* (2013.01)

(58) Field of Classification Search
CPC .......... B01D 53/68; B01D 53/64; B01D 2251/108; B01D 2257/602; B01D 2258/0283; B01D 2252/00; B01D 2259/40083

See application file for complete search history.

(56) References Cited

U.S. PATENT DOCUMENTS

| 208,011 A | 9/1878 | Eaton |
| 224,649 A | 2/1880 | Child |
| 346,765 A | 8/1886 | McIntyre |
| 367,014 A | 7/1887 | Wandrey et al. |
| 537,998 A | 4/1895 | Spring et al. |
| 541,025 A | 6/1895 | Gray |
| 685,719 A | 10/1901 | Harris |
| 700,888 A | 5/1902 | Battistini |
| 744,908 A | 11/1903 | Dallas |
| 846,338 A | 3/1907 | McNamara |
| 894,110 A | 7/1908 | Bloss |
| 896,875 A | 8/1908 | Williams |
| 896,876 A | 8/1908 | Williams |
| 911,960 A | 2/1909 | Ellis |
| 1,112,547 A | 10/1914 | Morin |
| 1,183,445 A | 5/1916 | Foxwell |
| 1,984,164 A | 12/1934 | Stock |
| 2,059,388 A | 11/1936 | Nelms |
| 2,077,298 A | 4/1937 | Zelger |
| 2,089,599 A | 8/1937 | Crecelius |
| 2,511,288 A | 6/1950 | Morrell et al. |
| 3,194,629 A | 7/1965 | Dreibelbis et al. |
| 3,599,610 A | 8/1971 | Spector |
| 3,662,523 A | 5/1972 | Revoir et al. |
| 3,725,530 A | 4/1973 | Kawase et al. |
| 3,754,074 A | 8/1973 | Grantham |
| 3,764,496 A | 10/1973 | Hultman et al. |
| 3,786,619 A | 1/1974 | Melkersson et al. |
| 3,803,803 A | 4/1974 | Raduly et al. |
| 3,826,618 A | 7/1974 | Capuano |
| 3,838,190 A | 9/1974 | Birke et al. |
| 3,849,267 A | 11/1974 | Hilgen et al. |
| 3,849,537 A | 11/1974 | Allgulin |
| 3,851,042 A | 11/1974 | Minnick |
| 3,876,393 A | 4/1975 | Kasai et al. |
| 3,956,458 A | 5/1976 | Anderson |
| 3,961,020 A | 6/1976 | Seki |
| 3,974,254 A | 8/1976 | de la Cuadra Herrera et al. |

(Continued)

FOREIGN PATENT DOCUMENTS

| CA | 1067835 | 12/1979 |
| CA | 1099490 | 4/1981 |

(Continued)

OTHER PUBLICATIONS

U.S. Appl. No. 17/068,579, filed Oct. 12, 2020, Sjostrom et al.
U.S. Appl. No. 11/553,849, filed Oct. 27, 2006 now U.S. Pat. No. 8,124,036.
U.S. Appl. No. 13/198,381, filed Aug. 4, 2011 now U.S. Pat. No. 8,293,196.
U.S. Appl. No. 13/021,427, filed Feb. 4, 2011 now U.S. Pat. No. 8,372,362.
U.S. Appl. No. 13/281,040, filed Oct. 25, 2011 now U.S. Pat. No. 8,496,894.

(Continued)

*Primary Examiner* — Timothy C Vanoy
(74) *Attorney, Agent, or Firm* — Sheridan Ross P.C.

(57) ABSTRACT

The present disclosure is directed to the use of elemental or speciated iodine and bromine to control total mercury emissions.

16 Claims, 12 Drawing Sheets

(56) References Cited

U.S. PATENT DOCUMENTS

| | | |
|---|---|---|
| 4,075,282 A | 2/1978 | Storp et al. |
| 4,094,777 A | 6/1978 | Sugier et al. |
| 4,101,631 A | 7/1978 | Ambrosini et al. |
| 4,115,518 A | 9/1978 | Delmon et al. |
| 4,140,654 A | 2/1979 | Yoshioka et al. |
| 4,148,613 A | 4/1979 | Myers |
| 4,174,373 A | 11/1979 | Yoshida et al. |
| 4,196,173 A | 4/1980 | Dejong et al. |
| 4,212,853 A | 7/1980 | Fukui |
| 4,233,274 A | 11/1980 | Allgulin |
| 4,262,610 A | 4/1981 | Hein et al. |
| 4,273,747 A | 6/1981 | Rasmussen |
| 4,342,192 A | 8/1982 | Heyn et al. |
| 4,387,653 A | 6/1983 | Voss |
| 4,427,630 A | 1/1984 | Aibe et al. |
| 4,440,100 A | 4/1984 | Michelfelder et al. |
| 4,474,896 A | 10/1984 | Chao |
| 4,500,327 A | 2/1985 | Nishino et al. |
| 4,503,785 A | 3/1985 | Scocca |
| 4,519,995 A | 5/1985 | Schrofelbauer et al. |
| 4,555,392 A | 11/1985 | Steinberg |
| 4,578,256 A | 3/1986 | Nishino et al. |
| 4,626,418 A | 12/1986 | College et al. |
| 4,678,481 A | 7/1987 | Diep |
| 4,693,731 A | 9/1987 | Tarakad et al. |
| 4,708,853 A | 11/1987 | Matviya et al. |
| 4,729,882 A | 3/1988 | Ide et al. |
| 4,751,065 A | 6/1988 | Bowers |
| 4,758,371 A | 7/1988 | Bhatia |
| 4,758,418 A | 7/1988 | Yoo et al. |
| 4,772,455 A | 9/1988 | Izumi et al. |
| 4,779,207 A | 10/1988 | Woracek et al. |
| 4,786,483 A | 11/1988 | Audeh |
| 4,803,059 A | 2/1989 | Sullivan et al. |
| 4,804,521 A | 2/1989 | Rochelle et al. |
| 4,807,542 A | 2/1989 | Dykema |
| 4,814,152 A | 3/1989 | Yan |
| 4,820,318 A | 4/1989 | Chang et al. |
| 4,824,441 A | 4/1989 | Kindig |
| 4,830,829 A | 5/1989 | Craig, Jr. |
| 4,873,930 A | 10/1989 | Egense et al. |
| 4,876,025 A | 10/1989 | Roydhouse |
| 4,886,519 A | 12/1989 | Hayes et al. |
| 4,889,698 A | 12/1989 | Moller et al. |
| 4,892,567 A | 1/1990 | Yan |
| 4,915,818 A | 4/1990 | Yan |
| 4,917,862 A | 4/1990 | Kraw et al. |
| 4,936,047 A | 6/1990 | Feldmann et al. |
| 4,956,162 A | 9/1990 | Smith et al. |
| 4,964,889 A | 10/1990 | Chao |
| 5,013,358 A | 5/1991 | Ball et al. |
| 5,024,171 A | 6/1991 | Krigmont et al. |
| 5,047,219 A | 9/1991 | Epperly et al. |
| 5,049,163 A | 9/1991 | Huang et al. |
| 5,058,514 A | 10/1991 | Mozes et al. |
| 5,116,793 A | 5/1992 | Chao et al. |
| 5,120,516 A | 6/1992 | Ham et al. |
| 5,122,353 A | 6/1992 | Valentine |
| 5,124,135 A | 6/1992 | Girrbach et al. |
| 5,126,300 A | 6/1992 | Pinnavaia et al. |
| 5,202,301 A | 4/1993 | McNamara |
| 5,238,488 A | 8/1993 | Wilhelm |
| 5,238,629 A | 8/1993 | Davidson |
| 5,245,120 A | 9/1993 | Srinivasachar et al. |
| 5,277,135 A | 1/1994 | Dubin |
| 5,288,306 A | 2/1994 | Aibe et al. |
| 5,300,137 A | 4/1994 | Weyand et al. |
| 5,320,817 A | 6/1994 | Hardwick et al. |
| 5,328,673 A | 7/1994 | Kaczur et al. |
| 5,336,835 A | 8/1994 | McNamara |
| 5,346,674 A | 9/1994 | Weinwurm et al. |
| 5,350,728 A | 9/1994 | Cameron et al. |
| 5,352,647 A | 10/1994 | Suchenwirth |
| 5,354,363 A | 10/1994 | Brown, Jr. et al. |
| 5,356,611 A | 10/1994 | Herkelmann et al. |
| 5,368,617 A | 11/1994 | Kindig |
| 5,403,548 A | 4/1995 | Aibe et al. |
| 5,409,522 A | 4/1995 | Durham et al. |
| 5,419,834 A | 5/1995 | Straten |
| 5,435,843 A | 7/1995 | Roy et al. |
| 5,435,980 A | 7/1995 | Felsvang et al. |
| 5,447,703 A | 9/1995 | Baer et al. |
| 5,460,643 A | 10/1995 | Hasenpusch et al. |
| 5,480,619 A | 1/1996 | Johnson et al. |
| 5,499,587 A | 3/1996 | Rodriquez et al. |
| 5,502,021 A | 3/1996 | Schuster |
| 5,505,746 A | 4/1996 | Chriswell et al. |
| 5,505,766 A | 4/1996 | Chang |
| 5,520,898 A | 5/1996 | Pinnavaia et al. |
| 5,536,482 A | 7/1996 | Diep et al. |
| 5,569,436 A | 10/1996 | Lerner |
| 5,571,490 A | 11/1996 | Bronicki et al. |
| 5,575,982 A | 11/1996 | Reiss et al. |
| 5,587,003 A | 12/1996 | Bulow et al. |
| 5,607,496 A | 3/1997 | Brooks |
| 5,607,654 A | 3/1997 | Lerner |
| 5,618,508 A | 4/1997 | Suchenwirth et al. |
| 5,635,150 A | 6/1997 | Coughlin |
| 5,648,508 A | 7/1997 | Yaghi |
| 5,670,122 A | 9/1997 | Zamansky et al. |
| 5,672,323 A | 9/1997 | Bhat et al. |
| 5,674,459 A | 10/1997 | Gohara et al. |
| 5,679,957 A | 10/1997 | Durham et al. |
| 5,695,726 A | 12/1997 | Lerner |
| 5,733,360 A | 3/1998 | Feldman et al. |
| 5,733,516 A | 3/1998 | DeBerry |
| 5,738,834 A | 4/1998 | DeBerry |
| 5,744,109 A | 4/1998 | Sitges Menendez et al. |
| 5,785,932 A | 7/1998 | Heifritch |
| 5,787,823 A | 8/1998 | Knowles |
| 5,809,910 A | 9/1998 | Svendssen |
| 5,809,911 A | 9/1998 | Feizollahi |
| 5,810,910 A | 9/1998 | Ludwig et al. |
| 5,827,352 A | 10/1998 | Altman et al. |
| 5,871,703 A | 2/1999 | Alix et al. |
| 5,875,722 A | 3/1999 | Gosselin et al. |
| 5,891,324 A | 4/1999 | Ohtsuka |
| 5,897,688 A | 4/1999 | Voogt et al. |
| 5,900,042 A | 5/1999 | Mendelsohn et al. |
| 5,910,292 A | 6/1999 | Alvarez, Jr. et al. |
| 5,989,506 A | 11/1999 | Markovs |
| 6,001,152 A | 12/1999 | Sinha |
| 6,013,593 A | 1/2000 | Lee et al. |
| 6,024,931 A | 2/2000 | Hanulik |
| 6,027,551 A | 2/2000 | Hwang et al. |
| 6,080,281 A | 6/2000 | Attia |
| 6,083,403 A | 7/2000 | Tang |
| 6,117,403 A | 9/2000 | Alix et al. |
| 6,132,692 A | 10/2000 | Alix et al. |
| 6,136,072 A | 10/2000 | Sjostrom et al. |
| 6,136,281 A | 10/2000 | Meischen et al. |
| 6,136,749 A | 10/2000 | Gadkaree |
| 6,202,574 B1 | 3/2001 | Liljedahl et al. |
| 6,214,304 B1 | 4/2001 | Rosenthal et al. |
| 6,231,643 B1 | 5/2001 | Pasic et al. |
| 6,248,217 B1 | 6/2001 | Biswas et al. |
| 6,250,235 B1 | 6/2001 | Oehr et al. |
| 6,258,334 B1 | 7/2001 | Gadkaree et al. |
| 6,284,199 B1 | 9/2001 | Downs et al. |
| 6,284,208 B1 | 9/2001 | Thomassen |
| 6,294,139 B1 | 9/2001 | Vicard et al. |
| 6,328,939 B1 | 12/2001 | Amrhein |
| 6,348,178 B1 | 2/2002 | Sudduth et al. |
| 6,368,511 B1 | 4/2002 | Weissenberg et al. |
| 6,372,187 B1 | 4/2002 | Madden et al. |
| 6,375,909 B1 | 4/2002 | Dangtran et al. |
| 6,383,981 B1 | 5/2002 | Blakenship et al. |
| 6,447,740 B1 | 9/2002 | Caldwell et al. |
| 6,475,451 B1 | 11/2002 | Leppin et al. |
| 6,521,021 B1 | 2/2003 | Pennline et al. |
| 6,524,371 B2 | 2/2003 | El-Shoubary et al. |
| 6,528,030 B2 | 3/2003 | Madden et al. |
| 6,533,842 B1 | 3/2003 | Maes et al. |
| 6,558,454 B1 | 5/2003 | Chang et al. |

(56) References Cited

U.S. PATENT DOCUMENTS

| | | | |
|---|---|---|---|
| 6,576,585 B2 | 6/2003 | Fischer et al. | |
| 6,582,497 B1 | 6/2003 | Maes et al. | |
| 6,589,318 B2 | 7/2003 | El-Shoubary et al. | |
| 6,610,263 B2 | 8/2003 | Pahlman et al. | |
| 6,613,110 B2 | 9/2003 | Sanyal | |
| 6,638,347 B2 | 10/2003 | El-Shoubary et al. | |
| 6,638,485 B1 | 10/2003 | Iida et al. | |
| 6,649,082 B2 | 11/2003 | Hayasaka et al. | |
| 6,682,709 B2 | 1/2004 | Sudduth et al. | |
| 6,694,900 B2 | 2/2004 | Lissianski et al. | |
| 6,702,569 B2 | 3/2004 | Kobayashi et al. | |
| 6,719,828 B1 | 4/2004 | Lovell et al. | |
| 6,726,888 B2 | 4/2004 | Lanier et al. | |
| 6,729,248 B2 | 5/2004 | Johnson et al. | |
| 6,732,055 B2 | 5/2004 | Bagepalli et al. | |
| 6,737,031 B2 | 5/2004 | Beal et al. | |
| 6,773,471 B2 | 8/2004 | Johnson et al. | |
| 6,787,742 B2 | 9/2004 | Kansa et al. | |
| 6,790,420 B2 | 9/2004 | Breen et al. | |
| 6,808,692 B2 | 10/2004 | Oehr | |
| 6,818,043 B1 | 11/2004 | Chang et al. | |
| 6,827,837 B2 | 12/2004 | Minter | |
| 6,841,513 B2 | 1/2005 | El-Shoubary et al. | |
| 6,848,374 B2 | 2/2005 | Srinivasachar et al. | |
| 6,855,859 B2 | 2/2005 | Nolan et al. | |
| 6,860,911 B2 | 3/2005 | Hundley | |
| 6,878,358 B2 | 4/2005 | Vosteen et al. | |
| 6,883,444 B2 | 4/2005 | Logan et al. | |
| 6,916,762 B2 | 7/2005 | Shibuya et al. | |
| 6,942,840 B1 | 9/2005 | Broderick | |
| 6,945,925 B2 | 9/2005 | Pooler et al. | |
| 6,953,494 B2 | 10/2005 | Nelson, Jr. | |
| 6,960,329 B2 | 11/2005 | Sellakumar | |
| 6,962,617 B2 | 11/2005 | Simpson | |
| 6,969,494 B2 | 11/2005 | Herbst | |
| 6,972,120 B2 | 12/2005 | Holste et al. | |
| 6,974,564 B2 | 12/2005 | Biermann | |
| 6,975,975 B2 | 12/2005 | Fasca | |
| 7,008,603 B2 | 3/2006 | Brooks et al. | |
| 7,013,817 B2 | 3/2006 | Stowe, Jr. et al. | |
| 7,017,330 B2 | 3/2006 | Bellows | |
| 7,111,591 B2 | 9/2006 | Schwab et al. | |
| 7,118,720 B1 | 10/2006 | Mendelsohn et al. | |
| 7,141,091 B2 | 11/2006 | Chang | |
| 7,153,481 B2 | 12/2006 | Bengtsson et al. | |
| 7,156,959 B2 | 1/2007 | Herbst | |
| 7,198,769 B2 | 4/2007 | Cichanowicz | |
| 7,211,707 B2 | 5/2007 | Axtell et al. | |
| 7,217,401 B2 | 5/2007 | Ramme et al. | |
| 7,250,387 B2 | 7/2007 | Durante et al. | |
| 7,270,063 B2 | 9/2007 | Aradi et al. | |
| 7,332,002 B2 | 2/2008 | Johnson et al. | |
| 7,361,209 B1 | 4/2008 | Durham et al. | |
| 7,381,380 B2 | 6/2008 | Herbst | |
| 7,381,387 B2 | 6/2008 | Lissianski et al. | |
| 7,381,388 B2 | 6/2008 | Cooper et al. | |
| 7,384,615 B2 | 6/2008 | Boardman et al. | |
| 7,413,719 B2 | 8/2008 | Digdon | |
| 7,416,137 B2 | 8/2008 | Hagen et al. | |
| 7,430,969 B2 | 10/2008 | Stowe, Jr. et al. | |
| 7,435,286 B2 | 10/2008 | Olson et al. | |
| 7,442,239 B2 | 10/2008 | Armstrong et al. | |
| 7,452,392 B2 | 11/2008 | Nick et al. | |
| 7,468,170 B2 | 12/2008 | Comrie | |
| 7,473,303 B1 | 1/2009 | Higgins et al. | |
| 7,479,215 B2 | 1/2009 | Carson et al. | |
| 7,479,263 B2 | 1/2009 | Chang et al. | |
| 7,494,632 B1 | 2/2009 | Klunder | |
| 7,497,076 B2 | 3/2009 | Funk et al. | |
| 7,507,083 B2 | 3/2009 | Comrie | |
| 7,514,052 B2 | 4/2009 | Lissianski et al. | |
| 7,514,053 B2 | 4/2009 | Johnson et al. | |
| 7,517,511 B2 | 4/2009 | Schofield | |
| 7,521,032 B2 | 4/2009 | Honjo et al. | |
| 7,524,473 B2 | 4/2009 | Lindau et al. | |
| 7,544,338 B2 | 6/2009 | Honjo et al. | |
| 7,544,339 B2 | 6/2009 | Lissianski et al. | |
| 7,563,311 B2 | 7/2009 | Graham | |
| 7,611,564 B2 | 11/2009 | McChesney et al. | |
| 7,615,101 B2 | 11/2009 | Holmes et al. | |
| 7,622,092 B2 | 11/2009 | Honjo et al. | |
| 7,651,541 B2 | 1/2010 | Hundley et al. | |
| 7,674,442 B2 | 3/2010 | Comrie | |
| 7,712,306 B2 | 5/2010 | White et al. | |
| 7,713,503 B2 | 5/2010 | Maly et al. | |
| 7,722,843 B1 | 5/2010 | Srinivasachar | |
| 7,727,307 B2 | 6/2010 | Winkler | |
| 7,758,827 B2 | 7/2010 | Comrie | |
| 7,767,174 B2 | 8/2010 | Liu et al. | |
| 7,776,301 B2 | 8/2010 | Comrie | |
| 7,780,765 B2 | 8/2010 | Srinivasachar et al. | |
| 7,862,630 B2 | 1/2011 | Hundley et al. | |
| 7,906,090 B2 | 3/2011 | Ukai et al. | |
| 7,938,571 B1 | 5/2011 | Irvine | |
| 7,955,577 B2 | 6/2011 | Comrie | |
| 7,988,939 B2 | 8/2011 | Comrie | |
| 8,007,749 B2 | 8/2011 | Chang et al. | |
| 8,017,550 B2 | 9/2011 | Chao et al. | |
| 8,069,797 B2 | 12/2011 | Srinivasachar et al. | |
| 8,071,060 B2 | 12/2011 | Ukai et al. | |
| 8,101,144 B2 | 1/2012 | Sasson et al. | |
| 8,124,036 B1 | 2/2012 | Baldrey et al. | |
| 8,226,913 B2 | 7/2012 | Comrie | |
| 8,293,196 B1 | 10/2012 | Baldrey et al. | |
| 8,303,919 B2 | 11/2012 | Gadgil et al. | |
| 8,312,822 B2 | 11/2012 | Holmes et al. | |
| 8,313,323 B2 | 11/2012 | Comrie | |
| 8,372,362 B2 | 2/2013 | Durham et al. | |
| 8,420,034 B2 | 4/2013 | Nochi et al. | |
| 8,481,455 B1 | 7/2013 | Jain et al. | |
| 8,496,894 B2 | 7/2013 | Durham et al. | |
| 8,524,179 B2 | 9/2013 | Durham et al. | |
| 8,574,324 B2 | 11/2013 | Comrie | |
| 8,652,235 B2 | 2/2014 | Olson et al. | |
| 8,663,594 B2 | 3/2014 | Kawamura et al. | |
| 8,807,056 B2 | 8/2014 | Holmes et al. | |
| 8,845,986 B2 | 9/2014 | Senior et al. | |
| 8,865,099 B1 | 10/2014 | Gray et al. | |
| 8,883,099 B2 | 11/2014 | Sjostrom et al. | |
| 8,919,266 B2 | 12/2014 | Johnson et al. | |
| 8,951,487 B2 | 2/2015 | Durham et al. | |
| 8,980,207 B1 | 3/2015 | Gray et al. | |
| 9,221,013 B2 | 12/2015 | Sjostrom et al. | |
| 9,238,782 B2 | 1/2016 | Senior et al. | |
| 9,308,493 B2 | 4/2016 | Filippelli et al. | |
| 9,352,275 B2 | 5/2016 | Durham et al. | |
| 9,409,123 B2 | 8/2016 | Sjostrom et al. | |
| 9,416,967 B2 | 8/2016 | Comrie | |
| 9,555,369 B2 | 1/2017 | Moore et al. | |
| 9,657,942 B2 * | 5/2017 | Durham | B01D 53/64 |
| 9,822,973 B2 | 11/2017 | Comrie | |
| 9,827,551 B2 | 11/2017 | Hardwick et al. | |
| 9,850,442 B2 | 12/2017 | Senior et al. | |
| 9,884,286 B2 | 2/2018 | Sjostrom | |
| 9,889,405 B2 | 2/2018 | Sjostrom et al. | |
| 9,889,451 B2 | 2/2018 | Filippelli et al. | |
| 9,957,454 B2 | 5/2018 | Morris et al. | |
| 10,124,293 B2 | 11/2018 | Durham et al. | |
| 10,159,931 B2 | 12/2018 | Sjostrom et al. | |
| 10,427,096 B2 | 10/2019 | Sjostrom et al. | |
| 10,465,137 B2 | 11/2019 | Senior et al. | |
| 10,589,292 B2 | 3/2020 | Filippelo et al. | |
| 10,730,015 B2 * | 8/2020 | Durham | B01D 53/64 |
| 10,731,095 B2 | 8/2020 | Senior et al. | |
| 10,758,863 B2 | 9/2020 | Sjostrom et al. | |
| 10,767,130 B2 | 9/2020 | Morris et al. | |
| 2002/0114749 A1 | 8/2002 | Cole | |
| 2002/0134242 A1 | 9/2002 | Yang et al. | |
| 2002/0150516 A1 | 10/2002 | Pahlman | |
| 2003/0065236 A1 | 4/2003 | Vosteen et al. | |
| 2003/0099585 A1 | 5/2003 | Allgulin | |
| 2003/0104937 A1 | 6/2003 | Sinha | |
| 2003/0164309 A1 | 9/2003 | Nakamura et al. | |
| 2003/0192234 A1 | 10/2003 | Logan et al. | |

(56) References Cited

U.S. PATENT DOCUMENTS

| | | |
|---|---|---|
| 2003/0196578 A1 | 10/2003 | Logan et al. |
| 2003/0206843 A1 | 11/2003 | Nelson, Jr. |
| 2003/0206846 A1 | 11/2003 | Jangbarwala |
| 2003/0226312 A1 | 12/2003 | Roos et al. |
| 2004/0013589 A1 | 1/2004 | Vosteen et al. |
| 2004/0040438 A1 | 3/2004 | Baldrey et al. |
| 2004/0063210 A1 | 4/2004 | Steichen et al. |
| 2004/0076570 A1 | 4/2004 | Jia |
| 2004/0109800 A1 | 6/2004 | Pahlman |
| 2004/0129607 A1 | 7/2004 | Slater et al. |
| 2005/0019240 A1 | 1/2005 | Lu et al. |
| 2005/0026008 A1 | 2/2005 | Heaton et al. |
| 2005/0074380 A1 | 4/2005 | Hammel et al. |
| 2005/0106516 A1 | 5/2005 | Payne et al. |
| 2005/0169824 A1 | 8/2005 | Downs et al. |
| 2005/0227146 A1 | 10/2005 | Ghantous et al. |
| 2005/0260112 A1 | 11/2005 | Hensman |
| 2006/0027488 A1 | 2/2006 | Gauthier |
| 2006/0029531 A1 | 2/2006 | Breen et al. |
| 2006/0051270 A1 | 3/2006 | Brunette |
| 2006/0090678 A1 | 5/2006 | Kriech |
| 2006/0112823 A1 | 6/2006 | Avin |
| 2006/0124444 A1 | 6/2006 | Nakamura et al. |
| 2006/0185226 A1 | 8/2006 | McDonald et al. |
| 2006/0191835 A1 | 8/2006 | Petri et al. |
| 2006/0205592 A1 | 9/2006 | Chao et al. |
| 2007/0140940 A1 | 6/2007 | Varma et al. |
| 2007/0156288 A1 | 7/2007 | Wroblewski et al. |
| 2007/0167309 A1 | 7/2007 | Olson |
| 2007/0168213 A1 | 7/2007 | Comrie |
| 2007/0179056 A1 | 8/2007 | Baek et al. |
| 2007/0180990 A1 | 8/2007 | Downs et al. |
| 2007/0184394 A1 | 8/2007 | Comrie |
| 2007/0234902 A1 | 10/2007 | Fair et al. |
| 2007/0281253 A1 | 12/2007 | Toqan |
| 2007/0295347 A1 | 12/2007 | Paine et al. |
| 2008/0017337 A1 | 1/2008 | Duggirala |
| 2008/0090951 A1 | 4/2008 | Mao et al. |
| 2008/0107579 A1* | 5/2008 | Downs .................. B01D 53/10 423/210 |
| 2008/0115704 A1 | 5/2008 | Berry et al. |
| 2008/0134888 A1 | 6/2008 | Chao et al. |
| 2008/0182747 A1 | 7/2008 | Sinha |
| 2008/0207443 A1 | 8/2008 | Gadkaree et al. |
| 2008/0220387 A1 | 9/2008 | Payne et al. |
| 2008/0292512 A1 | 11/2008 | Kang |
| 2009/0007785 A1 | 1/2009 | Kimura et al. |
| 2009/0031708 A1 | 2/2009 | Schmidt |
| 2009/0031929 A1 | 2/2009 | Boardman et al. |
| 2009/0062119 A1 | 3/2009 | Olson et al. |
| 2009/0081092 A1 | 3/2009 | Yang et al. |
| 2009/0104097 A1 | 4/2009 | Dunson, Jr. |
| 2009/0136401 A1 | 5/2009 | Yang et al. |
| 2009/0148372 A1 | 6/2009 | Keiser |
| 2009/0235848 A1 | 9/2009 | Eiteneer et al. |
| 2009/0287013 A1 | 11/2009 | Morrison |
| 2009/0320678 A1 | 12/2009 | Chang et al. |
| 2010/0025302 A1 | 2/2010 | Sato et al. |
| 2010/0047146 A1 | 2/2010 | Olson et al. |
| 2010/0189617 A1 | 7/2010 | Hundley et al. |
| 2010/0189618 A1 | 7/2010 | White et al. |
| 2011/0030592 A1 | 2/2011 | Baldrey et al. |
| 2011/0076210 A1 | 3/2011 | Pollack et al. |
| 2011/0168018 A1 | 7/2011 | Mohamadalizadeh et al. |
| 2011/0250111 A1 | 10/2011 | Pollack et al. |
| 2011/0262873 A1 | 10/2011 | Nalepa et al. |
| 2011/0281222 A1 | 11/2011 | Comrie |
| 2012/0124893 A1 | 5/2012 | McRobbie et al. |
| 2012/0216729 A1 | 8/2012 | Baldrey et al. |
| 2012/0272877 A1 | 11/2012 | Comrie |
| 2012/0311924 A1 | 12/2012 | Richardson et al. |
| 2013/0074745 A1 | 3/2013 | Comrie |
| 2013/0078169 A1 | 3/2013 | LaFlesh et al. |
| 2013/0139738 A1 | 6/2013 | Grubbstrom et al. |
| 2013/0149206 A1 | 6/2013 | Ukai et al. |
| 2013/0312646 A1 | 11/2013 | Comrie |
| 2014/0030178 A1 | 1/2014 | Martin |
| 2014/0140908 A1 | 5/2014 | Naiepa et al. |
| 2014/0141380 A1 | 5/2014 | Comrie |
| 2014/0202069 A1 | 7/2014 | Aradi et al. |
| 2014/0213429 A1 | 7/2014 | Nochi et al. |
| 2014/0245936 A1 | 9/2014 | Pollack et al. |
| 2014/0271418 A1 | 9/2014 | Keiser et al. |
| 2014/0299028 A1 | 10/2014 | Kotch et al. |
| 2014/0308191 A1 | 10/2014 | Mazyek et al. |
| 2014/0341793 A1 | 11/2014 | Holmes et al. |
| 2015/0086457 A1 | 3/2015 | Kagawa et al. |
| 2015/0096480 A1 | 4/2015 | Comrie |
| 2016/0025337 A1 | 1/2016 | Comrie |
| 2016/0166982 A1 | 6/2016 | Holmes et al. |
| 2016/0339385 A1 | 11/2016 | Mimna et al. |
| 2017/0050147 A1 | 2/2017 | Denny et al. |
| 2017/0292700 A1 | 10/2017 | Comrie |
| 2018/0224121 A1 | 8/2018 | Comrie |
| 2019/0321778 A1 | 10/2019 | Sjostrom et al. |
| 2020/0230550 A1 | 7/2020 | Sjostrom et al. |

FOREIGN PATENT DOCUMENTS

| | | |
|---|---|---|
| CA | 2026056 | 3/1992 |
| CA | 2150529 | 12/1995 |
| CA | 2400898 | 8/2001 |
| CA | 2418578 | 8/2003 |
| CA | 2435474 | 1/2004 |
| CA | 2584327 | 4/2006 |
| CA | 2641311 | 8/2007 |
| CA | 2737281 | 4/2010 |
| CN | 1048173 | 1/1991 |
| CN | 1177628 | 4/1998 |
| CN | 1354230 | 6/2002 |
| CN | 1382657 | 12/2002 |
| CN | 1421515 | 6/2003 |
| CN | 1488423 | 4/2004 |
| CN | 101048218 | 10/2007 |
| CN | 101053820 | 10/2007 |
| CN | 101175550 | 5/2008 |
| CN | 101347722 | 1/2009 |
| CN | 101489647 | 7/2009 |
| CN | 101816922 | 9/2010 |
| CN | 101932376 | 12/2010 |
| CN | 105188910 | 12/2015 |
| CN | 105381680 | 3/2016 |
| DE | 2548845 | 5/1976 |
| DE | 2630202 | 2/1977 |
| DE | 3426059 | 1/1986 |
| DE | 3615759 | 11/1987 |
| DE | 3628963 | 3/1988 |
| DE | 3711503 | 10/1988 |
| DE | 3918292 | 4/1990 |
| DE | 4218672 | 8/1993 |
| DE | 4308388 | 10/1993 |
| DE | 4339777 | 5/1995 |
| DE | 4422661 | 1/1996 |
| DE | 19520127 | 12/1996 |
| DE | 19745191 | 4/1999 |
| DE | 19850054 | 5/2000 |
| DE | 10233173 | 7/2002 |
| EP | 0208036 | 1/1987 |
| EP | 0208490 | 1/1987 |
| EP | 0220075 | 4/1987 |
| EP | 0254697 | 1/1988 |
| EP | 0274132 | 7/1988 |
| EP | 0433677 | 6/1991 |
| EP | 0435848 | 7/1991 |
| EP | 0628341 | 12/1994 |
| EP | 0666098 | 8/1995 |
| EP | 0709128 | 5/1996 |
| EP | 0794240 | 9/1997 |
| EP | 0908217 | 4/1999 |
| EP | 1040865 | 10/2000 |
| EP | 1213046 | 10/2001 |
| EP | 1199354 | 4/2002 |
| EP | 1271053 | 1/2003 |
| EP | 1386655 | 2/2004 |

(56) References Cited

FOREIGN PATENT DOCUMENTS

| | | |
|---|---|---|
| EP | 1570894 | 9/2005 |
| EP | 1903092 | 3/2008 |
| EP | 2452740 | 5/2012 |
| ES | 2443580 | 2/2014 |
| FR | 1394547 | 4/1965 |
| GB | 1121845 | 7/1968 |
| GB | 2122916 | 1/1984 |
| GB | 2441885 | 3/2008 |
| JP | 49-53590 | 5/1974 |
| JP | 49-53591 | 5/1974 |
| JP | 49-53592 | 5/1974 |
| JP | 49-53593 | 5/1974 |
| JP | 49-53594 | 5/1974 |
| JP | 59-10343 | 1/1984 |
| JP | 59-76537 | 5/1984 |
| JP | 59-160534 | 9/1984 |
| JP | 63-100918 | 5/1988 |
| JP | H02-303519 | 12/1990 |
| JP | H10-5537 | 1/1998 |
| JP | 10-109016 | 4/1998 |
| JP | 2000-197811 | 7/2000 |
| JP | 2000-205525 | 7/2000 |
| JP | 2000-325747 | 11/2000 |
| JP | 2001-347131 | 12/2001 |
| JP | 2003-065522 | 3/2003 |
| JP | 2004-066229 | 3/2004 |
| JP | 2005-230810 | 9/2005 |
| JP | 5064389 | 10/2012 |
| KR | 2004-0010276 | 1/2004 |
| KR | 100440845 | 7/2004 |
| RU | 2007-138432 | 4/2009 |
| RU | 2515988 | 5/2014 |
| RU | 2535684 | 12/2014 |
| WO | WO 96/14137 | 5/1996 |
| WO | WO 96/30318 | 10/1996 |
| WO | WO 97/44500 | 11/1997 |
| WO | WO 98/15357 | 4/1998 |
| WO | WO 99/58228 | 11/1999 |
| WO | WO 2001/38787 | 5/2001 |
| WO | WO 01/62368 | 8/2001 |
| WO | WO 02/28513 | 4/2002 |
| WO | WO 03/072241 | 9/2003 |
| WO | WO 2003/093518 | 11/2003 |
| WO | WO 2004/089501 | 10/2004 |
| WO | WO 2004/094024 | 11/2004 |
| WO | WO 2005/092477 | 10/2005 |
| WO | WO 2006/037213 | 4/2006 |
| WO | WO 2006/039007 | 4/2006 |
| WO | WO 2006/091635 | 8/2006 |
| WO | WO 2006/096993 | 9/2006 |
| WO | WO 2006/099611 | 9/2006 |
| WO | WO 2009/018539 | 2/2009 |
| WO | WO 2009/107731 | 9/2009 |
| WO | WO 2010/123609 | 10/2010 |
| ZA | 2003-05568 | 7/2004 |

OTHER PUBLICATIONS

U.S. Appl. No. 13/925,311, filed Jun. 24, 2013 now U.S. Pat. No. 9,352,275.
U.S. Appl. No. 14/339,233, filed Jul. 23, 2014 now U.S. Pat. No. 9,221,013.
U.S. Appl. No. 14/949,524, filed Nov. 23, 2015 now U.S. Pat. No. 9,884,286.
U.S. Appl. No. 15/850,780, filed Dec. 21, 2017.
U.S. Appl. No. 16/603,239, filed Jul. 3, 2019.
U.S. Appl. No. 13/471,015, filed May 14, 2012 now U.S. Pat. No. 8,845,986.
U.S. Appl. No. 14/484,001, filed Sep. 11, 2014 now U.S. Pat. No. 9,238,782.
U.S. Appl. No. 14/958,327, filed Dec. 3, 2015 now U.S. Pat. No. 9,850,442.
U.S. Appl. No. 15/812,993, filed Nov. 14, 2017 now U.S. Pat. No. 10,465,137.
U.S. Appl. No. 16/590,178, filed Oct. 1, 2019 now U.S. Pat. No. 10,731,095.
U.S. Appl. No. 16/909,638, filed Jun. 23, 2020.
U.S. Appl. No. 13/281,066, filed Oct. 25, 2011 now U.S. Pat. No. 8,524,179.
U.S. Appl. No. 13/920,658, filed Jun. 18, 2013 now U.S. Pat. No. 8,951,487.
U.S. Appl. No. 14/604,153, filed Jan. 23, 2015 now U.S. Pat. No. 9,657,942.
U.S. Appl. No. 15/488,244, filed Apr. 14, 2017 now U.S. Pat. No. 10,124,293.
U.S. Appl. No. 16/186,187, filed Nov. 9, 2018 now U.S. Pat. No. 10,730,015.
U.S. Appl. No. 13/861,162, filed Apr. 11, 2013 now U.S. Pat. No. 8,883,099.
U.S. Appl. No. 14/512,142, filed Oct. 10, 2014 now U.S. Pat. No. 9,409,123.
U.S. Appl. No. 15/217,749, filed Jul. 22, 2016 now U.S. Pat. No. 9,889,405.
U.S. Appl. No. 15/694,536, filed Sep. 1, 2017 now U.S. Pat. No. 10,159,931.
U.S. Appl. No. 16/188,758, filed Nov. 13, 2018.
U.S. Appl. No. 16/834,685, filed Mar. 30, 2020.
U.S. Appl. No. 13/964,441, filed Aug. 12, 2013 now U.S. Pat. No. 9,957,454.
U.S. Appl. No. 15/941,522, filed Mar. 30, 2018.
U.S. Appl. No. 16/917,270, filed Jun. 30, 2020.
U.S. Appl. No. 14/460,817, filed Aug. 15, 2014 now U.S. Pat. No. 9,308,493.
U.S. Appl. No. 15/096,056, filed Apr. 11, 2016 now U.S. Pat. No. 9,889,451.
U.S. Appl. No. 15/842,636, filed Dec. 14, 2017 now U.S. Pat. No. 10,589,292.
U.S. Appl. No. 16/909,638, filed Jun. 23, 2020, Senior.
U.S. Appl. No. 16/917,270, filed Jun. 30, 2020, Morris.
"Continuous Emissions Monitors (CEMs): Field Studies of Dioxin/Furan CEMs," printed on Apr. 22, 2012, available at www.ejnet.org/toxics/cems/dioxin.html, 5 pages.
"DOE Announces Further Field Testing of Advanced Mercury Control Technologies, Six Projects Selected in Round 2 to Address Future Power Plant Mercury Reduction Initiatives," TECHNews From the National Energy Technology Laboratory, Nov. 5, 2004, available at http://www.netl.doe.gov/publications/TechNews/tn_mercury-control.html, printed on Jun. 3, 2009, pp. 1-2.
"Enhanced Mercury Control: KNX™ Coal Additive Technology," Alstom Power Inc., printed Aug. 3, 2006, 1 page.
"Evaluation of Sorbent Injection for Mercury Control at Great River Energy Coal Creek Station," ADA Environmental Solutions, Nov. 16-20, 2003 Final Report, Electric Power Research Institute, issued Mar. 3, 2004, 32 pages.
"Exclusive license agreement for an innovative mercury oxidation technology," Alstom Power Inc., printed Nov. 2, 2006, 1 page.
"Full-Scale Testing of Enhanced Mercury Control Technologies for Wet FGD Systems: Final Report for the Period Oct. 1, 2000 to Jun. 30, 2002," submitted by McDermott Technology, Inc., May 7, 2003, 151 pages.
"Gas Phase Filtration," Vaihtoilma White Air Oy, date unknown, 3 pages.
"Impregnated Activated Carbon," Products and Technologies Website, as early as 1999, available at http://www.calgoncarbon.com/product/impregnated.html, printed on Dec. 18, 1999, p. 1.
"Integrating Flue Gas Conditioning with More Effective Mercury Control," Power Engineering, Jun. 17, 2014, retrieved from www.power-eng.com/articles/print/volume-118/issue-6/features/integrating-flue-gas-conditioning-with-more-effective-mercury-control, 9 pages.
"Kaolinite Sorbent for the Removal of Heavy Metals from Incinerated Lubricating Oils," EPA Grant No. R828598C027, 1996, retrieved from https://cfpub.epa.gov/ncer_abstracts/index.cfm/fuseaction/display.highlight/abstract/1166, 7 pages.
"Mercury Emission Control Utilizing the Chem-Mod Process," Chem-Mod, EUEC 2011, 34 pages (submitted in 2 parts).

(56) References Cited

OTHER PUBLICATIONS

"Mercury Study Report to Congress—vol. VIII: An Evaluation of Mercury Control Technologies and Costs," U.S. EPA, Office of Air Quality Planning & Standards and Office of Research and Development, Dec. 1997, 207 pages.

"Mercury," Pollution Prevention and Abatement Handbook 1998, World Bank Group, effective Jul. 1998, pp. 219-222.

"Nusorb® Mersorb® Family of Adsorbents for Mercury Control," Nucon International Inc., date unknown, 3 pages.

"Protecting Human Health. Mercury Poisoning," US EPA Website, as early as Oct. 8, 1999, available at http://www.epa.gov/region02/health/mercury/, printed on Feb. 5, 2002, pp. 1-4.

"Sample Collection Media: Sorbent Sample Tubes," SKC 1997 Comprehensive Catalog & Air Sampling Guide: The Essential Reference for Air Sampling, pp. 23-24.

"Sodium Hypochlorite," Wikipedia, The Free Encyclopedia, http://en.wikipedia.org/wiki/Sodium_hypochlorite (page last modified on Jul. 7, 2011 at 18:12), 7 pages.

"Texas Genco, EPRI, and URS Corporation Test Innovative Mercury Control Method at Limestone Station—Technology Aims to Capture More Mercury from Power Plant Exhaust," News Release, Jan. 11, 2005, available at http://amptest.epri.com/corporate/discover_epri/news/2005/011105_mercury.html, printed on Apr. 24, 2009, pp. 1-2.

"The Fire Below: Spontaneous combustion in Coal," U.S. Department of Energy, Environmental Safety & Health Bulletin, DOE/EH-0320, May 1993, Issue No. 93-4, 9 pages.

"Incineration," Focus on your success, Bayer Industry Services, retrieved from www.entsorgung.bayer.com/index.cfmPAGE-ID-301, Jun. 2, 2005, 2 pages.

Anders et al., "Selenium in Coal-Fired Steam Plant Emissions," Environmental Science & Technology, 1975, vol. 9, No. 9, pp. 856-858.

Ariya et al., "Reactions of Gaseous Mercury with Atomic and Molecular Halogens: Kinetics, Product Studies, and Atmospheric Implications," J. Phys. Chem. A, 2002, vol. 106(32), pp. 7310-7320.

Bansal et al., Active Carbon, Marcel Dekker, Inc., New York, 1989, pp. 1-3, 24-29, 391-394, 457.

Beer, J. M., "Combustion technology developments in power generation in response to environmental challenges," Progress in Energy and Combustion Science, 2000, vol. 26, pp. 301-327.

Biswas et al., "Control of Toxic Metal Emissions from Combustors Using Sorbents: A Review," J. Air & Waste Manage. Assoc., Feb. 1998, vol. 48, pp. 113-127.

Bloom, "Mercury Speciation in Flue Gases: Overcoming the Analytical Difficulties," presented at EPRI Conference, Managing Hazardous Air Pollutants, State of the Arts, Washington D C., Nov. 1991, pp. 148-160.

Blythe et al., "Investigation of Mercury Control by Wet FGD Systems," Power Plant Air Pollution Mega Symposium, Baltimore, MD, Aug. 20-23, 2012, 16 pages.

Blythe et al., "Optimization of Mercury Control on a New 800-MW PRB-Fired Power Plant," Power Plant Air Pollution Mega Symposium, Baltimore, MD, Aug. 20-23, 2012, 14 pages.

Brigatti et al., "Mercury adsorption by montmorillonite and vermiculite: a combined XRD, TG-MS, and EXAFS study," Applied Clay Science, 2005, vol. 28, pp. 1-8.

Brown et al., "Mercury Measurement and Its Control: What We Know, Have Learned, and Need to Further Investigate," J. Air & Waste Manage. Assoc, Jun. 1999, pp. 1-97.

Buschmann et al., "The KNX™ Coal Additive Technology A Simple Solution for Mercury Emissions Control," Alstom Power Environment, Dec. 2005, pp. 1-7.

Bustard et al., "Full-Scale Evaluation of Sorbent Injection for Mercury Control on Coal-Fired Power Plants," Air Quality III, ADA Environmental Solutions, LLC, Arlington, VA, Sep. 12, 2002, 15 pages.

Butz et al., "Options for Mercury Removal from Coal-Fired Flue Gas Streams: Pilot-Scale Research on Activated Carbon, Alternative and Regenerable Sorbents," 17th Annual Int. Pittsburgh Coal Conf. Proceedings, Pittsburgh, PA, Sep. 11-14, 2000, 25 pages.

Calgon Carbon product and bulletin webpages, printed Jul. 1, 2001, 11 pages.

Cao et al., "Impacts of Halogen Additions on Mercury Oxidation, in A Slipstream Selective Catalyst Reduction (SCR), Reactor When Burning Sub-Bituminous Coal," Environ. Sci. Technol. XXXX, xxx, 000-000, accepted Oct. 22, 2007, pp. A-F.

Carey et al., "Factors Affecting Mercury Control in Utility Flue Gas Using Activated Carbon," J. Air & Waste Manage. Assoc., Dec. 1998, vol. 48, pp. 1166-1174.

De Vito et al., "Sampling and Analysis of Mercury in Combustion Flue Gas," Presented at the Second International Conference on Managing Hazardous Air Pollutants, Washington, DC, Jul. 13-15, 1993, pp. VII39-VII-65.

Dillon et al., "Preparing for New Multi-Pollutant Regulations with Multiple Low Capital Approaches," Paper #2012-A-131-Mega, AWMA, MEGA 2012 conference, retrieved from http://www.cleancoalsolutions.com/library-resources/preparing-for-new-multi-pollutant-regulations-with-muttiple-low-capital-approaches/, 20 pages.

Donnet et al., eds., Carbon Black: Science and Technology, 2nd Edition, Marcel Dekker, New York, 1993, pp. 182-187, 218-219.

Dunham et al., "Investigation of Sorbent Injection for Mercury Control in Coal-Fired Boilers," Energy & Environmental Research Center, University of North Dakota, Sep. 10, 1998, 120 pages.

Durham et al., "Full-Scale Evaluation of Mercury Control by Injecting Activated Carbon Upstream of ESPS," Air Quality IV Conference, ADA Environmental Solutions, Littleton, Colorado, Sep. 2003, 15 pages.

Edwards et al., "A Study of Gas-Phase Mercury Speciation Using Detailed Chemical Kinetics," in Journal of the Air and Waste Management Association, vol. 51, Jun. 2001, pp. 869-877.

Element Analysis of COALQUAL Data; http://energy.er.usgs.gov/temp/1301072102.htm, printed Mar. 25, 2011, 7 pages.

Elliott, "Standard Handbook of PowerPlant Engineering," excerpts from pp. 4.77-4.78, 4.109-4.110, 6.3-6.4, 6.57-6.63, McGraw Hill, Inc., 1989, 15 pages.

Fabian et al., "How Bayer incinerates wastes," Hydrocarbon Processing, Apr. 1979, pp. 183-192.

Felsvang et al., "Activated Carbon Injection in Spray Dryer/ESP/FF for Mercury and Toxics Control," 1993, pp. 1-35.

Felsvang, K. et al., "Air Toxics Control by Spray Dryer," Presented at the 1993 SO2 Control Symposium, Aug. 24-27, 1993, Boston, MA, 16 pages.

Felsvang, K. et al., "Control of Air Toxics by Dry FGDSystems," Power-Gen '92 Conference, 5th International Conference & Exhibition for the Power Generating Industries, Orlando, FL, Nov. 17-19, 1992, pp. 189-208.

Fujiwara et al., "Mercury transformation behavior on a bench-scale coal combustion furnace," Transactions on Ecology and the Environment, 2001, vol. 47, pp. 395-404.

Galbreath et al., "Mercury Transformations in Coal Combustion Flue Gas," Fuel Processing Technology, 2000, vol. 65-66, pp. 289-310.

Gale, "Mercury Adsorption and Oxidation Kinetics in Coal-Fired Flue Gas," Proceedings of the 30th International Technical Conference on Coal Utilization & Fuel Systems, 2005, pp. 979-990.

Gale, "Mercury Control with Calcium-Based Sorbents and Oxidizing Agents," Final Report of Southern Research Institute, Jul. 2005, 137 pages.

Gale, "Mercury Control with Calcium-Based Sorbents and Oxidizing Agents," Southern Research Institute, Mercury Control Technology R&D Program Review Meeting, Aug. 12-13, 2003, 25 pages.

Gale et al., "Mercury Speciation as a Function of Flue Gas Chlorine Content and Composition in a 1 MW Semi-Industrial Scale Coal-Fired Facility," In Proceedings of the Mega Symposium and Air & Waste Management Association's Specialty Conference, Washington, DC, May 19-22, 2003, Paper 28, 19 pages.

Geiger et al., "Einflußdes Schwefels auf Die Doxin—und Furanbuilding bei der Klärschlammverbrennung," VGB Kraftwerkstechnik, 1992, vol. 72, pp. 159-165.

(56) References Cited

OTHER PUBLICATIONS

Ghorishi et al., "Effects of Fly Ash Transition Metal Content and Flue Gas HCl/SO2 Ratio on Mercury Speciation in Waste Combustion," in Environmental Engineering Science, Nov. 2005, vol. 22, No. 2, pp. 221-231.
Ghorishi et al., "In-Flight Capture of Elemental Mercury by a Chlorine-Impregnated Activated Carbon," presented at the Air & Waste Management Association's 94h Annual Meeting & Exhibition, Orlando, FL, Jun. 2001, pp. 1-14.
Ghorishi, "Fundamentals of Mercury Speciation and Control in Coal-Fired Boilers," EAP Research and Development, EPA-600/R-98-014, Feb. 1998, pp. 1-26.
Granite et al., "Novel Sorbents for Mercury Removal from Flue Gas," National Energy Technology Laboratory, Apr. 2000, 10 pages.
Granite et al., "Sorbents for Mercury Removal from Flue Gas," U.S. Dept. of Energy, Report DOE/FETC/TR-98-01, Jan. 1998, 50 pages.
Granite et al. "The thief process for mercury removal from flue gas," Journal of environmental management 84.4 (2007):628-634.
Griffin, "A New Theory of Dioxin Formation in Municipal Solid Waste Combustion," Chemosphere, 1986, vol. 15, Nos. 9-12, pp. 1987-1990.
Griswell et al., "Progress Report on Mercury Control Retrofit at the Colstrip Power Station," Power Plant Air Pollutant Control "MEGA" Symposium, Paper #91, Aug. 30-Sep. 2, 2010, pp. 1-23.
Gullet, B.K. et al., "The Effect of Sorbent Injection Technologies on Emissions of Coal-Based, Based, Metallic Air Toxics," Proceedings of the 1993 S02 Control Symposium, vol. 2, U.S. EPA (Research Triangle Park, NC) Session 6A, Boston, MA, Aug. 24-27, 1993, 26 pages.
Gullett, B. et al., "Bench-Scale Sorption and Desorption of Mercury with Activated Carbon," Presented at the 1993 International Conference on Municipal Waste Combustion, Williamsburg, VA, Mar. 30-Apr. 2, 1993, pp. 903-917.
Gullett, B. et al., "Removal of Illinois Coal-Based Volatile Tracy Mercury," Final Technical Report, Sep. 1, 1996 through Aug. 31, 1997, 2 pages.
Guminski, "The Br—Hg (Bromine-Mercury) System," Journal of Phase Equilibria, Dec. 2000, vol. 21, No. 6, pp. 539-543.
Gutberlet et al., "The Influence of Induced Oxidation on the Operation of Wet FGD Systems," Air Quality V Conference, Arlington, VA, Sep. 19-21, 2005, 15 pages.
Hall et al., "Chemical Reactions of Mercury in Combustion Flue Gases," Water, Air, and Soil Pollution, 1991, vol. 56, pp. 3-14.
Hein, K.R.G. et al., Research Report entitled, "Behavior of Mercury Emission from Coal Sewage Sludge Co-combustion Taking into Account the Gaseous Species," Förderkennzeichen: PEF 398002, Apr. 2001 (English Abstract).
Henning et al., "Impregnated activated carbon for environmental protection," Gas Separation & Purification, Butterworth-Heinemann Ltd., Feb. 1993, vol. 7(4), pp. 235-240.
Ismo et al., "Formation of Aromatic Chlorinated Compounds Catalyzed by Copper and Iron," Chemosphere, 1997, vol. 34(12), pp. 2649-2662.
Jeong et al. "Nox Removal by Selective Noncatalytic Reduction with Urea Solution in a Fluidized Bed Reactor," Korean Journal of Chemical Engineering, Sep. 1999, vol. 16, No. 5, pp. 614-617.
Jozewicz et al., "Bench-Scale Scale Investigation of Mechanisms of Elemental Mercury Capture by Activated Carbon," Presented at the Second International Conference on Managing Hazardous Air Pollutants, Washington, D.C., Jul. 13-15, 1993, pp. VII-85 through VII-99.
Julien et al., "The Effect of Halides on Emissions from Circulating Fluidized Bed Combustion of Fossil Fuels," Fuel, Nov. 1996, vol. 75(14), pp. 1655-1663.
Kaneko et al., "Pitting of stainless steel in bromide, chloride and bromide/chloride solutions," Corrosion Science, 2000, vol. 42(1), pp. 67-78.

Kellie et al., "The Role of Coal Properties on Chemical and Physical Transformation on Mercury in Post Combustion," presented at Air Quality IV Conference, Arlington, VA, Sep. 2003, pp. 1-14.
Kilgroe et al. "Fundamental Science and Engineering of Mercury Control in Coal-Fired Power Plants," presented at Air Quality IV Conference, Arlington, VA, Sep. 2003, 15 pages.
Kilgroe et al., "Control of Mercury Emissions from Coal-Fired Electric Utility Boilers: Interim Report including Errata dated Mar. 21, 2002," prepared by National Risk Management Research Laboratory, U.S. EPA Report EPA-600/R-01-109, Apr. 2002, 485 pages.
Kobayashi, "Japan EnviroChemicals, Ltd. Overview," Feb. 3, 2002, 3 pages.
Kramlich, "The Homogeneous Forcing of Mercury Oxidation to Provide Low-Cost Capture," Abstract, University of Washington, Department of Mechanical Engineering, Mar. 25, 2004, available at http://www.netl.doe.gov/publications/proceedings/04/UCR-HBCU/abstracts/Kramlich.pdf, pp. 1-2.
Krishnan et al., "Mercury Control by Injection of Activated Carbon and Calcium-Based Based Sorbents," Solid Waste Management: Thermal Treatment and Waste-to-Energy Technologies, U.S. EPA and AWMA, Washington, DC, Apr. 18-21, 1995, pp. 493-504.
Krishnan et al., "Mercury Control in Municipal Waste Combustors and Coal Fired Utilities," Environmental Progress, ProQuest Science Journals, Spring 1997, vol. 16, No. 1, pp. 47-53.
Krishnan et al., "Sorption of Elemental Mercury by Activated Carbons," Environmental Science and Technology, 1994, vol. 28, No. 8, pp. 1506-1512.
Lee et al., "Mercury Control Research: Effects of Fly Ash and Flue Gas Parameters on Mercury Speciation," U.S. Environmental Protection Agency National Risk Management Research Laboratory and ARCADIS, as early as 1998, Geraghy & Miller, Inc., pp. 221-238, Research Triangle Park, NC.
Lee et al., "Pilot-Scale Study of the Effect of Selective Catalytic Reduction Catalyst on Mercury Speciation in Illinois and Powder River Basin Coal Combustion Flue Gases," J. Air & Waste Manage. Assoc., May 2006, vol. 56, pp. 643-649.
Lemieux et al., "Interactions Between Bromine and Chlorine in a Pilot-Scale Hazardous Waste Incinerator," paper presented at 1996 International Incineration Conference, Savannah, GA, May 6-10, 1996, 14 pages.
Li et al., "Effect of Moisture on Adsorption of Elemental Mercury by Activated Carbons," Report No. EPA/600/A-00/104, U.S. EPA, Office of Research and Development Nation Risk Management, Research Laboratory (10-65), 2000, p. 1-Li to 13-Li.
Li et al., "Mercury Emissions Control in Coal Combustion Systems Using Postassium Iodide: Bench-Scale and Pilot-Scale Studies," Energy & Fuels, Jan. 5, 2009, vol. 23, pp. 236-243.
Linak et al., "Toxic Metal Emissions from Incineration: Mechanisms and Control," Progress in Enemy & Combustion Science, 1993, vol. 19, pp. 145-185.
Lissianski et al., "Effect of Coal Blending on Mercury Removal," presented at the Low Rank Fuels Conference, Billings, MT, Jun. 24-26, 2003, pp. 1-9.
Livengood et al., "Development of Mercury Control Techniques for Utility Boilers," for Presentation at the 88th Air & Waste Management Association Annual Meeting & Exhibit, Jun. 18-23, 1995, pp. 1-14.
Livengood et al., "Enhanced Control of Mercury Emissions Through Modified Speciation," for Presentation at the Air & Waste Management Association's 90th Meeting & Exhibition, Jun. 8-13, 1997, 14 pages.
Livengood et al., "Investigation of Modified Speciation for Enhanced Control of Mercury," Argonne National Laboratory, 1998, available at http://www.netl.doe.gov/publications/proceedings/97/97ps/ps_pdf/PS2B-9.pdf, pp. 1-15.
Luijk et al., "The Role of Bromine in the De Novo Synthesis in a Model Fly Ash System," Chemosphere, 1994, vol. 28, No. 7, pp. 1299-1309.
Martel, K., "Brennstoff-und lastspezifische Untersuchungen zum Verhalten von Schwermetallen in Kohlenstaubfeuerungen [Fuel and load specific studies on the behavior of heavy metals in coal firing systems]," Fortschritt-Berichte VDI, Apr. 2000, pp. 1-240.

(56) References Cited

OTHER PUBLICATIONS

McCoy et al., "Full-Scale Mercury Sorbent Injection Testing at DTE Energy's St. Clair Station," Paper #97, DTE Energy, as early as 2004, pp. 1-9.

McCoy, "Urea's Unlikely Role: Emissions Reduction is new application for chemical best known as a fertilizer," Chemical and Engineering News, Jun. 6, 2011, vol. 89, No. 23, p. 32.

Meij et al., "The Fate and Behavior of Mercury in Coal-Fired Power Plants," J. Air & Waste Manage. Assoc., Aug. 2002, vol. 52, pp. 912-917.

Metals Handbook, 9th Edition, Corrosion, vol. 13, ASM International, 1987, pp. 997-998, 6 pages.

Mills Jr., "Techline: Meeting Mercury Standards," as early as Jun. 18, 2001, available at http://www.netl.doe/publications/press/2001/tl_mercuryel2.html, printed on Feb. 5, 2002, pp. 1-3.

Moberg et al., "Migration of Trace Elements During Flue Gas Desulfurization," Report No. KHM-TR-28, Jun. 1982 (abstract only).

Niksa et al., "Predicting Mercury Speciation in Coal-Derived Flue Gases," presented at the 2003 Combined Power Plant Air Pollutant Control Mega Symposium, Washington, D.C., May 2003, pp. 1-14.

Oberacker et al., "Incinerating the Pesticide Ethylene Dibromide (EDB)—A field-Scale Trail Burn Evaluation of Environmental Performance," Report EPA /600/D-88/198, Oct. 1988, pp. 1-11.

Olson et al., "An Improved Model for Flue Gas-Mercury Interactions on Activated Carbons," presented at Mega Symposium May 21, 2003, Energy & Environmental Research Center publication, Paper# 142, pp. 1-8.

Olson et al., "Oxidation Kinetics and the Model for Mercury Capture on Carbon in Flue Gas," presented at Air Quality V Conference, Sep. 21, 2005, pp. 1-7.

Oppenheimer et al., "Thermische Entsorgung von Produktionsabfällen," Entsorgungs-Praxis, 2000, vol. 6, pp. 29-33.

Pasic et al., "Membrane Electrostatic Precipitation, Center for Advanced Materials Processing," Ohio Coal Research Center Department of Mechanical Engineering, Ohio University, on or before 2001, pp. 1-Bayless to10-Bayless.

Paulik et al., "Examination of the Decomposition of CaBr2 with the Method of Simultaneous TG, DTG, DTA and EGA," Journal of Thermal Analysis, vol. 15, 1979, 4 pages.

Pavlish et al., "Status Review of Mercury Control Options for Coal-Fired Power Plants," Fuel Processing Technology, Aug. 2003, vol. 82, pp. 89-165.

Richardson et al., "Chemical Addition for Mercury Control in Flue Gas Derived from Western Coals," presented at the 2003 Combined Power Plant Air Pollutant Control Mega Symposium, Washington D.C., May 2003, Paper #63, pp. 1-16.

Rodriguez et al., "Iodine Room Temperature Sorbents for Mercury Capture in Combustion Exhausts," 2001, 14 pages.

Samaras et al., "PCDD/F Prevention by Novel Inhibitors: Addition of Inorganic S- and N-Compounds in the Fuel before Combustion," Environmental Science and Technology, 2000, vol. 34, No. 24, pp. 5092-5096.

Sarkar et al., "Adsorption of Mercury(II) by Kaolinite," Soil Science Society of America Journal, 1999, vol. 64(6), pp. 1968-1975, abstract only, 1 page.

Schmidt et al., "Innovative Feedback Control System for Chemical Dosing to Control Treatment Plant Odors," Proceedings of the Water Environment Federation, WEFTEC 2000: Session 11-Session 20, pp. 166-175 (Abstract), 2 pages.

Schüetze et al., "Redox potential and co-removal of mercury in wet FGD scrubbers," Air Quality VIII Conference, Crystal City, VA, Oct. 24-27, 2011, 1 page.

Schüetze et al., "Strategies for enhanced co-removal of mercury in wet FGD-scrubbers—process control and additives," Flue Gas Cleaning, Helsinki, Finland, May 26, 2011, 25 pages.

Senior et al., "Gas-Phase Transformations of Mercury in Coal-Fired Power Plants," Fuel Processing Technology, vol. 63, 2000, pp. 197-213.

Senior, "Behavior of Mercury in Air Pollution Control Devices on Coal-Fired Utility Boilers," Power Production in the 21st Century: Impacts of Fuel Quality and Operations, Engineering Foundation Conference, Snowbird, UT, Oct. 28-Nov. 2, 2001, 17 pages.

Serre et al., "Evaluation of the Impact of Chlorine on Mercury Oxidation in a Pilot-Scale Coal Combustor—the Effect of Coal Blending," U.S. Environmental Protection Agency, Sep. 2009, 21 pages.

Sjostrom et al., "Full-Scale Evaluation of Mercury Control at Great River Energy's Stanton Generating Station Using Injected Sorbents and a Spray Dryer/Baghouse," to be presented at Air Quality III Conference, Session A3b, 2002, 14 pages.

Sjostrom et al., "Full-Scale Evaluation of Mercury Control By Injecting Activated Carbon Upstream of a Spray Dryer and Fabric Filter," Presented at the 2004 combined power plant air pollutant control mega symposium, Washington, D.C., Aug. 2004, 18 pages.

Sjostrom et al., "Long-Term Carbon Injection Field Test for > 90% Mercury Removal for a PRB Unit with a Spray Dryer and Fabric Filter," ADA-ES, Inc. Final Scientific/Technical Report, Apr. 2009, 82 pages.

Sjostrom, "Evaluation of Sorbent Injection for Mercury Control," ADA-ES, Inc. Topical Report for Basin Electric Power Cooperative's Laramie River Station, Jan. 16, 2006, 49 pages.

Sjostrom, "Evaluation of Sorbent Injection for Mercury Control," Topical Report for Sunflower Electric's Holcomb Station, U.S. DOE Cooperative Agreement No. DE-FC26-03NT41986, Topical Report No. 41986R07, Jun. 28, 2005, 85 pages.

Sliger et al., "Towards the Development of a Chemical Kinetic Model for the Homogeneous Oxidation of Mercury by Chlorine Species," Fuel Processing Technology, vol. 65-66, 2000, pp. 423-438.

Speight, ed., The Chemistry and Technology of Coal, CRC Press, 1994, pp. 152-155.

Starns et al., "Full-Scale Evaluation of TOXECON II™ on a Lignite-Fired Boiler" presented at US EPA/DOE/EPRI Combiner Power Plant Air Pollutant Control Symposium: The Mega Symposium, Washington, DC, Aug. 30-Sep. 2, 2004, 14 pages.

Staudt et al., "Control Technologies to Reduce Conventional and Hazardous Air Pollutants from Coal-Fired Power Plants," prepared for Northeast States for Coordinated Air Use Management (NESCAUM), Mar. 31, 2011, retrieved from www.nescaum.org/.../coal-control-technology-nescaum-report-20110330.pdf, 36 pages.

Sudhoff, "Anticipated Benefits of the TOXECON Retrofit for Mercury and Multi-Pollutant Control Technology," National Energy Technology Laboratory, Nov. 19, 2003, available at http://www.netl.doe.gov/technologies/coalpower/cctc/pubs/Benefits_TOXECON_111903.pdf, pp. 1-20.

Suzuki et al., "Instrumental neutron activation analysis for coal," Bunseki Kagaku, vol. 34, No. 5, 1985, pp. 217-223 (with English abstract).

Teller et al., "Mercury Removal from Incineration Flue Gas," Air and Water Technoiogies Co., for presentation at the 84th Annual Meeting & Exhibition Vancouver, British Columbia, Jun. 16-21, 1991, 10 pages.

United States Environmental Protection Agency, "Study of Hazardous Air Pollutant Emissions from Electric Utility Steam Generating Units," Report to Congress, vol. 1-2, EPA-453/R-98-004a&b, Feb. 1998, pp. 1-165.

Urabe et al., "Experimental Studies on Hg Vapor Removal Using Corona Discharge for Refuse Incinerator," Chemical Abstracts, Oct. 1997, vol. 109, 37 pages (includes translation).

Urano, S., "Studies on Bleaching Powder, VII. The Decomposition of Calcium Hypochlorite by Heat in the Presence of Calcium Chloride," Journal of the Society of Chemical Industry of Japan, vol. 31, 1928, pp. 46-52 (no translation).

Verhulst et al., "Thermodynamic Behavior of Metal Chlorides and Sulfates under the Conditions of Incineration Furnaces," Environmental Science & Technology, 1996, vol. 30, No. 1, pp. 50-56.

Vidic et al., "Uptake of Elemental Mercury Vapors by Activated Carbons," Journal of the Air & Waste Management Association, 1996, vol. 46, pp. 241-250.

(56) References Cited

OTHER PUBLICATIONS

Vidic et al., "Vapor-phase elemental mercury adsorption by activated carbon impregnated with chloride and cheltinq agents," Carbon, 2001, vol. 39, pp. 3-14.
Vosteen et al., Mercury Sorption and Mercury Oxidation by Chlorine and Bromine at SCR DeNOx Catalyst (Part A: Oxidation), 9th Annual EPA, DOE, EPRI, EEI Conference on Clean Air, Mercy Global Warming & Renewable Energy, Tucson, AZ, Jan. 24, 2005, 38 pages.
Vosteen et al., "Mercury-Related Chemistry in Waste Incineration and Power Generation Flue Gases," Sep. 2003, Air Quality IV, pp. 1-8.
Vosteen et al., "Bromine Enhanced Mercury Abatement from Combustion Flue Gases—Recent Industrial Applications and Laboratory Research," VGB PowerTech, International Journal for Electricity and Heat Generation, 2006, vol. 86, No. 3, pp. 70-75.
Vosteen et al., "Bromine Enhanced Mercury Abatement from Combustion Flue Gases-Recent Industrial Applications and Laboratory Research," VGB PowerTech, 2nd international Experts' Workshop on Mercury Emissions from Coal (MEC2), May 24 & 25, 2005, 8 pages.
Weber et al., "The Role of Copper(II) Chloride in the Formation of Organic Chlorine in Fly Ash," Chemosphere, 2001, vol. 42, pp. 479-582.
White et al., "Field Test of Carbon Injection for Mercury Control at Camden County Municipal Waste Combustor," EPA-600/R-93-181 (NTIS PB94-101540), Sep. 1993, pp. 1-11.
Withum et al., "Characterization of Coal Combustion By-Products for the Re-Evolution of Mercury into Ecosystems," Consol Energy Inc., Research and Development, Mar. 2005, 48 pages.
Working project report for period Oct. 1, 1999 to Sep. 30, 2001 from Institut fur Verhrenstechnik und Dampfkesselwessen (IVD), Universitat Stuttgart, dated Mar. 28, 2002, pp. 14-38.
Zevenhoven et al., "Control of Pollutants in flue gases and fuel gases," Trace Elements, Alkali Metals, 2001, 32 pages.
Zygarlicke et al., "Flue gas interactions of mercury, chlorine, and ash during coal combustion." Proceedings of the 23rd International Technical Conference on Coal Utilization and Fuel Systems, Clearwater, Florida, Mar. 9-13, 1998, pp. 517-526 (ISBN 0-03206602302).
Protest for Canadian Patent Application No. 2788820, dated Feb. 26, 2018, 6 pages.
Protest for Canadian Application No. 2788820, dated Nov. 6, 2018, 10 pages.
Official Action for Canadian Application No. 2,793,326, dated May 9, 2016, 3 pages.
Notice of Allowance for Canadian Application No. 2,793,326, dated Jan. 24, 2017, 1 page.
Notice of Protest for Canadian Application No. 2793326, dated Feb. 3, 2017, 16 pages.
Notice of Protest for Canadian Application No. 2793326, dated Jul. 7, 2017, 6 pages.
Official Action for Canadian Application No. 2,793,326, dated Aug. 7, 2017, 4 pages.
Notice of Allowance for Canadian Application No. 2793326, dated Apr. 13, 2018, 1 page.
Notice of Protest for Canadian Application No. 2793326, dated Apr. 19, 2018, 17 pages.
Notice of Withdrawal of Notice of Allowance for Canadian Application No. 2793326, dated Apr. 30, 2018, 1 page.
Official Action for Canadian Application No. 2793326, dated May 8, 2018, 4 pages.
Notice of Protest for Canadian Application No. 2793326, mailed Feb. 14, 2019, 12 pages.
Official Action for Canadian Application No. 2793326, dated Mar. 19, 2019, 3 pages.
Official Action for U.S. Appl. No. 13/281,066, dated Nov. 28, 2012, 11 pages.
Notice of Allowance for U.S. Appl. No. 13/281,066 dated Apr. 2, 2013, 11 pages.
Official Action for U.S. Appl. No. 13/920,658, dated Nov. 27, 2013 7 pages.
Official Action for U.S. Appl. No. 13/920,658, dated Mar. 11, 2014 6 pages.
Official Action for U.S. Appl. No. 13/920,658, dated Jun. 16, 2014 7 pages.
Notice of Allowance for U.S. Appl. No. 13/920,658, dated Oct. 1, 2014 5 pages.
Official Action for U.S. Appl. No. 14/604,153, dated Mar. 24, 2016, 10 pages.
Final Action for U.S. Appl. No. 14/604,153, dated Aug. 4, 2016, 11 pages.
Notice of Allowance for U.S. Appl. No. 14/604,153, dated Jan. 13, 2017, 8 pages.
Official Action for U.S. Appl. No. 15/488,144 dated Jan. 10, 2018, 10 pages.
Notice of Allowance for U.S. Appl. No. 15/488,144, dated Jun. 28, 2018, 7 pages.
Official Action for U.S. Appl. No. 16/186,187 dated Sep. 12, 2019, 8 pages.
Notice of Allowance for U.S. Appl. No. 16/186,187 dated Jan. 24, 2020, 5 pages.
Haiwen, "Basic Science Series of Database of Excellent Master's Degree Theses in China," No. 07, Geochemistry of Iodine in Chinese Coal, Jul. 2008, pp. 29-32, 8 pages.
Matai et al., "Iodine Deficiency Disease-Local Goiter and Local Cretinism," 2nd Edition, People's Medical Publishing House, Jun. 1993, pp. 46-49, 9 pages.
Notice of Allowance for Canadian Application No. 2793326, dated Jan. 23, 2020, 1 page.

\* cited by examiner

Figure 7. Results of Coal Blending Tests, Experiment #3

HOT-SIDE METHOD AND SYSTEM

CROSS REFERENCE TO RELATED APPLICATION

The present application is a continuation of U.S. application Ser. No. 16/186,187, filed Nov. 9, 2018, now U.S. Pat. No. 10,730,015, which is a continuation of U.S. application Ser. No. 15/488,244, filed Apr. 14, 2017, now U.S. Pat. No. 10,124,293, which is a continuation of U.S. application Ser. No. 14/604,153, filed Jan. 23, 2015, now U.S. Pat. No. 9,657,942, which is a continuation of U.S. application Ser. No. 13/920,658, filed Jun. 18, 2013, now U.S. Pat. No. 8,951,487, which is a continuation-in-part of U.S. application Ser. No. 13/281,066, filed Oct. 25, 2011, now U.S. Pat. No. 8,524,179, which claims the benefits of U.S. Provisional Application Ser. No. 61/406,492, filed Oct. 25, 2010; and 61/422,026, filed Dec. 10, 2010, both entitled "METHOD AND EQUIPMENT FOR CONTROLLING MERCURY EMISSIONS FROM COAL-FIRED THERMAL PROCESSES", which are incorporated herein by this reference in their entirety.

FIELD

The disclosure relates generally to controlling mercury emissions and particularly to controlling mercury emissions using halogen-containing additives.

BACKGROUND

In response to the acknowledged threat that mercury poses to human health and the environment as a whole, both federal and state/provincial regulation have been implemented in the United States and Canada to permanently reduce mercury emissions, particularly from coal-fired utilities (e.g., power plants), steel mills, cement kilns, waste incinerators and boilers, industrial coal-fired boilers, and other coal combusting facilities. For example, about 40% of mercury introduced into the environment in the U.S. comes from coal-fired power plants. New coal-fired power plants will have to meet stringent new source performance standards. In addition, Canada and more than 12 states have enacted mercury control rules with targets of typically 90% control of coal-fired mercury emissions and other states are considering regulations more stringent than federal regulations. Further U.S. measures will likely require control of mercury at more stringent rates as part of new multi-pollutant regulations for all coal-fired sources.

The leading technology for mercury control from coal-fired power plants is activated carbon injection ("ACI"). ACI is the injection of powdered carbonaceous sorbents, particularly powdered activated carbon ("PAC"), upstream of either an electrostatic precipitator or a fabric filter bag house. Activated or active carbon is a porous carbonaceous material having a high adsorptive power.

Activated carbon can be highly effective in capturing oxidized (as opposed to elemental) mercury. Most enhancements to ACI have used halogens to oxidize gas-phase elemental mercury so it can be captured by the carbon surface. ACI technology has potential application to the control of mercury emissions on most coal-fired power plants, even those plants that may achieve some mercury control through control devices designed for other pollutants, such as wet or dry scrubbers for the control sulfur dioxide. ACI is a low capital cost technology. The largest cost element is the cost of sorbents. However, ACI has inherent disadvantages that are important to some users. First, ACI is normally not effective at plants configured with hot-side electrostatic precipitators or higher temperature cold-side electrostatic precipitators, because the temperature at which the particulates are collected is higher than the temperature at which the carbon adsorbs the mercury. Second, activated carbon is less effective for plants firing high- or medium-sulfur coal, plants using selective catalytic reduction (SCR) systems to control nitrogen oxide emissions where sulfur dioxide may be converted to sulfur trioxide at the catalyst surface and plants using sulfur trioxide flue gas conditioning due to the interference of sulfur trioxide with capture of mercury on the carbon surface. Another technique to control mercury emissions from coal-fired power plants is bromine injection with ACI. Such a mercury control system is sold by Alstom Power Inc. under the trade names Mer-Cure™ or KNX™ and by Nalco Mobotec Company under the trade name MerControl 7895™. Bromine is believed to oxidize elemental mercury and form mercuric bromide. To remove mercury effectively, bromine injection is done at high rates, typically above 100 ppmw of the coal. At 100 ppmw without ACI or other factors such as high unburned carbon from coal combustion or the presence of a flue gas desulfurization system, bromine has been reported as resulting in a change of mercury emissions of about 40% lower than the uncontrolled mercury.

Bromine, when added at high concentrations such as 100 ppmw of the coal feed, is problematic for at least two reasons. It can form HBr in the flue gas, which is highly corrosive to plant components, such as ductwork. In particular, cold surfaces in the gas path, such as air preheater internals, outlet ductwork, scrubber and stack liners, are very susceptible to corrosion attack. Also at such high injection rates, a significant amount of bromine will be emitted from the stack and into the environment. Bromine is a precursor to bromomethane, hydrobromofluorocarbons, chlorobromomethane and methyl bromide, which are known ozone depletors in the earth's upper atmosphere.

SUMMARY

These and other needs are addressed by the various aspects, embodiments, and configurations of the present disclosure. The aspects, embodiments, and configurations are directed generally to the conversion of gas-phase mercury to a form that is more readily captured.

In one aspect, a method is provided that includes the steps:

(a) generating from a mercury-containing feed material a mercury-containing gas stream comprising vapor-phase elemental mercury and a vapor-phase halogen;

(b) contacting at least one of the mercury-containing feed material and the mercury-containing gas stream with a reactive surface agent upstream of an air preheater, reactive surface agent and vapor phase halogen converting elemental mercury into ionic mercury and collecting the ionic mercury on the reactive surface agent; and (c) removing the ionic mercury active agent and reactive surface agent from the mercury-containing gas stream.

An advantage of this aspect is temperature stability. Introducing halogens with the coal with subsequent carbonaceous reactive surface agent (e.g., activated carbon) injection can result in superior temperature stability of the collected particulate compared to the use of bromine-treated reactive surface agent, for example. This can particularly be true when the activated carbon is brominated with a salt.

In one aspect, a method is provided that includes the steps:

(a) providing a mercury-containing gas stream comprising vapor-phase elemental mercury;

(b) contacting the mercury-containing gas stream with a carbonaceous reactive surface agent upstream of an air preheater, the reactive surface agent comprising at least one of iodine and bromine to collect the ionic mercury on the reactive surface agent; and (c) removing the mercury-loaded reactive surface agent from the gas stream.

The combined halogen and reactive surface agent can not only be cost effective but also efficacious, at surprisingly low concentrations, in promoting the removal of both elemental and speciated mercury from mercury-containing gas streams. Compared to bromine and iodine in the absence of a reactive surface agent, the reactive surface agent has been found to cost effectively promote the formation of particle-bound mercury species at relatively high temperatures.

Very low levels of halogen can enable or facilitate removal of mercury effectively in coal-fired systems, if excessively high acid gas species can be controlled. Mercury will generally not be removed effectively by carbon sorbents or on fly ash in the presence of higher sulfur trioxide and/or nitrogen dioxide concentrations in the mercury-containing gas stream. A high concentration of acid gases (which high partial pressure typically refers to a trioxide concentration of at least about 5 ppmv in the mercury-containing gas stream and even more typically of at least about 10 ppmv and/or a nitrogen dioxide concentration of at least about 5 ppmv and even more typically at least about 10 ppmv). The higher sulfur trioxide concentration can be due to sulfur levels in the feed material, catalytic oxidation of sulfur dioxide to sulfur trioxide across the SCR and/or where $SO_3$ is injected to improve performance of the particulate removal device. The condensation temperature of sulfur trioxide and/or nitrogen dioxide on a collection or sorbent surface can be lower than the condensation temperatures of mercuric iodide and periodic acid. As noted, condensed acid can displace sorbed mercury from a carbon sorbent particle surface.

By forming a mercury-containing particulate that can be collected in an electrostatic precipitator or baghouse or reacting with collected particulate, the mercury can be removed prior to entering the wet scrubber. This can eliminate the potential for re-emission of elemental mercury from the scrubber, which is extremely difficult to control for variable process conditions. It can also reduce or eliminate mercury from the scrubber sludge.

When halogens are introduced with the feed material, the collected mercury appears to be much more temperature stable than collected mercury caused by introduction of halogens into the flue gas. Introducing halogens with coal, for example, with subsequent ACI injection seems to result in much better temperature stability of the mercury associated with the collected particulate than when bromine-treated activated carbon is used, particularly when the activated carbon is brominated with a salt.

Stability of captured mercury in fly ash or other retained particulate solids is related to leachability and solubility of the mercury. Mercuric iodide, $HgI_2$, has a very low solubility in water, which is significantly different from (less soluble than) other oxidized mercury species such as $HgCl_2$ and $HgBr_2$. The solubility in water is more than two orders of magnitude lower than bromide or chloride species: $HgCl_2$ is 73.25 g/l, $HgBr_2$ is 6.18 g/l, $HgI_2$ is 0.06 g/l and $Hg°$ is $5.73 \times 10^{-05}$ g/l. The lower solubility of captured $HgI_2$ will reduce the leachability in fly ash and other solid particulates compared to other oxidized mercury species.

The present disclosure can include a method having at least the following steps:

(a) generating from a mercury-containing feed material a mercury-containing gas stream comprising vapor-phase elemental mercury and a vapor-phase halogen;

(b) passing the mercury-containing gas stream through a scrubber to remove a portion of the vapor-phase halogen and/or a halogen-containing derivative thereof and form a halogen-containing scrubbing medium and a treated gas stream; and (c) removing the halogen from the halogen-containing scrubbing medium to form a treated scrubbing medium for recycle to the scrubber and a removed halogen and/or halogen-containing material.

The halogen in the removed halogen and/or halogen-containing material is commonly one or more of bromine and iodine.

The scrubber can be a wet or dry scrubber.

The scrubber can remove not only most of the vapor-phase halogen from the gas stream but also most of an acid gas from the gas stream. For example, the scrubber can be capable of removing one or more of HCl, HBr, and HF from the gas stream.

Most of the halogen on the halogen-containing scrubbing medium can be removed as the removed halogen and/or halogen-containing material.

The halogen can be removed from the halogen-containing scrubbing medium by one or more of membrane separation, precipitation, adsorption, and/or absorption. For example, the halogen can be removed by one or more of an ion exchange resin, solvent extraction, adsorption, absorption, precipitation, and membrane filtration.

The halogen-containing scrubbing medium can be contacted with an oxidant to assist halogen removal.

The halogen can oxidize elemental mercury in the gas stream, and the removed halogen and/or halogen-containing material recycled to the generating step, whereby the vapor-phase halogen is derived from the removed halogen and/or halogen-containing material. The removed halogen and/or halogen-containing material can be regenerated prior to recycle.

The mercury-containing feed material can be coal.

The vapor-phase halogen can be formed from a native halogen-content of the coal, a halogen-containing additive combusted with the coal, and/or introduced into the gas stream downstream of a coal combustion zone.

These and other advantages will be apparent from the disclosure of the aspects, embodiments, and configurations contained herein.

"A" or "an" entity refers to one or more of that entity. As such, the terms "a" (or "an"), "one or more" and "at least one" can be used interchangeably herein. It is also to be noted that the terms "comprising", "including", and "having" can be used interchangeably.

"Absorption" is the incorporation of a substance in one state into another of a different state (e.g. liquids being absorbed by a solid or gases being absorbed by a liquid). Absorption is a physical or chemical phenomenon or a process in which atoms, molecules, or ions enter some bulk phase—gas, liquid or solid material. This is a different process from adsorption, since molecules undergoing absorption are taken up by the volume, not by the surface (as in the case for adsorption).

"Adsorption" is the adhesion of atoms, ions, biomolecules, or molecules of gas, liquid, or dissolved solids to a surface. This process creates a film of the adsorbate (the molecules or atoms being accumulated) on the surface of the adsorbent. It differs from absorption, in which a fluid permeates or is dissolved by a liquid or solid. Similar to surface tension, adsorption is generally a consequence of surface energy. The exact nature of the bonding depends on the details of the species involved, but the adsorption process is generally classified as physisorption (characteristic of weak van der Waals forces)) or chemisorption (characteristic of covalent bonding). It may also occur due to electrostatic attraction.

"Ash" refers to the residue remaining after complete combustion of the coal particles. Ash typically includes mineral matter (silica, alumina, iron oxide, etc.).

"At least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1-X_n$, $Y_1-Y_m$, and $Z_1-Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

"Biomass" refers to biological matter from living or recently living organisms. Examples of biomass include, without limitation, wood, waste, (hydrogen) gas, seaweed, algae, and alcohol fuels. Biomass can be plant matter grown to generate electricity or heat. Biomass also includes, without limitation, plant or animal matter used for production of fibers or chemicals. Biomass further includes, without limitation, biodegradable wastes that can be burnt as fuel but generally excludes organic materials, such as fossil fuels, which have been transformed by geologic processes into substances such as coal or petroleum. Industrial biomass can be grown from numerous types of plants, including *miscanthus*, switchgrass, hemp, corn, poplar, willow, *sorghum*, sugarcane, and a variety of tree species, ranging from *eucalyptus* to oil palm (or palm oil).

"Carbonaceous" refers to a carbon-containing material, particularly a material that is substantially rich in carbon.

"Coal" refers to a combustible material formed from prehistoric plant life. Coal includes, without limitation, peat, lignite, sub-bituminous coal, bituminous coal, steam coal, anthracite, and graphite. Chemically, coal is a macromolecular network comprised of groups of polynuclear aromatic rings, to which are attached subordinate rings connected by oxygen, sulfur, and aliphatic bridges.

A "composition" refers to one or more chemical units composed of one or more atoms, such as a molecule, polyatomic ion, chemical compound, coordination complex, coordination compound, and the like. As will be appreciated, a composition can be held together by various types of bonds and/or forces, such as covalent bonds, metallic bonds, coordination bonds, ionic bonds, hydrogen bonds, electrostatic forces (e.g., van der Waal's forces and London's forces), and the like.

"Halogen" refers to an electronegative element of group VIIA of the periodic table (e.g., fluorine, chlorine, bromine, iodine, astatine, listed in order of their activity with fluorine being the most active of all chemical elements).

"Halide" refers to a binary compound of the halogens.

"High alkali coals" refer to coals having a total alkali (e.g., calcium) content of at least about 20 wt. % (dry basis of the ash), typically expressed as CaO, while "low alkali coals" refer to coals having a total alkali content of less than 20 wt. % and more typically less than about 15 wt. % alkali (dry basis of the ash), typically expressed as CaO.

"High iron coals" refer to coals having a total iron content of at least about 10 wt. % (dry basis of the ash), typically expressed as $Fe_2O_3$, while "low iron coals" refer to coals having a total iron content of less than about 10 wt. % (dry basis of the ash), typically expressed as $Fe_2O_3$. As will be appreciated, iron and sulfur are typically present in coal in the form of ferrous or ferric carbonates and/or sulfides, such as iron pyrite.

"High sulfur coals" refer to coals having a total sulfur content of at least about 1.5 wt. % (dry basis of the coal) while "medium sulfur coals" refer to coals having between about 1.5 and 3 wt. % (dry basis of the coal) and "low sulfur coals" refer to coals typically having a total sulfur content of less than about 1.5 wt. % (dry basis of the coal), more typically having a total sulfur content of less than about 1.0 wt. %, and even more typically having a total sulfur content of less than about 0.8 wt. % of the coal (dry basis of the coal).

"Ion exchange medium" refers to a medium that is able, under selected operating conditions, to exchange ions between two electrolytes or between an electrolyte solution and a complex. Examples of ion exchange resins include solid polymeric or mineralic "ion exchangers". Other exemplary ion exchangers include ion exchange resins (functionalized porous or gel polymers), zeolites, montmorillonite clay, clay, and soil humus. Ion exchangers are commonly either cation exchangers that exchange positively charged ions (cations) or anion exchangers that exchange negatively charged ions (anions). There are also amphoteric exchangers that are able to exchange both cations and anions simultaneously. Ion exchangers can be unselective or have binding preferences for certain ions or classes of ions, depending on their chemical structure. This can be dependent on the size of the ions, their charge, or their structure. Typical examples of ions that can bind to ion exchangers are: $H^+$ (proton) and $OH^-$ (hydroxide); single-charged monoatomic ions like $Na^+$, $K^+$, and $Cl^-$; double-charged monoatomic ions like $Ca^{2+}$ and $Mg^{2+}$; polyatomic inorganic ions like $SO_4^{2-}$ and $PO_4^{3-}$; organic bases, usually molecules containing the amino functional group $—NR_2H^+$; organic acids often molecules containing $—COO^-$ (carboxylic acid) functional groups; and biomolecules that can be ionized: amino acids, peptides, proteins, etc.

Mercury Active Agent refers to an additive that oxidizes elemental mercury and/or catalyzes the formation of diatomic halogens.

Neutron Activation Analysis ("NAA") refers to a method for determining the elemental content of samples by irradiating the sample with neutrons, which create radioactive forms of the elements in the sample. Quantitative determination is achieved by observing the gamma rays emitted from these isotopes.

"Oxidizing agent", "oxidant" or "oxidizer" refers to an element or compound that accepts one or more electrons to another species or agent that is oxidized. In the oxidizing process the oxidizing agent is reduced and the other species which accepts the one or more electrons is oxidized. More specifically, the oxidizer is an electron acceptor, or recipient, and the reductant is an electron donor or giver.

"Particulate" refers to fine particles, such as fly ash, unburned carbon, soot and fine process solids, typically entrained in a gas stream.

The phrase "ppmw X" refers to the parts-per-million, based on weight, of X alone. It does not include other substances bonded to X.

The phrase "ppmv X" refers to the parts-per-million, based on volume, of X alone. It does not include other substances bonded to X.

"Separating" and cognates thereof refer to setting apart, keeping apart, sorting, removing from a mixture or combination, or isolating. In the context of gas mixtures, separating can be done by many techniques, including electrostatic precipitators, baghouses, scrubbers, and heat exchange surfaces.

A "sorbent" is a material that sorbs another substance; that is, the material has the capacity or tendency to take it up by sorption.

"Sorb" and cognates thereof mean to take up a liquid or a gas by sorption.

"Sorption" and cognates thereof refer to adsorption and absorption, while desorption is the reverse of adsorption.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DETAILED DESCRIPTION

Mercury Removal by Iodine-Containing Additive

Figure 1:
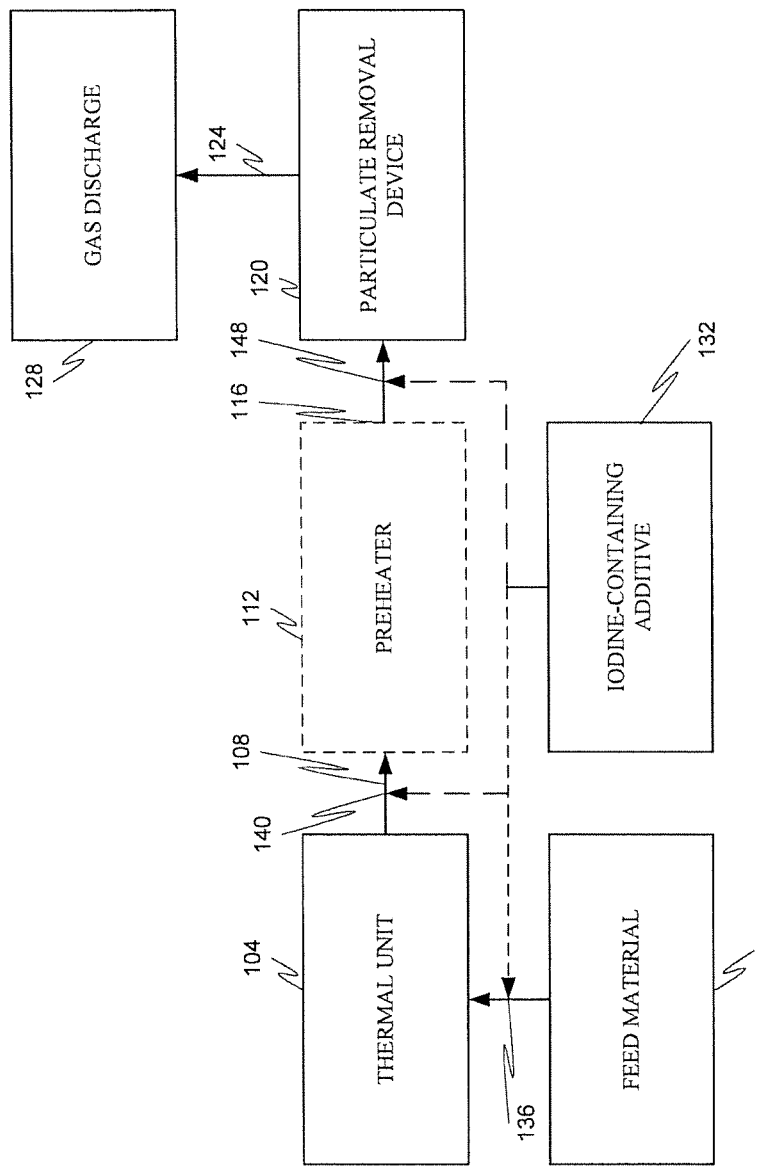
FIG. 1 is a block diagram according to an embodiment.

The current disclosure is directed to the use of an iodine-containing additive, typically present in relatively low concentrations, to control mercury emissions from vapor phase mercury evolving facilities, such as smelters, autoclaves, roasters, steel foundries, steel mills, cement kilns, power plants, waste incinerators, boilers, and other mercury-contaminated gas stream producing industrial facilities. Although the mercury is typically evolved by combustion, it may be evolved by other oxidation and/or reducing reactions, such as roasting, autoclaving, and other thermal processes that expose mercury containing materials to elevated temperatures.

There are a number of possible mechanisms for mercury capture in the presence of iodine.

While not wishing to be bound by any theory, a path for oxidation of mercury appears to be initiated by one or more reactions of elemental mercury and an iodine molecule in the form of $I_2$. The oxidation reactions may be homogeneous, heterogeneous, or a combination thereof. For heterogeneous reactions, the reaction or collection surface can, for example, be an air preheater surface, duct internal surface, an electrostatic precipitator plate, an alkaline spray droplet, dry alkali sorbent particles, a baghouse filter, an entrained particle, fly ash, carbon particle, or other available surface. It is believed that iodine can oxidize typically at least most, even more typically at least about 75%, and even more typically at least about 90% of the elemental mercury in the mercury-containing gas stream.

Under most flue gas conditions, the mercury reaction kinetics for iodine appear to be faster at higher temperatures than mercury reaction kinetics for chlorine or bromine at the same temperature. With chlorine, almost all the chlorine in the flame is found as HCl, with very little Cl. With bromine, there are, at high temperatures, approximately equal amounts of HBr on the one hand and $Br_2$ on the other. This is believed to be why oxidation of Hg by bromine is more efficient than oxidation by chlorine. Chemical modeling of equilibrium iodine speciation in a subbituminous flue gas indicates that, at high temperatures, there can be one thousand times less HI than I (in the form of $I_2$) in the gas. In many applications, the molecular ratio, in the gas phase of a mercury-containing gas stream, of elemental iodine to hydrogen-iodine species (such as HI) is typically at least about 10:1, even more typically at least about 25:1, even more typically at least about 100:1, and even more typically at least about 250:1.

While not wishing to be bound by any theory, the end product of reaction can be mercuric iodide ($HgI_2$ or $Hg_2I_2$), which has a higher condensation temperature (and boiling point) than both mercuric bromide ($HgBr_2$ or $Hg_2Br_2$) and mercuric chloride ($HgCl_2$ or $Hg_2Cl_2$). The condensation temperature (or boiling point) of mercuric iodide (depending on the form) is in the range from about 353 to about 357° C. compared to about 322° C. for mercuric bromide and about 304° C. for mercuric chloride. The condensation temperature (or boiling point) for iodine ($I_2$) is about 184° C. while that for bromine ($Br_2$) is about 58° C.

While not wishing to be bound by any theory, another possible reaction path is that other mercury compounds are formed by multi-step reactions with iodine as an intermediate. One possible multi-step reaction is that iodine reacts with sulfur oxides to form reduced forms of sulfur, which reduced forms of sulfur then react with mercury and form capturable particulate mercury-sulfur compounds.

As will be appreciated, these theories may not prove to be correct. As further experimental work is performed, the theories may be refined and/or other theories developed. Accordingly, these theories are not to be read as limiting the scope or breadth of this disclosure.

FIG. 1 depicts a contaminated gas stream treatment process for an industrial facility according to an embodiment. Referring to FIG. 1, a mercury-containing feed material 100 is provided. In one application, the feed material 100 is combustible and can be any synthetic or natural, mercury-containing, combustible, and carbon-containing material, including coal and biomass. The feed material 100 can be a high alkali or high iron coal. In other applications, the present disclosure is applicable to noncombustible, mercury-containing feed materials, including without limitation metal-containing ores, concentrates, and tailings.

The feed material 100 can natively include, without limitation, varying levels of halogens and mercury. Typically, the feed material 100 includes typically at least about 0.001 ppmw, even more typically from about 0.003 to about 100 ppmw, and even more typically from about 0.003 to about 10 ppmw mercury (both elemental and speciated) (measured by neutron activation analysis ("NAA")). Commonly, a combustible feed material 100 includes no more than about 5 ppmw iodine, more commonly no more than about 4 ppmw iodine, even more commonly no more than about 3 ppmw iodine, even more commonly no more than about 2 ppmw iodine and even more commonly no more than about 1 ppmw iodine (measured by neutron activation analysis ("NAA")). A combustible feed material 100 generally will produce, upon combustion, an unburned carbon ("UBC") content of from about 0.1 to about 30% by weight and even more generally from about 0.5 to about 20% by weight.

The feed material 100 is combusted in thermal unit 104 to produce a mercury-containing gas stream 108. The thermal unit 104 can be any combusting device, including, without limitation, a dry or wet bottom furnace (e.g., a blast furnace, puddling furnace, reverberatory furnace, Bessemer converter, open hearth furnace, basic oxygen furnace, cyclone furnace, stoker boiler, cupola furnace and other types of furnaces), boiler, incinerator (e.g., moving grate, fixed grate, rotary-kiln, or fluidized or fixed bed, incinerators), calciners including multi-hearth, suspension or fluidized bed roasters, intermittent or continuous kiln (e.g., ceramic kiln, intermittent or continuous wood-drying kiln, anagama kiln, bottle kiln, rotary kiln, catenary arch kiln, Feller kiln, noborigama kiln, or top hat kiln), oven, or other heat generation units and reactors.

The mercury-containing gas stream 108 includes not only elemental and/or speciated mercury but also a variety of other materials. A common mercury-containing gas stream 108 includes at least about 0.001 ppmw, even more commonly at least about 0.003 ppmw, and even more commonly from about 0.005 to about 0.02 ppmw mercury (both elemental and speciated). Other materials in the mercury-containing gas stream 108 can include, without limitation, particulates (such as fly ash), sulfur oxides, nitrogen oxides, carbon oxides, unburned carbon, and other types of particulates.

The temperature of the mercury-containing gas stream 108 varies depending on the type of thermal unit 104 employed. Commonly, the mercury-containing gas stream temperature is at least about 125° C., even more commonly is at least about 325° C., and even more commonly ranges from about 325 to about 500° C.

The mercury-containing gas stream 108 is optionally passed through the preheater 112 to transfer some of the thermal energy of the mercury-containing gas stream 108 to air input to the thermal unit 104. The heat transfer produces a common temperature drop in the mercury-containing gas stream 108 of from about 50 to about 300° C. to produce a mercury-containing gas stream 116 temperature commonly ranging from about 100 to about 400° C.

The mercury-containing gas stream 116 is next subjected to particulate removal device 120 to remove most of the particulates from the mercury-containing gas stream and form a treated gas stream 124. The particulate removal device 120 can be any suitable device, including an electrostatic precipitator, particulate filter such as a baghouse, wet particulate scrubber, and other types of particulate removal devices.

The treated gas stream 124 is emitted, via gas discharge 128, into the environment. To control mercury emissions in the mercury-containing gas stream 108, an iodine-containing additive 132 is employed. The iodine in the additive 132 can be in the form of a solid, liquid, vapor, or a combination thereof. It can be in the form of elemental iodine ($I_2$), a halide (e.g., binary halides, oxo halides, hydroxo halides, and other complex halides), an inter-halogen cation or anion, iodic acid, periodic acid, periodates, a homoatomic polyanion, and mixtures thereof. In one formulation, the iodine in the additive 132 is composed primarily of an alkali or alkaline earth metal iodide. In one formulation, the iodine-containing additive 132 is substantially free of other halogens and even more typically contains no more than about 25%, even more typically no more than about 10%, and even more typically no more than about 5% of the halogens as halogen(s) other than iodine. In one formulation, the iodine-containing additive 132 contains at least about 100 ppmw, more commonly at least about 1,000 ppmw, and even more commonly at least about 1 wt. % iodine. In one formulation, the iodine-containing additive contains no more than about 40 wt. % fixed or total carbon, more commonly no more than about 25 wt. % fixed or total carbon, even more commonly no more than about 15 wt. % fixed or total carbon, and even more commonly no more than about 5 wt. % fixed or total carbon. In one formulation, the iodine-containing additive 132 is a high (native) iodine coal. In one formulation, the iodine-containing additive 132 is an iodine-containing waste or byproduct material, such as a medical waste. In one formulation, the iodine-containing additive 132 comprises iodine attached to a solid support, such as by absorption, adsorption, ion exchange, formation of a chemical composition, precipitation, physical entrapment, or other attachment mechanism. The solid support can be inorganic or organic. Examples include ion exchange resins (functionalized porous or gel polymers), soil humus, a porous carbonaceous material, metal oxides (e.g., alumina, silica, silica-alumina, gamma-alumina, activated alumina, acidified alumina, and titania), metal oxides containing labile metal anions (such as aluminum oxychloride), non-oxide refractories (e.g., titanium nitride, silicon nitride, and silicon carbide), diatomaceous earth, mullite, porous polymeric materials, crystalline aluminosilicates such as zeolites (synthetic or naturally occurring), amorphous silica-alumina, minerals and clays (e.g., bentonite, smectite, kaolin, dolomite, montmorillinite, and their derivatives), porous ceramics metal silicate materials and minerals (e.g., one of the phosphate and oxide classes), ferric salts, and fibrous materials (including synthetic (for example, without limitation, polyolefins, polyesters, polyamides, polyacrylates, and combinations thereof) and natural (such as, without limitation, plant-based fibers, animal-based fibers, inorganic-based fibers, cellulosic, cotton, paper, glass and combinations thereof). Commonly, the halogen-containing additive 232 contains no more than about 10 wt. % iodine, more commonly no more than about 5 wt. % iodine, even more commonly no more than about 1 wt. % iodine, even more commonly no more than about 0.5 wt. % iodine, and even more commonly no more than about 0.1 wt. % iodine.

The iodine-containing additive 132 can be contacted with the mercury-containing gas stream at one or more contact points 136, 140, and 148 (where point 136 can be remote from the location of the thermal unit, including applying the additive to the feed at places such as a mine or in transit to the thermal unit location). At point 136, the iodine-containing additive 132 is added directly to the feed material 100 upstream of the thermal unit 104. At points 140 and 148, the iodine-containing additive 132 is introduced into the mercury-containing gas stream 108 or 116, such as by injection as a liquid, vapor, or solid powder. As can be seen from FIG. 1, the additive introduction can be done upstream or downstream of the (optional) air preheater 112. The iodine-containing additive can be dissolved in a liquid, commonly aqueous, in the form of a vapor, in the form of an aerosol, or in the form of a solid or supported on a solid. In one formulation, the iodine-containing additive 132 is introduced as a liquid droplet or aerosol downstream of the thermal unit 104. In this formulation, the iodine is dissolved in a solvent that evaporates, leaving behind solid or liquid particles of the iodine-containing additive 132.

Surprisingly, the iodine-containing additive 132 can allow mercury capture without a carbon sorbent, native unburned carbon, or ash being present. In contrast to bromine, mercury removal by iodine does not primarily depend on co-injection of activated carbon sorbents for vapor-phase mercury capture. In one process configuration, the mercury-containing gas stream upstream of the particulate removal device is substantially free of activated carbon. The iodine-containing additive 132 can effectively enable or facilitate removal of at least about 40%, even more commonly at least about 75%, and even more commonly at least about 90% of the elemental and speciated mercury in the mercury-containing gas stream when the feed material 100, upon combustion, produces a UBC of no more than about 30% and even more commonly of no more than about 5%. When a higher UBC level is produced, the iodine-containing additive 132 can remove at least about 40%, even more commonly at least about 75%, and even more commonly at least about 90% of the elemental and speciated mercury in the mercury-containing gas stream that is not natively removed by the unburned carbon particles.

In one plant configuration, sufficient iodine-containing additive 132 is added to produce a gas-phase iodine concentration commonly of about 8 ppmw basis of the flue gas or less, even more commonly of about 5 ppmw basis or less, even more commonly of about 3.5 ppmw basis or less, even more commonly of about 1.5 ppmw or less, and even more commonly of about 0.4 ppmw or less of the mercury-containing gas stream. Stated another way, the iodine concentration relative to the weight of mercury-containing, combustible (e.g., coal) feed (as fed) (whether by direct application to the combustible feed and/or injection into the mercury-containing (e.g., flue) gas) commonly is about 40 ppmw or less, more commonly about 35 ppmw or less, even more commonly about 30 ppmw or less, even more commonly is about 15 ppmw or less, even more commonly no more than about 10 ppmw, even more commonly no more than about 6 ppmw, even more commonly about 4 ppmw or less, and even more commonly no more than about 3 ppmw. Stated another way, the molar ratio, in the mercury-containing (e.g., flue) gas, of gas-phase diatomic iodine to total gas-phase mercury (both speciated and elemental) is commonly no more than about 1,200, and even more commonly no more than about 600, even more commonly no more than about 250, even more commonly no more than about 150, and even more commonly no more than about 80. By way of illustration, an effective concentration of gas-phase iodine at the air preheater outlet or particulate removal device inlet ranges from about 0.1 to about 10 ppmw, even more commonly from about 0.15 to about 5 ppmw, even more commonly from about 0.20 to about 2 ppmw, and even more commonly from about 0.25 to about 1.50 ppmw of the mercury-containing gas stream.

Commonly, the mercury-containing gas stream includes no more than about 1.0, even more commonly no more than about 0.5 and even more commonly no more than about 0.1 ppmw total bromine. The feed material generally includes no more than about 10 ppmw and even more commonly no more than about 5 ppmw natively occurring bromine.

The mercury-containing (e.g., flue) gas temperature for elemental mercury capture promoted by iodine commonly ranges from about 150 to about 600° C. and even more commonly from about 180 to about 450° C. The residence time upstream of particulate (e.g., fly ash) removal device 120 is commonly about 8 seconds, and even more commonly at least about 4 seconds, and even more commonly at least about 2 seconds.

Generally, sufficient iodine-containing additive 132 is added to produce a gas-phase iodine concentration commonly of about 3.5 ppmw or less, even more commonly of about 2 ppmw or less, even more commonly of about 1.5 ppmw or less, and even more commonly of about 0.4 ppmw or less. Stated another way, the molar ratio, in the mercury-containing (e.g., flue) gas, of gas-phase iodine to total gas-phase mercury (both speciated and elemental) is commonly no more than about 1,000, even more commonly no more than about 600, even more commonly no more than about 500, even more commonly no more than about 250, even more commonly no more than about 150, and even more commonly no more than about 80.

The above concentration ranges and conditions can, in appropriate applications, apply to bromine as a mercury removal additive.

Figure 2:
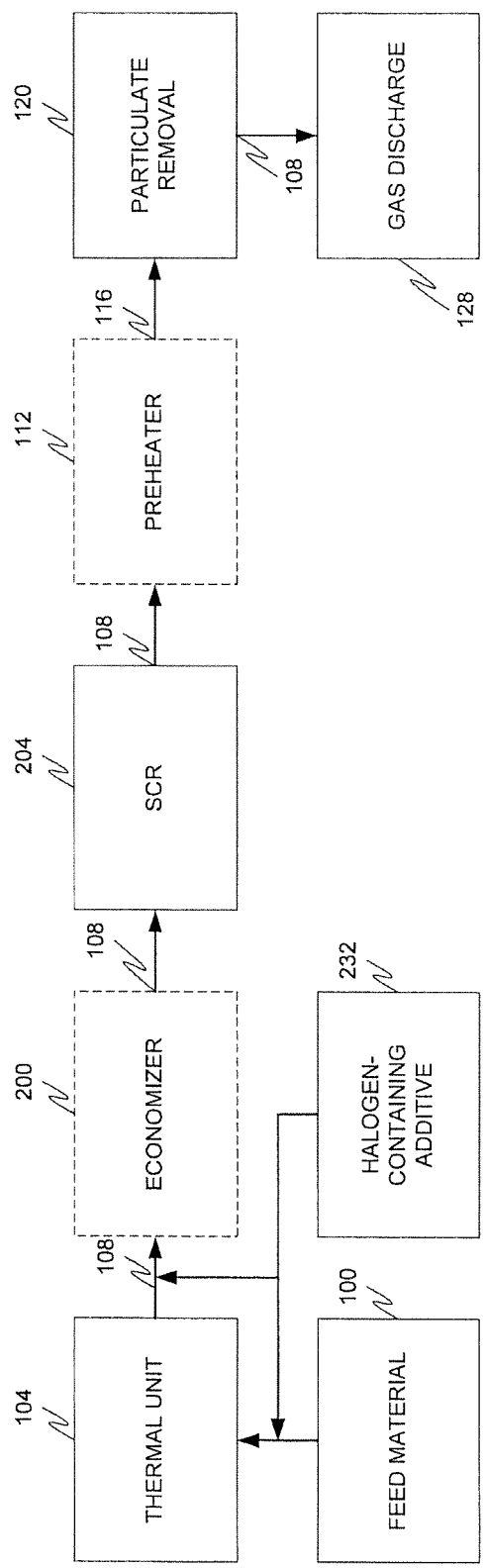
FIG. 2 is a block diagram according to an embodiment.

Mercury Removal by Halogen-Containing Additive in Presence of Selective Catalytic Reduction In another plant configuration shown in FIG. 2, the halogen concentration needed to effect mercury removal is further reduced by coupling halogen with a selective catalytic reduction ("SCR") zone prior to particulate removal. As will be appreciated, SCR converts nitrogen oxides, or $NO_x$, with the aid of a catalyst, into diatomic nitrogen ($N_2$) and water. A gaseous reductant, typically anhydrous ammonia, aqueous ammonia, or urea (but other gas-phase reductants may be employed), can be injected into a stream of flue or exhaust gas or other type of gas stream or absorbed onto a catalyst followed by off gassing of the ammonia into the gas stream. Suitable catalysts include, without limitation, ceramic materials used as a carrier, such as titanium oxide, and active catalytic components, such as oxides of base metals (such as vanadium ($V_2O_5$), wolfram ($WO_3$), titanium oxide ($TiO_2$) and tungstate (e.g., $WO_4^{2-}$), zeolites, and various precious metals. Other catalysts, however, may be used.

The SCR catalyst surface, depending on the design, catalyst and layering, is active for reactions other than the primary nitrogen oxide reduction. There are competing reactions occurring for available sites to reduce $NO_x$, oxidize $SO_2$ to $SO_3$ and to promote the reaction of mercury with various species to result in an increased fraction of oxidized mercury species. The SCR ammonia rate is co-variable with load and temperature and affects the balance between these competing reactions.

The presence of ultra trace vapor iodine and/or bromine species at the SCR catalyst surface can be surprisingly effective for mercury control. While not wishing to be bound by any theory, the amount of halogen (e.g., iodine and/or bromine) required to result in the formation of an oxidized form of mercury is lower when an SCR is in use. The surface of the SCR catalyst is believed to promote the formation of diatomic elemental halogens and/or mercury oxidation.

To capture the oxidized mercury in the particulate collection device, vapor $SO_3$ in the flue gas should be managed to limit the concentration after the air preheater. This can be accomplished by selection of lower-sulfur and higher alkaline coal, selection of lower activity SCR catalyst and control of SCR reagent injection rate and temperature. These interactive parameters must be managed to achieve the desired deNOx rate.

In one configuration, combustion of high alkali coals and low-sulfur coals is preferred to further inhibit formation of vapor $SO_3$ species. The SCR catalyst is typically selected to yield a specified $SO_2$ to $SO_3$ conversion rate for a design coal and operating condition. Catalyst activity gradually degrades over a period of years and must be replaced. A number of catalytic layers installed at intervals, with different oxidation rates, ages and catalyst activity are typically present for coal-fired plant SCRs. Effective $SO_2$ to $SO_3$ oxidation rate across the aggregate of catalyst surfaces in an SCR should be preferably lower than about 2.0% and more preferably lower than about 1.5% and even more preferably lower than about 1.2% in order to limit vapor $SO_3$ formation in the SCR.

Vapor $SO_3$ can also be controlled after formation in the SCR by means of in-duct injection of sorbents or by absorption in a dry scrubber. Vapor $SO_3$ can also be condensed on intermediate surfaces prior to the particulate control device, in particular the air preheater. Lower process temperatures will reduce SCR oxidation rate and increase $SO_3$ dropout in the air preheater. Mercury oxidation in the SCR benefits when $SO_3$ is reduced as a competing reaction, even at lower temperatures.

Ammonia reacts within the SCR to reduce nitrogen oxides. Excess ammonia lowers the ability of the SCR to react with or catalyze reaction (oxidation) of mercury. In one configuration, concentration(s) of ammonia and precursors thereof are maintained at a level just sufficient for $deNO_x$. That is, the concentration of ammonia and precursors thereof is preferably no more than about 125%, more preferably no more than about 120%, more preferably no more than about 115%, and even more preferably no more than about 110% of the stoichiometric amount required to perform $deNO_x$. As a result, the amount of ammonia slip will be reduced relative to conventional SCR-based systems. SCR reagent rate and/or ammonia and precursor addition is controlled to yield an average flue gas ammonia slip immediately downstream of the SCR of preferably less than about 5 ppmv and more preferably less than about 3 ppmv as ammonia.

To realize the full benefits of mercury oxidation by low concentration halogen addition with SCR and further achieve substantial removal of mercury in the particulate control device, the vapor $SO_3$ in the flue gas at the particulate control device inlet is commonly limited to less than about 7.5 $ppm_v$, more commonly to less than about 5 $ppm_v$, and more preferably to less than 2 $ppm_v$ at all process conditions by the methods described above, singly or in combination.

In one configuration, the halogen/mercury mass ratio for iodine as the primary halogen additive is commonly no more than about 200, more commonly no more than about 100, more commonly no more than about 75, more commonly no more than about 50, and more commonly no more than about 40 and commonly at least about 5, more commonly at least about 10, more commonly at least about 15, and even more commonly at least about 20.

In one configuration, the halogen/mercury mass ratio for brome as the primary halogen additive is commonly no more than about 400, more commonly no more than about 300, more commonly no more than about 275, more commonly no more than about 250, and more commonly no more than about 240 and commonly at least about 10, more commonly at least about 20, more commonly at least about 30, and even more commonly at least about 40.

In one configuration, the maximum amount of halogen added to the feed material 100 is commonly no more than about 40 ppmw, more commonly no more than about 25 ppmw, more commonly no more than about 20 ppmw, more commonly no more than about 15 ppmw, and even more commonly no more than about 10 ppmw, and the minimum amount of halogen added to the feed material 100 is commonly at least about 0.5 ppmw, more commonly at least about 0.75 ppmw, more commonly at least about 1 ppmw, and even more commonly at least about 1.5 ppmw.

The embodiment is directed particularly to the capture of mercury from systems with conventional SCR firing low sulfur and halogen-deficient coals (e.g., coals having no more than about 6 ppmw bromine and/or iodine). The embodiment can enhance mercury capture on the particulate control device and not on any wet flue gas desulfurization (FGD) scrubber. Low concentration iodine, in particular, surprisingly achieves mercury oxidation with SCR, and the oxidized mercury can be captured in the particulate-phase on the fly ash surface, particularly when the sulfur trioxide concentration in the flue gas at the particulate control device is managed to an amount of less than about 2 ppmv. This embodiment can be used with currently installed SCR catalysts for low sulfur, low halogen fueled units. In addition, though for bituminous coals there is ample native chlorine and bromine to oxidize mercury to as high as 100% across the SCR, the SCR is generally unable to realize any mercury capture until the FGD scrubber (due to the vapor $SO_3$). Iodine-oxidized mercury species are typically not effectively captured in an FGD scrubber because iodine-Hg species are generally not soluble. Accordingly, the present embodiment captures mercury (for lower $SO_3$ concentrations) at the ESP or baghouse.

Referring to FIG. 2, the waste stream 108 optionally flows through an economizer 200, which transfers some of the heat of the combustion stream 108 to water for recycle to other operations. The halogen-containing additive 232 is contacted with the feed material 100 upstream of the thermal unit 104 and/or with the mercury-containing gas stream 108 inside or downstream of the thermal unit 104.

The mercury-containing gas stream 108 proceeds to SCR unit 204, where nitrogen oxides are converted into molecular nitrogen and water.

The mercury-containing gas stream 108 proceeds to the optional air preheater 112 and then is subjected to particulate removal by particulate removal device 120 to form a treated gas stream 124 that is substantially free of particulates and mercury. As will be appreciated, an economizer uses waste heat by transferring heat from flue gases to warm incoming feedwater (e.g., which is subsequently converted into steam for power generation) while a preheater is a heat exchanger that transfers thermal energy from flue gas to combustion air before input of the combustion air to the furnace.

The treated gas stream 124 is then emitted from the gas discharge 128.

Although the SCR catalyst is commonly located between the economizer and air preheater outlet, it may be located at other locations in the mercury-containing gas stream. The SCR catalyst is commonly located prior to (or upstream of) the particulate removal device (e.g. baghouse and electrostatic precipitator). Commonly, SCR catalysis is performed at a temperature ranging from about 250 to about 500° C., more commonly at a temperature ranging from about 300 to about 450° C., and even more commonly at a temperature ranging from about 325 to about 400° C. The degree of $SO_2$ to $SO_3$ oxidation by the SCR varies within this temperature range depending on plant load, catalyst characteristics and other process conditions. At lower temperatures, the SCR contribution to total vapor $SO_3$ can be negligible.

Removal of Mercury by Halogen-Containing Additive and Mercury Active Agent

In another configuration, a combination of iodine or bromine on the one hand with another mercury active agent on the other is utilized to effect mercury oxidation and removal, particularly at higher temperatures than is possible with bromine or chlorine or hydrogen chloride alone. As used herein, a "mercury active agent" refers to an additive that oxidizes elemental mercury and/or catalyzes the formation of diatomic halogens. Conversion of elemental mercury to oxidized species is typically accomplished by the combined halogens that are either present in or added to the combustible fuel.

In one plant design, additional halogens, preferably in the form of diatomic elemental halogens, are, in addition to those in the combustible fuel, injected post-combustion.

In another plant design, oxidants, such as other halogens or non-halogen mercury active agents, are added to the combustible fuel in addition to or in lieu of downstream flue gas introduction.

Examples of suitable mercury active agents that are oxidants, which are combined with iodine or bromine prior to fuel pre-combustion include bromide salts including sodium, calcium, magnesium, zinc or potassium bromide, calcium, sodium or potassium bromate, iodide salts including sodium, calcium, magnesium, zinc or potassium iodide, calcium, sodium or potassium iodate, chloride salts including sodium, calcium, magnesium, zinc or potassium chloride, calcium, sodium or potassium chlorate, sodium, iron oxides sufficient to enrich the fly ash, and diatomic bromine or chlorine sorbed onto a suitable sorbent.

Examples of additional mercury active agents that are oxidants added to the feed material pre- or to the waste gas post-combustion in combination with iodine or bromine added to the feed material include bromine, iodine, or chlorine gas (preferably as diatomic elemental halogens), hydrogen bromide, hydrogen chloride, chlorite, chlorate, perchlorate, hypochlorite, and other bromine, chlorine and fluorine-containing compounds, finely divided iron oxides, copper oxides and other base metal oxides.

As will be appreciated, other mercury active agents can be employed. For example, different mercury active agents, that perform differing of the functions of oxidizing elemental mercury and/or catalyzing the formation of diatomic halogens, can be blended, mixed or otherwise combined or co-injected. For example, mercury oxidants can be added upstream, in, or downstream of the SCR zone. In one formulation, a first mercury active agent, such as an SCR catalyst, can catalyze the formation of diatomic halogens, a second mercury active agent, such as a halogen-containing compound or metal oxide, can oxidize elemental mercury and a reactive surface agent, such as circulating fluidized bed ash, powdered zeolites, fluidized catalytic cracker (FCC) fines, fumed silicates, metal oxide particles or powders, such as iron oxide, re-milled or fine fraction fly ash, fluidized bed combustor ash and combinations thereof, provides surface area for removal of mercury compounds.

While not wishing to be bound by any theory, it is believed that the halogen in the form of diatomic halogen gas is both an efficient mercury oxidizer and is available for reaction with oxidized mercury by direct halogenation to form, for example, $HgI_2$ or $HgBr_2$. In this configuration, the iodine (or iodine and bromine or bromine) concentration needed to effect mercury oxidation and mercury halogenation is reduced by addition of an oxidant to the flue or waste gas.

The mercury active agent and halogen are believed to act synergistically to effect mercury oxidation for subsequent removal by fly ash, unburned carbon, or another suitable additive. The mercury active agent can be supported or unsupported, with preferred carriers being a porous carbonaceous substrate (such as fly or bottom ash from coal combustion, carbon black, activated carbon, coke, char, charcoal, and the like), activated alumina, ceramic, clay, silica, silica-alumina, silicates, zeolites, fine fraction fly ash, bottom ash, FCC fines, fluidized bed combustor ash, and the like. The mercury active agent can be introduced either as a liquid, such as a slurry in a vaporizable carrier liquid or dissolved in a solvent, as particles or powders, as a gas, or as a combination thereof.

In either of the above plant configurations, the mercury oxidation, whether by unburned carbon or mercury active agent addition, is performed preferably between the economizer and air preheater outlet or at a preferred temperature of from about 250 to about 500° C., a more preferred temperature of from about 300 to about 450° C., and an even more preferred temperature of from about 325 to about 400° C.

In one application, iodine and/or bromine is added to the combustible fuel or otherwise introduced to the furnace or boiler, such as in levels set forth above, while a diatomic elemental halogen (such as diatomic elemental iodine, bromine, and/or chlorine) is added to the flue gas downstream from the furnace or boiler. In this configuration, the flue gas concentration of the injected or otherwise introduced diatomic elemental halogen preferably ranges from about 0.1 to about 8 $ppm_w$ of the flue gas, even more preferably from about 0.25 to about 5 $ppm_w$, and even more preferably from about 0.5 to about 2 $ppm_w$.

In one application, iodine and/or bromine are added to the combustible fuel or otherwise introduced to the furnace or boiler while a non-halogen oxidant, such as those set forth above, is added to the flue gas downstream from the furnace or boiler. In this configuration, the flue gas concentration of the injected or otherwise introduced oxidant preferably ranges from about 0.1 to about 8 $ppm_w$, even more preferably from about 0.25 to about 5 $ppm_w$, and even more preferably from about 0.5 to about 2 $ppm_w$.

In either application, the halogen or non-halogen oxidant or mixture thereof is typically introduced either as a gas or a liquid droplet or aerosol, with the oxidant being dissolved in a vaporizable solvent.

In one application, halide or interhalogen compound-containing additive 132 is added to the feed material 100 or otherwise introduced to the thermal unit 104 while diatomic elemental iodine ($I_2$) or bromine ($Br_2$) is added to the flue gas downstream from the thermal unit 104. In this configuration, the flue gas concentration of the injected or otherwise introduced diatomic iodine commonly ranges from about 0.1 to about 8 ppmw, even more commonly from about 0.25 to about 5 ppmw, and even more commonly from about 0.5 to about 2 ppmw of the mercury-containing gas stream.

Figure 8:
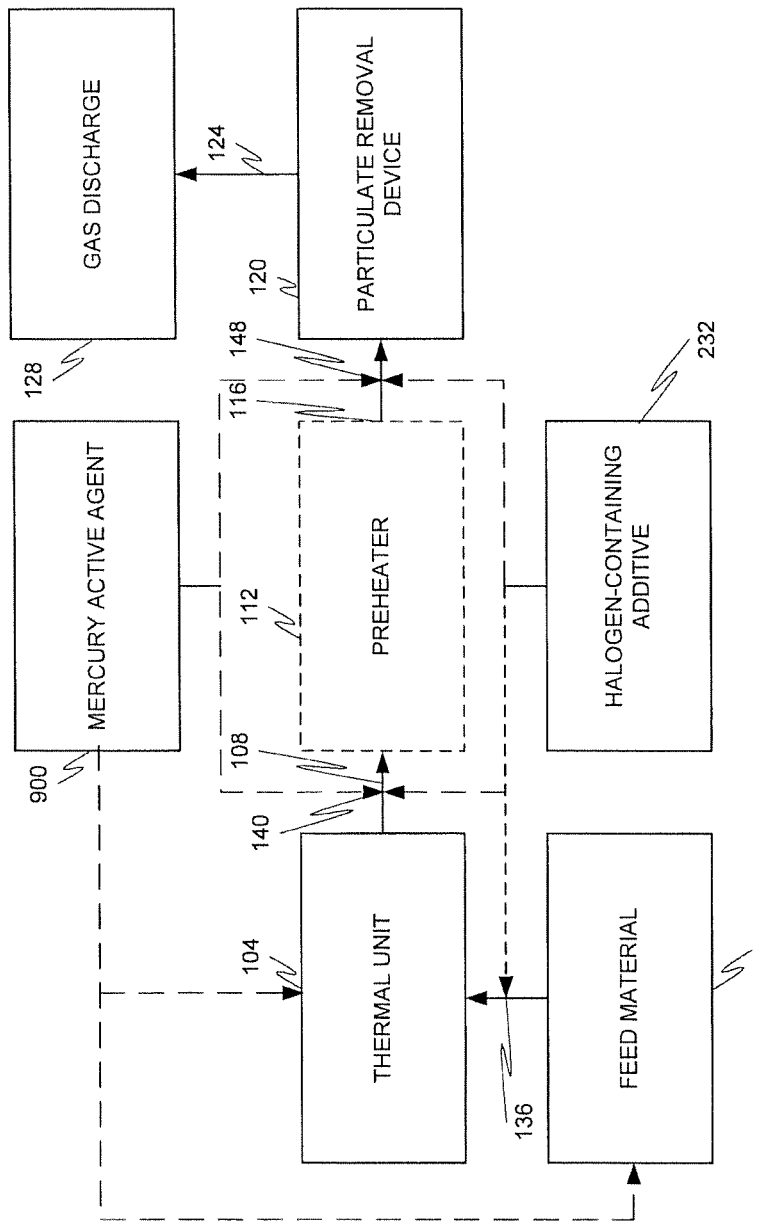
FIG. 8 is a block diagram according to an embodiment.
Figure 9:
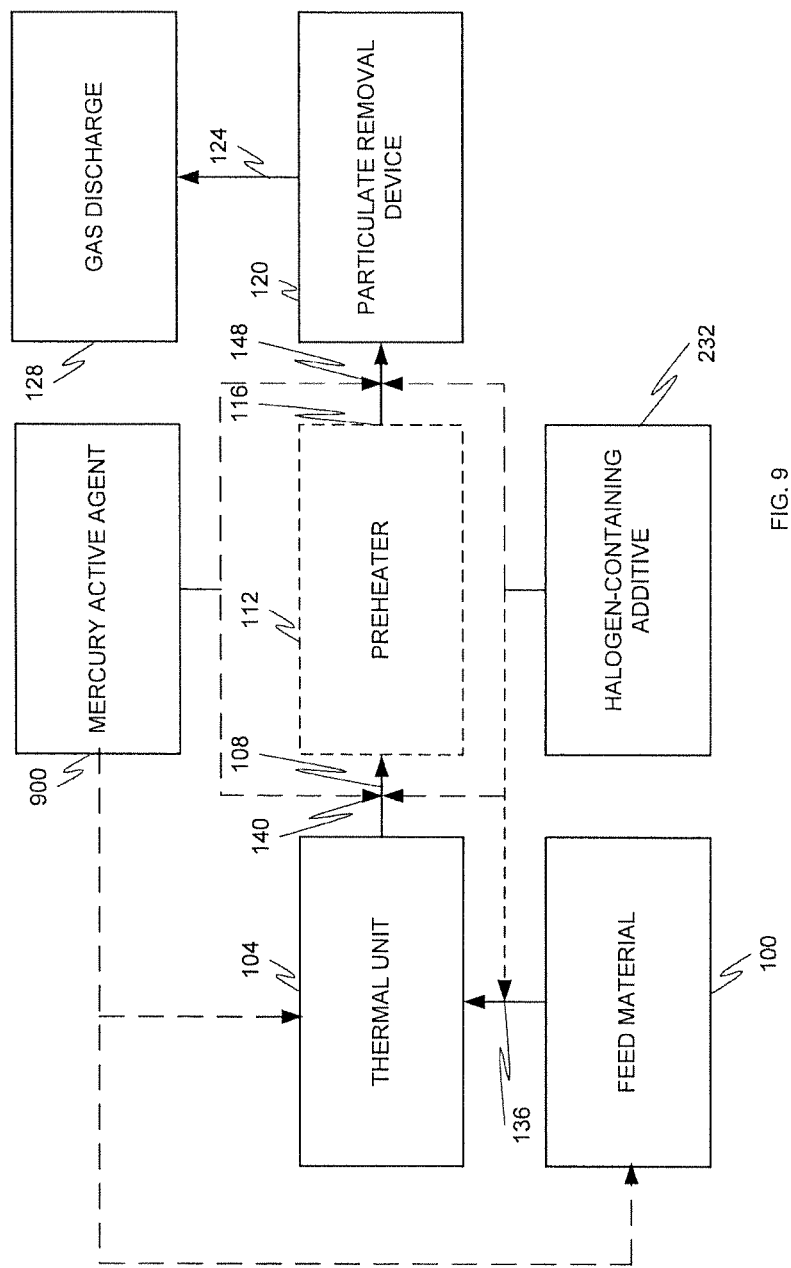
FIG. 9 is a block diagram according to an embodiment.

FIGS. 8-9 provide an example of a plant configuration according to an embodiment.

The mercury active agent 900 is introduced to the feed material 100, in the thermal unit 104, at a point 140 between the thermal unit 104 and optional preheater 112 and/or at a point 148 between the optional preheater 112 and a particulate removal device 120 or between the optional preheater 112 (FIG. 8) and a scrubber 400 (FIG. 9). When the mercury active agent 900 is introduced upstream of the preheater 112, the mercury active agent 900 is typically a non-carbonaceous agent due to the high mercury-containing gas stream temperature.

The mercury-containing gas stream 116 is thereafter treated by the particulate removal device 120 (FIG. 8) and/or by the dry scrubber 400 and particulate removal device 120 (FIG. 9) to form a treated gas stream. The dry scrubber 400 injects a dry reagent or slurry into the mercury-containing gas stream 116 to "wash out" acid gases (such as $SO_2$ and HCl). A dry or semi-dry scrubbing system, unlike a wet scrubber, does not saturate the flue gas stream that is being treated with moisture. In some cases, no moisture is added. In other cases, only the amount of moisture that can be evaporated in the flue gas without condensing is added.

Although the scrubber 400 is shown after the preheater 112, it is to be understood that the scrubber 400 may be located at several different locations, including without limitation in the thermal unit 104 or in the gas stream duct (at a point upstream of the particulate control device 120 such as at points 140 and/or 148) (as shown in FIG. 9).

The particulate control device 120 removes substantially all and typically at least about 90% of the particles entrained in the mercury-containing gas stream 116. As a result, at least most of the iodine and mercury in the mercury-containing gas stream 116 is removed by the particle removal device 120.

Removal of Mercury by Halogen-Containing Additive and Reactive Surface Agent Addition Although additional reactive surface particles are normally not required for iodine to form a mercury-containing particulate, in other embodiments addition of carbon- and non-carbon-containing solid and/or aerosol particles, referred to as "reactive surface agents", in favorable regions of the flue gas stream can enhance mercury removal by the iodine-containing additive 132, particularly when the feed material 100 produces, upon combustion, a low UBC level or the mercury-containing gas stream 108 has low levels of natively occurring particulates, such as ash, unburned carbon, soot, and other types of particulates. Low UBC levels generally comprise no more than about 30, even more generally no more than about 5, and even more generally no more than about 0.5% UBC in the post-combustion particulate. In one configuration, the surface active agent acts as a support for iodine or bromine, as discussed above.

While not wishing to be bound by any theory, it is believed that reactive surface agents provide surface area that iodine, mercury, and/or mercuric iodide or bromide can chemically react with (e.g., provides surface area for heterogeneous mercury reactions) and/or otherwise attach to. The reactive surface agent can be any carbon- or non-carbon-containing particle that provides a nucleation or reaction site for iodine, bromide, mercury, mercuric iodide, and/or mercuric bromide. Suitable solid or liquid reactive surface agents 300 include, without limitation, zeolites, silica, silica alumina, alumina, gamma-alumina, activated alumina, acidified alumina, amorphous or crystalline aluminosilicates, amorphous silica alumina, ion exchange resins, clays (such as bentonite), a transition metal sulfate, porous ceramics, porous carbonaceous materials, such as coal ash (e.g., fly or bottom ash), unburned carbon, charcoal, char, coke, carbon black, activated carbon, other hydrocarbon and coal derivatives, and other forms of carbon, trona, alkali metal bicarbonates, alkali metal bisulfates, alkali metal bisulfites, alkali metal sulfides, elemental sulfur, limestone, hydrated or slaked lime, circulating fluidized bed ash, fluidized catalytic cracker (FCC) fines, fumed silicates, metal oxide particles or powders, such as iron oxide and those comprising labile anions, re-milled or fine fraction fly ash, bottom ash, fluidized bed combustor ash, and mixtures thereof. The reactive surface agent 300 may be introduced as a solid particle (powder) and/or as a dissolved or slurried liquid composition comprising a vaporizable liquid carrier.

The mean, median, and $P_{90}$ sizes of the particles are typically no more than about 100 microns, even more typically no more than about 50 microns, even more typically no more than about 25 microns, even more typically no more than about 10 microns, and even more typically no more than about 5 microns. Unlike iodine additives, micron-sized non-carbon particles have not been consistently effective with bromine or chlorine-based coal additives.

In some configurations, the reactive surface agent is a porous carbonaceous or non-carbonaceous material, such as coke, fly ash, bottom ash, pet coke, carbon black, activated carbon, charcoal, char, beneficiated unburned carbon derived from fly ash, and mixtures thereof. In some applications, the porous carbonaceous or non-carbonaceous material is powdered and typically has a $P_{85}$ size of no more than about 1 mm in size and more typically of no more than about 0.75 mm in size and an average diameter typically between about 0.10 to about 0.75 and more typically between about 0.15 to about 0.25 mm. In some applications, the porous carbonaceous or non-carbonaceous material is granular and typically has a $P_{85}$ size of more than about 1 mm in size and more typically of in the range of from about 1 mm to about 2.5 mm in size and an average diameter typically between about 0.75 to about 1.25 mm.

The porous carbonaceous or non-carbonaceous material may be impregnated with a chemical agent, such as a mercury active agent. Porous carbonaceous or non-carbonaceous materials can contain a variety of inorganic impregnants, such as ionic, elemental, or compounded halogens (e.g., iodine, iodide, bromine, bromide, chlorine, chloride, iodine-containing salts, bromine-containing salts, chlorine-containing salts, and mixtures thereof) silver, and cations such as alkali earth metals, alkaline earth metals, and transition metals. In one formulation, the porous carbonaceous or non-carbonaceous material is impregnated with a mercury active agent or SCR catalytic material.

The amount of chemical agent in the porous carbonaceous or non-carbonaceous material can vary widely. Commonly, the impregnated porous carbonaceous or non-carbonaceous material comprises at least about 0.1 wt. %, more commonly at least about 0.5 wt. %, and even more commonly at least about 1 wt. % chemical agent and no more than about 5 wt. %, more commonly no more than about 4 wt. %, and even more commonly no more than about 2 wt. % chemical agent.

The porous carbonaceous material or non-carbonaceous can have a high surface area. Typically, the porous carbonaceous or non-carbonaceous material has a surface area of at least about 500 $m^2/g$, more typically of at least about 750 $m^2/g$, and even more typically of at least about 1,000 $m^2/g$ and no more than about 2,500 $m^2/g$, more typically no more than about 2,000 $m^2/g$, and even more typically no more than about 1,500 $m^2/g$.

The ash content of the porous carbonaceous or non-carbonaceous material can determine the efficiency of reactivation. The porous carbonaceous or non-carbonaceous material typically has an ash content in the range of from about 10% to about 95% and even more typically in the range of from about 20% to about 70%.

Commonly, the reactive surface agent is introduced downstream of the iodine-containing additive 132, more commonly downstream of the economizer 200, and more commonly downstream of the air preheater 112 and upstream of particulate removal device 120 and/or scrubber 400.

In other embodiments, the additive 132 is combined with other pollution control technologies that provide suspended solid and/or aerosol particles or other reaction surfaces at favorable location and temperature. Exemplary embodiments include, without limitation:

1. Spraying slurried solids or solutions of dissolved solids at a point upstream to allow sufficient evaporation. In a utility boiler, this region would normally be prior to, or upstream of, any air preheater 112 to allow sufficient residence time.

2. Providing a downstream slurry spray such as by conventional flue gas desulfurization ("FGD") spray dryer absorber ("SDA"). The slurry spray would normally downstream of any air preheater 112.

3. Providing alkaline liquid spray, such as wet FGD, to capture residual mercury past the ESP rather than allowing re-emission of mercury as elemental mercury—as can happen with bromine or chlorine.

4. Providing intimate particulate contact for the iodine-mercury or bromine-mercury compounds, such as filtering the flue gas through a fabric filter.

5. Providing additional submicron aerosol at the inlet to an air preheater 112 to take advantage of the temperature differential across the air preheater to boost surface reaction.

Examples of these alternatives will be discussed with reference to FIGS. 3-6 and 8.

Figure 3:
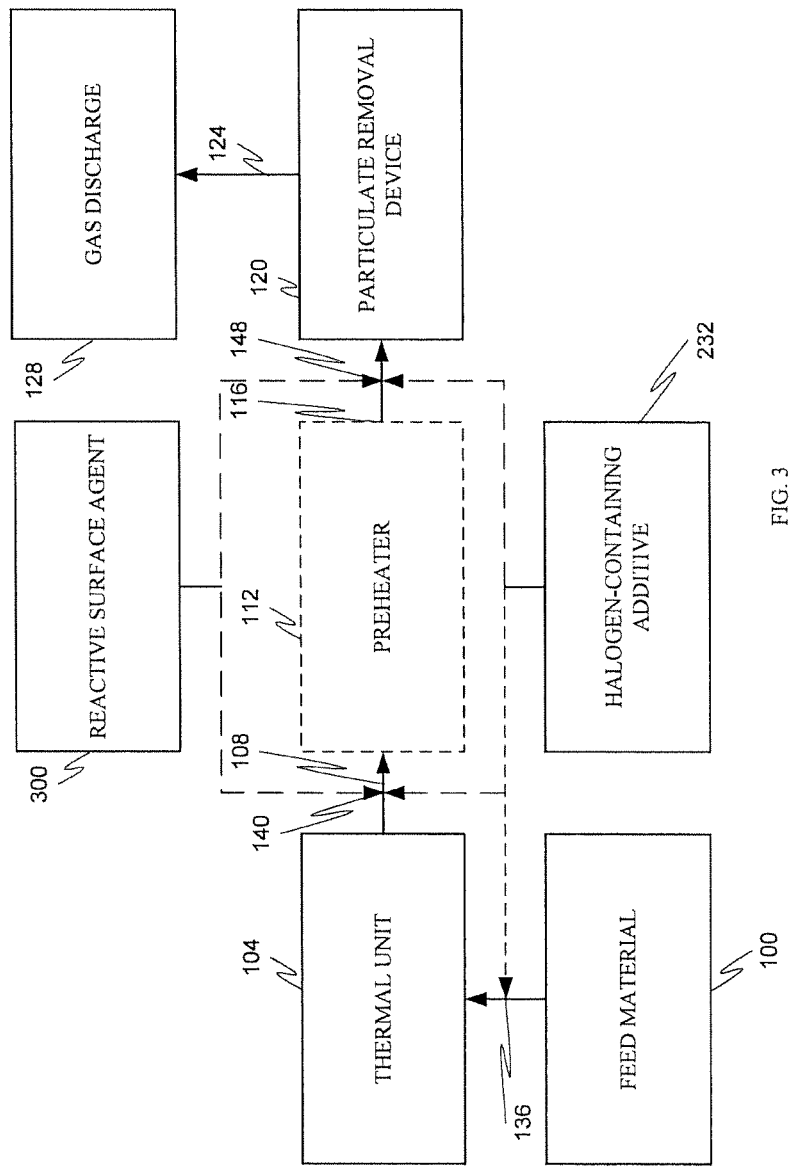
FIG. 3 is a block diagram according to an embodiment.
Figure 4:
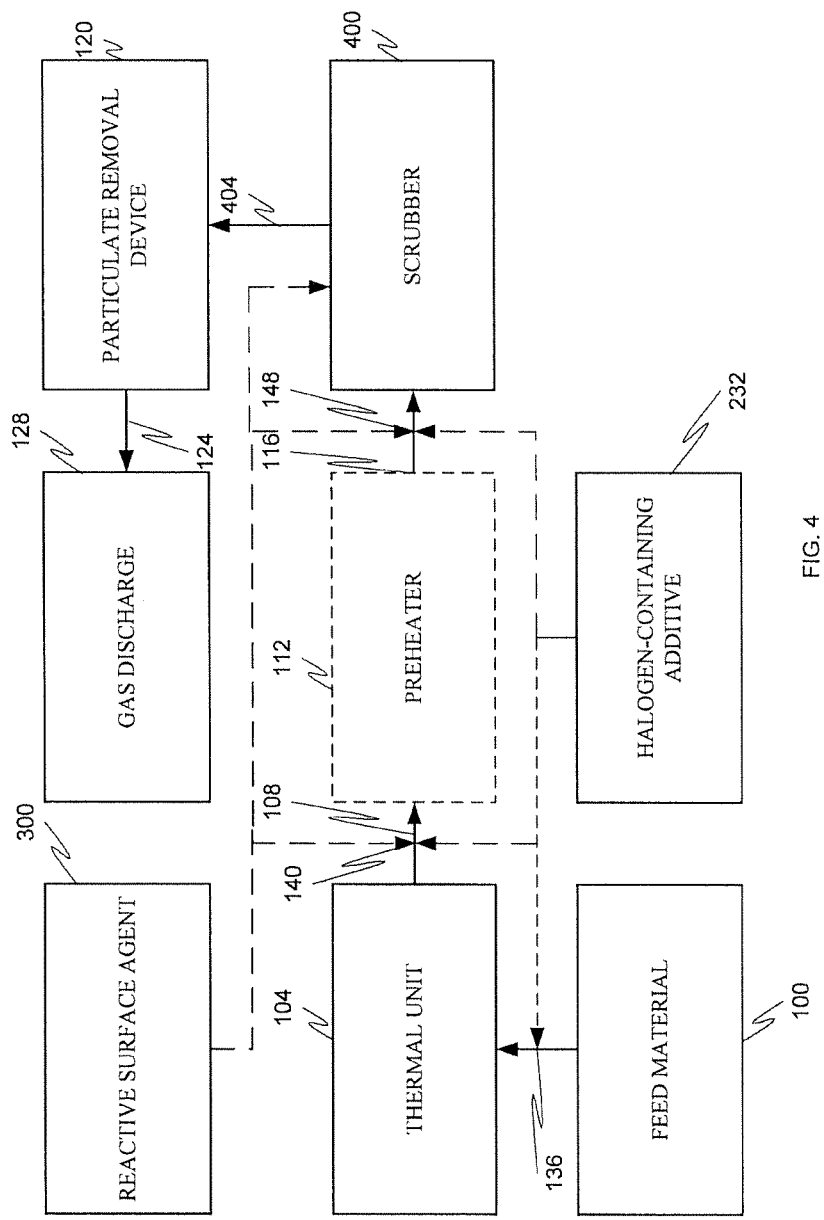
FIG. 4 is a block diagram according to an embodiment.

Referring to the embodiments of FIGS. 3 and 4, the reactive surface agent 300 is introduced at a point 140 between the thermal unit 104 and optional preheater 112 and/or at a point 148 between the optional preheater 112 and a particulate removal device 120 (FIG. 3) or between the optional preheater 112 and a scrubber 400 (FIG. 4). When the reactive surface agent 300 is introduced upstream of the preheater 112 and vapor phase halogens are present in the gas stream, the reactive surface agent 300 is believed to increase the maximum temperature where mercury removal begins and increase the overall mercury removal effectiveness.

The mercury-containing gas stream 116 is thereafter treated by the particulate removal device 120 (FIG. 3) and/or by the dry scrubber 400 and particulate removal device 120 (FIG. 4) to form a treated gas stream.

Although the scrubber 400 is shown after the preheater 112, it is to be understood that the scrubber 400 may be located at several different locations, including without limitation in the thermal unit 104 or in the gas stream duct (at a point upstream of the particulate control device 120 such as at points 140 and/or 148) (as shown in FIG. 4).

The particulate control device 120 removes substantially all and typically at least about 90% of the particles entrained in the mercury-containing gas stream 116. As a result, at least most of the iodine and mercury in the mercury-containing gas stream 116 is removed by the particle removal device 120.

Figure 6:
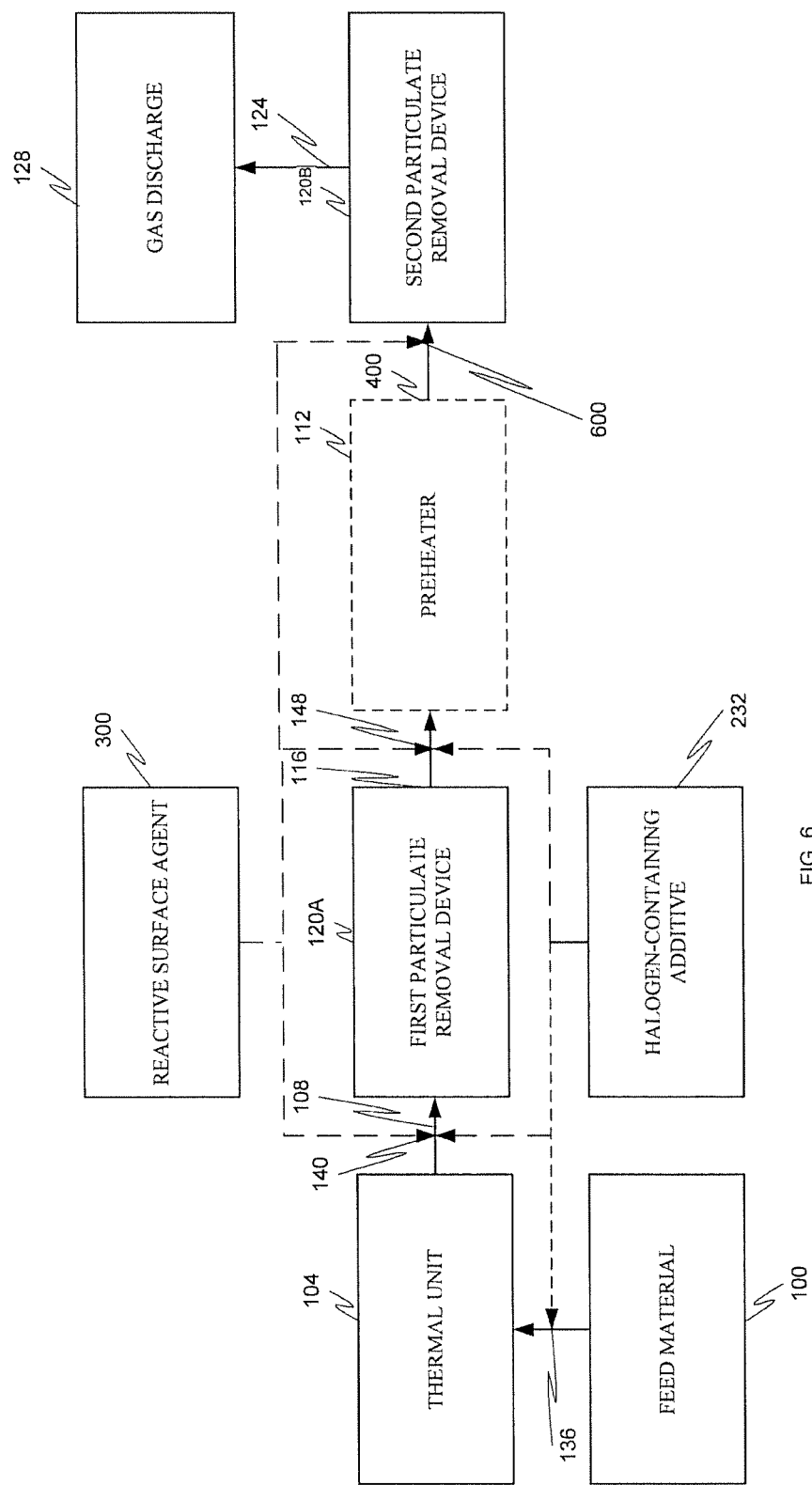
FIG. 6 is a block diagram according to an embodiment.

In another embodiment shown in FIG. 6, the reactive surface agent 300 is introduced at one or more points 140, 148, and/or 600 to the mercury-containing gas stream. The mercury-containing gas stream treatment process includes first and second particulate removal devices 120A and B positioned on either side or on a common side (e.g., downstream) of the preheater 112. Due to the higher reaction/condensation temperature of iodine compared to bromine, the halogen-containing additive 232 can be introduced to the feed material 100, in the thermal unit 104, between the thermal unit 104 and first particulate removal device 120A and/or between the first and second particulate removal devices 120A and B to enable or facilitate removal of a first portion of the evolved elemental and speciated mercury in the mercury-containing gas stream 108. The reactive surface agent 300 may optionally be introduced between the first and second particulate removal devices 120A and B to enable or facilitate removal of additional elemental and speciated mercury in the second particulate removal device 120B. The first portion represents typically at least most of the mercury in the mercury-containing gas stream 108 upstream of the first particulate removal device 120. In one configuration, the reactive surface agent 300 is typically a non-carbon agent due to the high mercury-containing gas stream temperature upstream of the preheater 112.

Figure 5:
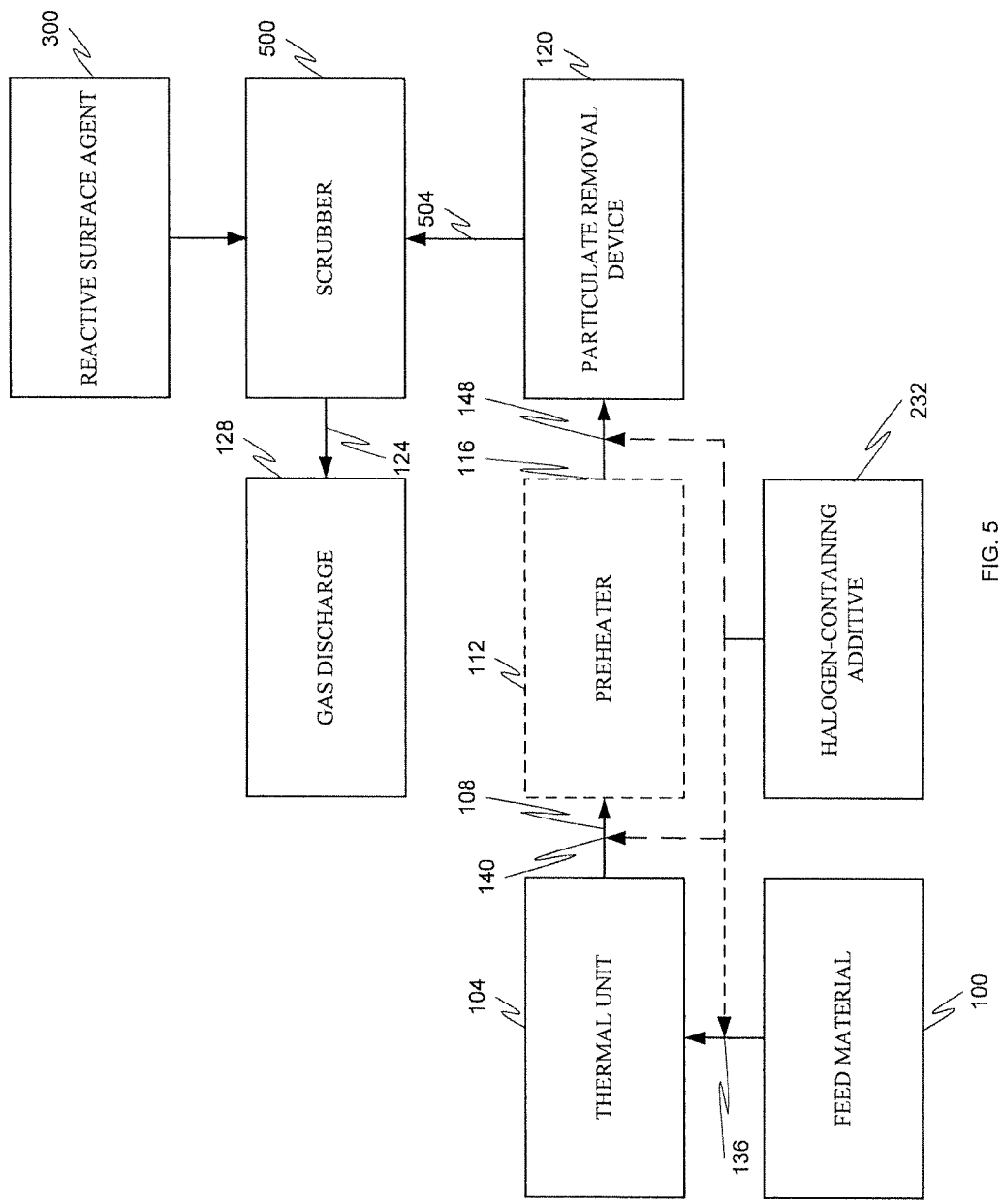
FIG. 5 is a block diagram according to an embodiment.

FIG. 5 shows a mercury-containing gas stream treatment system according to another embodiment.

The treated gas stream 504 is further treated by a scrubber 500 prior to discharge by gas discharge 126 to remove speciated mercury compounds, not removed by the particulate removal device 120, and sulfur oxides. The scrubber 500 is typically a wet scrubber or flue gas desulfurization scrubber. Wet scrubbing works via the contact of target compounds or particulate matter with the scrubbing solution. The scrubbing solution comprises reagents that specifically target certain compounds, such as acid gases. A typical scrubbing solution is an alkaline slurry of limestone or slaked lime as sorbents. Sulfur oxides react with the sorbent commonly to form calcium sulfite and calcium sulfate.

The scrubber 500 has a lower dissolved mercury and/or halogen concentration than conventional treatment systems, leading to less corrosion and water quality issues. Although mercury vapor in its elemental form, $Hg^0$, is substantially insoluble in the scrubber, many forms of speciated mercury and halogens are soluble in the scrubber. Diatomic iodine, however, has a very low solubility in water (0.006 g/100 ml), which is significantly different from (less soluble than) $Cl_2$ and $Br_2$.

Because mercuric iodide is significantly less soluble than mercuric chloride or bromide and because a greater fraction of mercury is removed by particulate removal devices (e.g. baghouse and electrostatic precipitator) prior to the wet scrubber, soluble mercury present in the scrubber slurry will be reduced. As will be appreciated, mercuric chloride and bromide and diatomic chlorine and chloride, due to their high solubilities, will typically build up in the scrubber sludge to high levels, thereby requiring the scrubber liquid to be periodically treated. In addition, mercury contamination of by-product FGD gypsum board is a problem that this disclosure also addresses by reducing mercury present in scrubber slurry.

In some applications, the total dissolved mercury concentration in the scrubber is relatively low, thereby simplifying treatment of the scrubber solution and reducing mercury contamination of by-product materials. Typically, no more than about 20%, even more typically no more than about 10%, and even more typically no more than about 5% of the total mercury in the mercury-containing gas stream is dissolved in the scrubber solution.

As set forth below, test data show that the iodine is surprisingly and unexpectedly effective compared to what was previously thought achievable from injection of halogens including, bromine or chlorine. Whereas other halogens, such as bromine, generally require additive rates between 30 and 100 ppmw of feed material 100, iodine appears to be at least 10 times more effective. Applicant has measured 70 to 90% mercury capture with just 3 ppmw iodine in the feed material.

Figure 10:
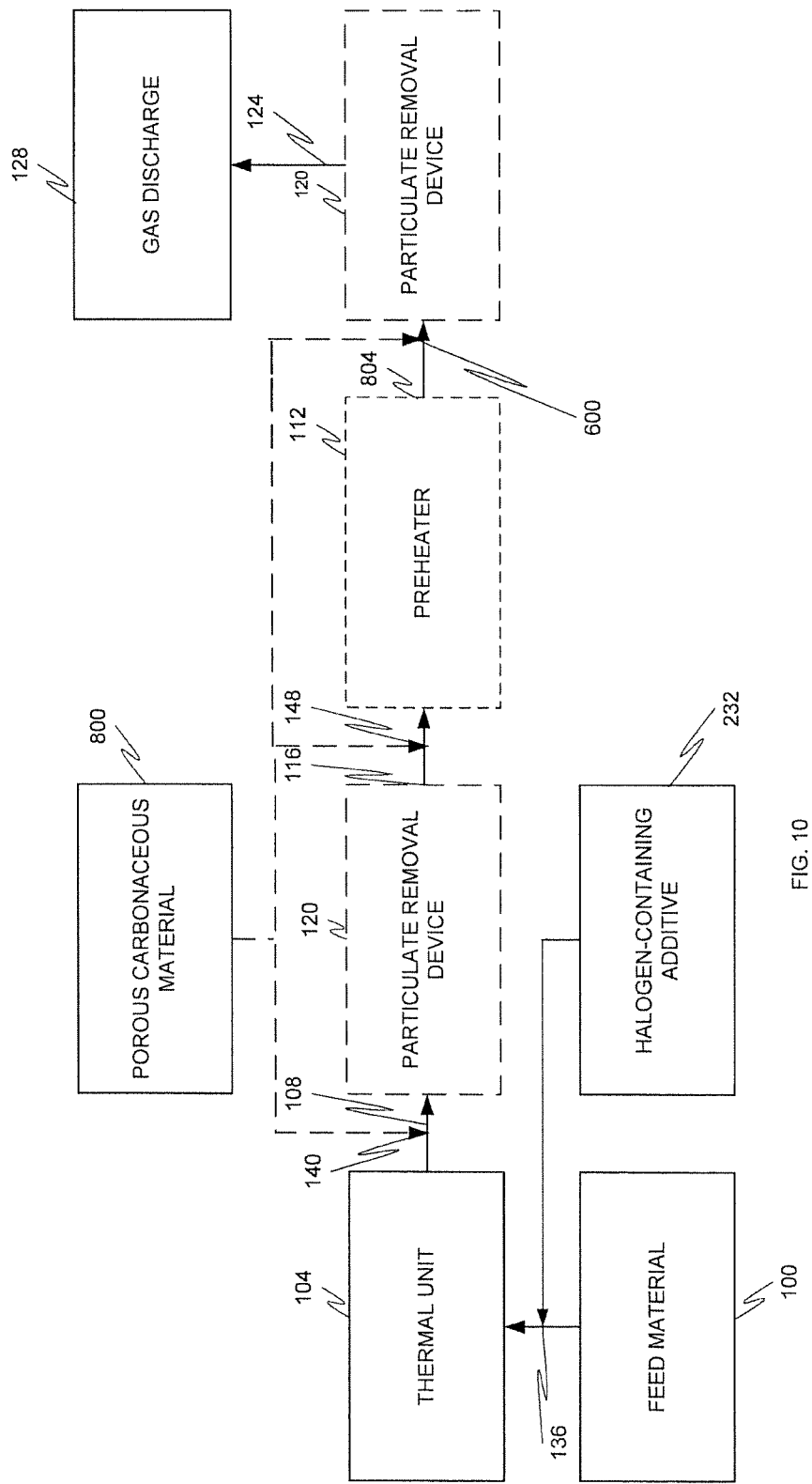
FIG. 10 is a block diagram according to an embodiment.

A further plant configuration is shown in FIG. 10.

A combustible feed material 100 and halogen-containing additive 232 (which may be formed by the process above) are combusted in the thermal unit 104 to produce the mercury-containing gas stream 108. The mercury-containing gas stream 108 is treated by optional (hot-side) particulate removal device 120 to remove at least most of any particulate material in the mercury-containing gas stream 108 and produce a (treated) mercury-containing gas stream 116. The mercury-containing gas stream 116 is passed through optional preheater 112 to produce a cooled gas stream 804. The cooled gas stream 804 is subjected to optional (cold-side) particulate removal device 120 to remove at least most of any particulates in the cooled gas stream 804 and form the treated gas stream 124.

Porous carbonaceous or non-carbonaceous material 800 is introduced, typically by injection, into the mercury-containing gas stream 108 at one or more contact points 140, 148, and 600. The porous carbonaceous or non-carbonaceous material 800 collects gaseous contaminants, including oxidized mercury, speciated mercury, acid gases, and halogens and halides, prior to be removed by the optional particulate removal device 120 and/or 120.

The porous carbonaceous or non-carbonaceous material 800 can be entrained in a carrier gas or in the form of a slurry when introduced, under pressure, into the gas stream. The rate of addition of the porous carbonaceous or non-carbonaceous material 800 to the gas stream typically is in the range of from about 6 to about 0.1, more typically in the range of from about 4 to about 0.25, and even more typically in the range of from about 2 to about 0.5 lb material/MMacf gas.

Figure 11:
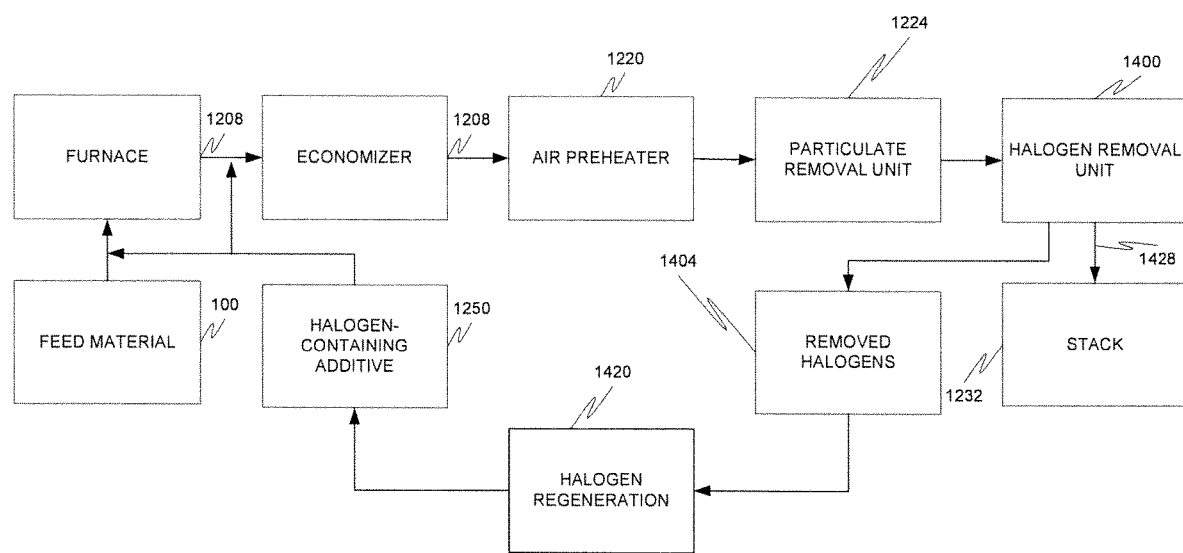
FIG. 11 is a block diagram according to an embodiment.

FIG. 11 depicts a process according to another embodiment. In this embodiment, the unused halogens, particularly bromine, are removed before discharge of the flue gas from the stack 1232. In this manner, the deleterious effects of certain halogens on the environment are avoided.

The combustion stream 1208, before or after the air preheater 1220, is subjected to halogen removal by the halogen removal unit 1400 to remove one or more selected halogens and/or halides. In halogen removal, preferably at least most, more preferably at least about 65%, more preferably at least about 75% and even more preferably at least about 85% of the selected gas phase halogens and/or halides are removed from the flue gas 1208. The halogen removal unit 1400 can be any suitable device, such as a scrubber. Packed bed scrubber (absorber) can be used for halogen and halide removal. Packed bed halogen scrubbers can, for example, use activated alumina or activated charcoal as the scrubbing medium to remove halogens and halides. Examples of such scrubbers include the F5100™, F5200™, and F5300™ series gas scrubbers of Spectra Gases Inc. Wet halogen scrubbers rely on the high solubilities of halogens and halides in aqueous liquids. Virtually all types of wet scrubbers will perform adequately as long as they are properly designed for the HCl, HBr, and/or HF concentrations in the gas stream. The most common type of wet scrubber absorber for HCl and/or HF is the packed tower scrubber. Another type of HCl scrubbing system has a venturi scrubber upstream from the packed bed scrubber to remove particulate matter before it can cause partial pluggage at the bed inlet. In wet scrubbers, it is important to maintain the dissolved concentration of any halogen species below its solubility limit. This can be done by removing a slip stream of the liquid, which is subjected to halogen/halide removal, such as by membrane separation, precipitation, adsorption, and/or absorption. In elemental halogens, such as Br2, an oxidant or reductant can be used to ionize the bromine into species that may be easier to remove from the scrubbing solution. Halogens and halides can also be controlled effectively in spray-dryer-type dry scrubbers and/or dry-injection-type dry scrubbers.

Removed halogens 1404 can be regenerated 1420 for recycle to the halogen-containing additive 1250. Recycle 1420 can require the selected halogen or halide to be converted into a selected halogen species, such as elemental bromine, and/or a specific halogen formulation. For example, substantially all of the chlorine and/or fluorine could be removed from recovered bromine species before the recovered bromine species are recycled. Other dissolved impurities, such as sulfur oxides, nitrogen oxides, and the like, could be removed before recycle. Selective removal of the various species can be, for example, by membrane separation, precipitation, adsorption, and/or absorption.

As a result of halogen removal, the flue gas 1428 has a low concentration of the target halogen and/or halide. Preferably, the concentration of the selected gas phase halogens and/or halides in the flue gas 1428 is no more than about 25 ppm, more preferably no more than about 20 ppm, more preferably no more than about 15 ppm, more preferably no more than about 10 ppm, and even more preferably no more than about 5 ppm.

Figure 12:
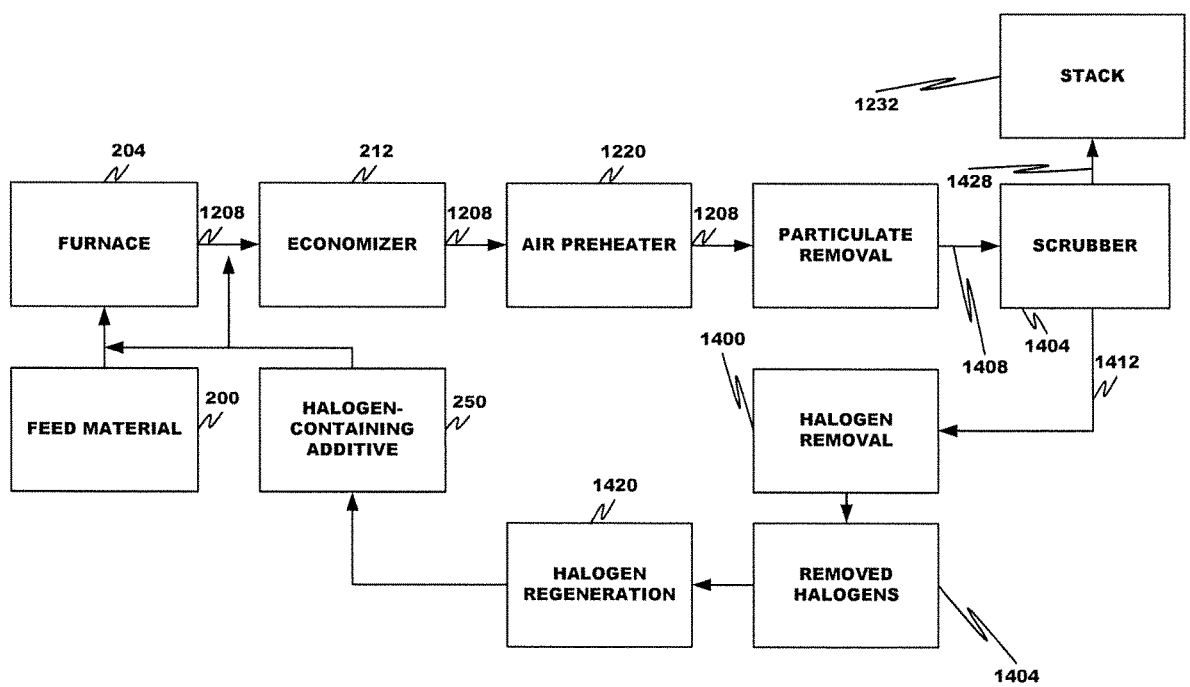
FIG. 12 is a block diagram according to an embodiment.

FIG. 12 depicts a process according to another embodiment. In this embodiment, the unused halogens, particularly bromine, are removed before discharge of the flue gas from the stack 1232. In this manner, the deleterious effects of certain halogens on the environment are avoided.

The combustion stream 1208, before or after the air preheater 1220, is treated by a dry or wet scrubber 1404 to remove typically at least most and more typically at least about 75% of any remaining particulates, acid gases, and halogens/halides in a treated gas stream 1408 to form a scrubbed gas stream 1428. The scrubber slurry 1412 is subjected to halogen removal by the halogen removal unit 1400 to remove one or more selected halogens and/or halides. In halogen removal, preferably at least most, more preferably at least about 65%, more preferably at least about 75%, and even more preferably at least about 85% of the selected halogens and/or halides in the scrubber slurry 1412 are removed from the combustion stream 208.

The scrubber 1404 can be any suitable device. Packed bed scrubber (absorber) can be used for halogen and halide removal. Packed bed halogen scrubbers can, for example, use activated alumina or activated charcoal as the scrubbing medium to remove halogens and halides and acid gas. Virtually all types of wet scrubbers will perform adequately as long as they are properly designed for the HCl, HBr, HF, and/or other acid gas concentrations in the gas stream. The most common type of wet scrubber absorber (or scrubbing medium) for HCl and/or HF is the packed tower scrubber. Another type of HCl scrubbing system has a venturi scrubber upstream from the packed bed scrubber to remove particulate matter before it can cause partial pluggage at the bed inlet. In wet scrubbers, it is important to maintain the dissolved concentration of any halogen species below its solubility limit. This can be done by removing a slip stream of the liquid, which is subjected to halogen/halide removal, such as by membrane separation, precipitation, adsorption, and/or absorption. In elemental halogens, such as $Br_2$, an oxidant or reductant can be used to ionize the bromine into species that may be easier to remove from the scrubbing solution. Halogens and halides can also be controlled effectively in spray-dryer-type dry scrubbers and/or dry-injection-type dry scrubbers.

The aqueous phase halogens and halides are removed from the scrubber slurry 1412 (or scrubber medium) by the halogen removal unit 1400. Dissolved halogens and halides can be removed by any suitable technique including ion exchange resin, solvent extraction, adsorption, absorption, precipitation, membrane filtration, and the like. In one configuration, the halogens and halides are removed by ion exchange and stripped from the ion exchange medium by a stripping solution. In one configuration, the dissolved halogens and halides are removed in an organic solvent, such as a hydrocarbon solvent. Removal is effected based on the relative solubilities of the halogens and halides in two different immiscible liquids, namely the aqueous phase of the scrubbing solution and an organic solvent. In other words, the halogen and/or halide is extracted from one liquid phase into another liquid phase. Extraction can be done by without chemical change, by a solvation mechanism, by an ion exchange mechanism, by ion pair extraction, or by aqueous two-phase extraction. In one configuration, the dissolved halogens and halides are removed by adsorption or absorption onto a carbonaceous medium, such as activated carbon, coke, graphite, and the like.

Removed halogens 1404 can be regenerated 1420 for recycle to the halogen-containing additive 250. Recycle 1420 can require the selected halogen or halide to be converted into a selected halogen species, such as elemental bromine, and/or a specific halogen formulation. For example, substantially all of the chlorine and/or fluorine could be removed from recovered bromine species before the recovered bromine species are recycled. Other dissolved impurities, such as sulfur oxides, nitrogen oxides, and the like, could be removed before recycle. Selective removal of the various species can be, for example, by membrane separation, precipitation, adsorption, and/or absorption.

As a result of halogen removal, the flue gas 1428 has a low concentration of the target halogen and/or halide. Preferably, the concentration of the selected gas phase halogens and/or halides in the flue gas 1428 is no more than about 25 ppm, more preferably no more than about 20 ppm, more preferably no more than about 15 ppm, more preferably no more than about 10 ppm, and even more preferably no more than about 5 ppm.

EXPERIMENTAL

The following examples are provided to illustrate certain embodiments of the invention and are not to be construed as limitations on the invention, as set forth in the appended claims. All parts and percentages are by weight unless otherwise specified.

Experiment 1

A trial of mercury control by addition of coal additives was completed on a cyclone-fired boiler rated at 280 MW gross electricity production, but capable of short-term peak production of 300 MW. The boiler configuration was six cyclone combustors arranged three over three on the front wall. Each cyclone burns approximately 54,000 lb/h of Powder River Basin (PRB) coal at full load. The typical coal sulfur content is 0.3% (dry basis) and the coal ash calcium expressed as CaO (dry basis) averages 20%.

NOx emissions are controlled on this Unit by Overfire Air (OFA) ports located on the rear wall, and by a Selective Catalytic Reduction (SCR) system located upstream of the air preheater. There are no mercury controls on this boiler, but a portion of the mercury released during combustion is retained by unburned carbon particles captured in the electrostatic precipitator.

A liquid-phase iodine-containing additive, that was substantially free of bromine and chlorine, and a solid-phase iron-containing additive were added to the furnace. While not wishing to be bound by any theory, the iodine-containing additive is believed to control Hg emissions by enhancing the amount of particle-bound mercury captured. The iron-containing additive is believed to thicken the molten slag layer contained in the cyclone so that more combustion occurred in the fuel-rich region. Increasing the fuel-rich combustion leads to lower $NO_x$ emissions in the flue gas leaving the boiler. The iodine-containing additive contained from about 40 to about 50 wt. % iodine. The iron-containing additive contained from about 60 to about 70 wt. % total iron, of which from about 30 to about 70 wt. % was ferrous oxide (FeO), and the remaining portion was substantially all either ferrous ferric oxide (magnetite, $Fe_3O_4$), ferric oxide ($Fe_2O_3$), or a mixture thereof. Enrichment of the fly ash with reactive iron may function as a catalyst for heterogeneous mercury oxidation.

Depending on access and/or coal yard operational procedures, the additives were applied to the coal either upstream or downstream of the crusher house. The solid-phase iron-containing additive was provided in granular form that was stored in a bulk storage pile located in close proximity to the iron-containing additive conveying equipment. The iron-containing additive was transferred from the storage pile to a feed hopper via front-end loader and added to the coal belt via a series of screw feeders and bucket elevators.

The liquid iodine-containing additive was delivered in Intermediate Bulk Container (IBC) totes. The liquid material was metered by a chemical pump to a dispensing nozzle at the top of the bucket elevator where it was combined with the iron-containing additive prior to being dropped onto the coal supply belt. The feed rate of both the solid iron-containing additive and the liquid iodine-containing additive was controlled to an adjustable set-point based on the weight of coal being fed on the coal belt. The hopper of the conveyor was filled several times a day during normal operations.

This goal of this trial was to demonstrate 20 percent $NO_x$ reduction and 40 percent mercury reduction over a three-hour period at full load. The test period included several days of operation with and without additive coal treatment. The initial test period was deemed the "Baseline Tests" conducted to quantify the native or untreated Hg emissions in the stack and the baseline NOx emissions. Then, additive treatment using both additives began, and combustion improvements were confirmed by measuring higher cyclone temperatures with an infrared pyrometer. After a few days of operation with both additives, the expected $NO_x$ reduction was recorded during a one-day combustion tuning test designed to demonstrate that the iron-containing additive would allow more aggressive cyclone operation than was previously possible. Boiler performance was monitored carefully during the emissions test to assure that the emission reductions did not cause other problems. Hg reduction was demonstrated using data from a Thermo Fisher Mercury CEM on the stack (downstream from the ESP) and further validated using a modified EPA Method 30-B, "*Determination of Mercury from Coal-Fired Combustion Sources Using Carbon Sorbent Traps*", the Sorbent Trap Method (STM). Finally, the unit was operated for several days in load dispatch mode to demonstrate the long term operability of the treated fuel.

Based on historical coal analyses, the uncontrolled Hg emissions without the iodine-containing additive were expected to vary between 5 and 10 µg/wscm (0.004 to 0.008 ppmw total Hg in flue gas). Uncontrolled emissions calculated from average coal mercury analysis were 6 µg/wscm (0.005 ppmw) at the air preheater outlet. However, due to the high amount of unburned carbon in the fly ash (10-20%) and low flue gas temperatures (<300° F.), there was significant native mercury removal without the iodine-containing additive. During the test period, baseline Hg concentrations as measured at the outlet continuous emission monitor ("CEM") ranged from 1.0 to 1.5 µg/wscm (0.0008 to 0.0013 ppmw).

Prior to iodine-containing additive addition, the total Hg emission averaged about 1.1 µg/wscm (0.0009 ppmw). After this baseline period, both the iron- and iodine-containing additives were added to the coal at various concentrations. The iron-containing additive was added at between about 0.3% and 0.45% by weight of the coal feed. The iodine-containing additive was added at a rate ranging from about 2 to 7 ppmw of the operative chemical to the mass feed rate of the coal. Hg emissions measured at the stack dropped to the range of 0.1 to 0.4 µg/wscm (0.0001 to 0.0003 ppmw). Therefore, Hg reduction ranged from about 60 to 90 percent additional removal compared to the baseline removal with just the high-UBC fly ash, with an average of 73 percent additional reduction when the additive rate was optimized. Overall mercury removal based on the uncontrolled mercury concentration from coal mercury was more than 95%. Table 1 summarizes the results achieved at each iodine treatment rate.

The STM results confirmed the Hg-CEM results. Three pairs of baseline mercury ("Hg") samples were obtained. The Hg concentrations ranged from about 1.1 to 1.6 µg/wscm (0.0009 to 0.0013 ppmw), with an average of 1.36 µg/wscm (0.0011 ppmw). Three pairs of sorbent traps were also pulled during iodine-containing additive use. These Hg values ranged from about 0.3 to 0.4 µg/wscm (0.0002 to 0.0003 ppmw), with an average of 0.36 µg/wscm (0.00026 ppmw). The average Hg reduction, compared to baseline mercury removal, as determined by the STM Method, was 73 percent, exactly the same as the additional Hg reduction determined by the Hg-CEM.

Even though the electrostatic precipitator was already removing about 71 percent of the Hg without iodine addition, treatment with the iodine-containing additive caused removal of an additional 73 percent of the Hg. With iodine addition, the total Hg removal based on the Hg content of the coal was 96 percent with a treatment rate of 7 ppmw iodine to the feed coal. Surprisingly, with a treatment of just 2 ppmw iodine and added iodine/mercury molar ratio of only 30, the total mercury removal was 90%.

TABLE 1

Experiment 1, Results with SCR[1,2]

| Iodine Addition to Coal (ppmw) | Added Iodine/Hg Molar Ratio | Uncontrolled Mercury (µg/wscm)[1] | Controlled Mercury (µg/wscm) | Mercury Removal above Baseline (%) | Total Mercury Removal (%) |
|---|---|---|---|---|---|
| 0 | 0 | 4.0 | 1.1 | 0% | 71% |
| 7 | 106 | 4.0 | 0.15 | 86% | 96% |
| 5 | 75 | 4.0 | 0.2 | 82% | 95% |
| 3 | 45 | 4.0 | 0.3 | 73% | 93% |
| 2 | 30 | 4.0 | 0.4 | 64% | 90% |

[1]Average uncontrolled mercury concentration based on average coal analysis of 72 ng/g at full load coal rate and APH outlet gas flow.
[2]Unit load was 280 MW or more for all of the tests with gas temperature at the APH outlet ranging from about 285 to 300° F.

Experiment 2

Further mercury control testing on the cyclone boiler described above was completed during summer while the SCR unit was out of service and the flue gas redirected around the SCR unit such that the flue gas was not exposed to the SCR catalytic surface. During the tests described, only the iodine-containing additive was applied and the iron-containing additive feed system was entirely shut down. Mercury stack emissions were monitored by the unit mercury CEM as previously discussed.

Testing was performed over a period of two months at several different concentrations of iodine-containing additive and with a bromine-containing salt added onto the coal belt. A reference condition with no coal additives applied was also tested. Test coal during the entire period was the same as for previous testing, an 8,800 BTU PRB coal. Flue gas temperatures measured at the air preheater outlet varied from 320 to 350° F., significantly higher than during the previous tests described in Experiment 1. For this coal, a number of coal mercury analyses averaged 71.95 ng/g total mercury content. This average coal value was used as the basis for mercury removal percentages at all conditions over the entire unit from boiler to stack. Note that there may have been some variation in coal mercury by coal shipment even though the same mine supply was maintained throughout the tests.

Each test condition was monitored for a period of days to a full week to ensure that the coal supply to each of the cyclones was 100% treated and mercury emissions were stabilized. Table 2 summarizes the data obtained with the unit at full load conditions. The iodine-containing additive was applied at the listed concentrations. The bromine-containing additive was applied at two concentrations.

The bromine-containing additive treatment also increased mercury removal from 77 to 83% compared to 51% with no treatment. This result was unexpected on the basis of previous experience and industry understanding from other test sites. The expectation was that a significantly higher level of bromine addition would be required to realize a high rate of mercury removal. Higher UBC carbon in the cyclone boiler ash may be responsible for the excellent bromine performance with no SCR, but data on real-time in-situ UBC was not available to confirm this hypothesis.

Since mercury emission was measured at the stack, the speciation and form of mercury upstream was not explicitly

TABLE 2

| Experiment 2, Results with SCR Bypassed[1,2] | | | | | |
|---|---|---|---|---|---|
| Iodine or Bromine Addition to Coal (ppmw) | Added Iodine or Bromine:Hg Molar Ratio | Uncontrolled Mercury (μg/wscm)[1] | Controlled Mercury (μg/wscm) | Mercury Removal above Baseline (%) | Total Mercury Removal (%) |
| 0 | 0 | 6.0 | 2.9 | 0% | 51% |
| 20 | 302 | 6.0 | 0.5 | 83% | 92% |
| 12 | 181 | 6.0 | 0.9 | 69% | 85% |
| 8 | 121 | 6.0 | 1.1 | 62% | 82% |
| 6 | 91 | 6.0 | 0.9 | 69% | 85% |
| 15 (Br) | 359 (Br) | 6.0 | 1.0 | 66% | 83% |
| 6 (Br) | 144 (Br) | 6.0 | 1.4 | 52% | 77% |

[1]Average uncontrolled mercury concentration based on average coal analysis of 72 ng/g at full load coal rate and APH outlet gas flow.
[2]Unit load was 280 MW or more for all of the tests with gas temperature at the APH outlet ranging from 320 to 350° F.

During the tests, the unit fly ash UBC percentage varied from 6% to 25% as measured post-test by fly ash taken from the electrostatic precipitator hoppers. Exact UBC during each test could not be determined based on hopper UBC content post-test, since hopper ash may not be entirely evacuated until days after it is removed from the ESP collection plates. Flue gas temperature at the inlet to the particulate control (ESP) varied from about 320 to 350° F. This was higher than the previous tests with the SCR in service, primarily due to summer vs. winter ambient conditions and the need to maintain peak load for extended periods.

Mercury removal, as calculated by the total from coal analysis to measured outlet mercury CEM, varied from 85 to 92%. With no treatment, mercury removal was approximately 51%.

This result shows that treatment by the iodine-containing additive is effective at higher process temperatures (e.g., from about 320 to 350° F. at the ESP inlet) and without the benefit of an SCR catalyst.

Higher UBC is known to assist with native mercury capture by physisorption of oxidized mercury onto UBC carbon. However, at greater than 320° F., the physisorption of vapor mercury declines significantly. Thus, the addition of the iodine-containing additive, by itself, with no SCR catalysis effect was shown to improve higher temperature mercury removal to 90% or higher, but the form of mercury removed (particle-bound or vapor species) was not determined.

measured, so the differences in mercury speciation as a result of iodine and bromine treatment were not evaluated by these tests.

Experiment 3

A series of tests were performed at Site A, a 360 MW coal-fired power plant firing Powder River Basin ("PRB") coal. The tests compared mercury removal when iodine was added to the coal at two concentrations (Experiment 3) and when a bromide additive was applied to the PRB coal (Experiment 4). The plant was firing 100% PRB coal before the tests began. The plant was equipped with a lime spray dryer ("SDA") followed by a fabric filter ("FF") baghouse (collectively "SDA/FF") for control of $SO_2$ and particulates. During the trial, semi-continuous mercury analyzers were located at the outlet of the air preheater upstream of the SDA and FF baghouse at the stack outlet.

The iodine content of the coal feed was provided by coal blending. Two blend ratios of PRB Black Thunder coal ("Black Thunder" or "BT") and higher iodine coal ("Coal B") were tested to evaluate the influence of the bituminous coal on mercury removal by native fly ash. The first blend ratio was nominally 92.7% Black Thunder and the balance was Coal B. The second blend ratio consisted of 85.6% Black Thunder and the balance Coal B. Coal sulfur content for both blends was 0.4% dry basis. Coal ash calcium (CaO, dry basis) was 17.2% for the first and 18.4% for the second blend. The unit operated normally during the week except that one of the five coal mills, Mill C, was out of service.

Figure 7:
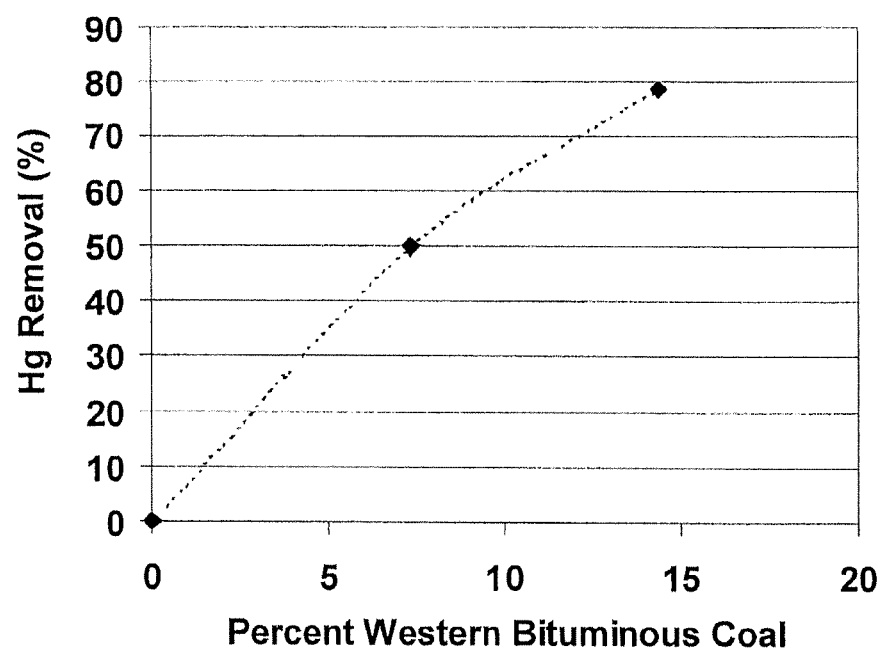
FIG. 7 is a plot of total mercury emissions (μg/wscm) (vertical axis) against time (horizontal axis)

Vapor-phase mercury concentrations were monitored at the outlet of the air preheater on the A-side of the unit and at the stack. A summary of the tests, including the blending ratios and the average mercury concentrations, is presented in Table 3 and FIG. 7. There were some operational problems associated with the inlet mercury analyzer immediately prior to beginning the first coal blending test that may have compromised the inlet concentrations measured. Therefore, a triplicate set of EPA Draft M324 (sorbent trap) samples were collected at the preheater outlet location for secondary mercury measurement. During the second test, simultaneous M324 samples were collected at the air pre-heater and stack.

During testing with NaBr injection, the unit was burning coal from the Jacobs Ranch mine. At normal operating conditions, the coal yielded a total vapor-phase mercury concentration of about 18 to about 22 µg/Nm$^3$ at the outlet of the air preheater with 70-90% in elemental form. During the chemical additive tests, the fraction of elemental mercury at the air preheater outlet decreased to about 20-30%.

Although the fraction of oxidized mercury at the inlet of the SDA increased substantially, no increase in mercury removal across the system was noted. The fraction of oxidized mercury at the outlet of the fabric filter was also

TABLE 3

Vapor-Phase Mercury during Coal Blending Tests at Site A

| Test Coal | Inlet Hg (µg/Nm$^3$) | Inlet Hg$^0$ (µg/Nm$^3$) | Outlet Hg (µg/Nm$^3$) | Outlet Hg$^0$ (µg/Nm$^3$) | Iodine enrichment (ppmw of coal feed) | Total Iodine (ppmw of coal feed) | Hg Removal (%) |
|---|---|---|---|---|---|---|---|
| 100% JR PRB | 9.8 | 8.1 | 10.4 | 9.6 | 0.0 | 0.4 | −6$^b$ |
| 7.3% Coal B 92.7% BT | NA (7.24)$^{M324}$ | 7.7 | 3.6 | 3.3 | 0.4 | 0.8 | NA$^a$ (50)$^{M324}$ |
| 14.4% Coal B 85.6% BT | 5.8 (5.28)$^{M324}$ | 5.4 | 1.4 (0.97)$^{M324}$ | 1.4 | 0.7 | 1.1 | 76 (81)$^{M324}$ |

All concentrations shown corrected to 3% molecular oxygen.

$^a$Analyzer operational problems-data suspect $^b$Analyzer calibration drift, 0% Hg removal.

$^{M324}$Mercury concentration measured with EPA Draft M324

There was no measurable vapor-phase mercury removal measured while firing 100% Jacobs Ranch coal. At the first blend ratio, the mercury removal across the SDA-FF increased to 50%. The mercury removal during the second blend test increased to 76% (81% based upon M324 sorbent trap samples).

Coal B samples were tested for mineral and halogen constituents after the trial. Coal B samples were tested at 4.9 ppmw iodine in the coal by neutron activation analysis (NAA). The baseline PRB samples typically average 0.4 ppmw iodine. The resulting enrichment of iodine is shown in Table 2 above.

Experiment 4

One additional test at Site A was to add sodium bromide (NaBr) to the coal to increase the bromine concentration in the flue gas in an attempt to enhance mercury capture. No activated carbon was injected during this test.

NaBr was applied to the coal at the crusher house prior to entering the transfer house and coal bunkers. At this chemical injection location, it was estimated that it would take 4-5 hours before the "treated" coal would be fired in the boiler. The chemical additive was applied to the coal continuously for a period of 48 hours prior to injecting activated carbon to ensure that the entire system was "conditioned" with the additive.

lower (nominally 80% elemental mercury compared to typically >90% elemental mercury when NaBr was not present with the coal).

Experiments 3 and 4 illustrate the difference between the two halogen additives. In the case of iodine added by means of the blend coal, the mercury was being removed across the SDA-FF at up to 76% of total mercury, even though there was less than 1% UBC content in the ash/spray dryer solids. In the case of the bromine additive, there was increased vapor oxidized mercury at the SDA inlet but mainly elemental vapor mercury measured at the outlet with no increased mercury capture. In combination with iodine treatment on the coal, the SDA-FF provides fine spray solids and full mixing in a temperature range where heterogeneous reaction can occur.

Experiment 5

Coal blending tests were completed at other PRB coal-fired power plants, using various western bituminous coals in blend ratio to PRB of up to 20%. The results are shown in Table 4 below. None of the western bituminous blend coals in these trials that exhibited any significant mercury removal except the Coal B that is described in Experiments 3 and 4 above.

TABLE 4

Results of Western Bituminous Blend Tests For Mercury Control

| Test/Unit | Blend Coal in PRB | APC Equipment | UBC Carbon (% of ash) | Blended Coal Iodine ppm | Mercury Removal (%) |
|---|---|---|---|---|---|
| Site B | ColoWyo, 20% | SDA/ESP | <1.0 | <0.5 [1] | 0 |
| Site B | TwentyMile, 16% | SDA/ESP | 0.6 | <0.5 [1] | 0 |

[1] Native iodine in western bituminous coals typically is less than 0.5 ppmw.
SDA—Spray Dryer Absorber, $SO_2$ Control
ESP—Electrostatic Precipitator Experiment 6

Another test site for coal blending, Site D, fires subbituminous PRB coal and is configured with low-NOx burners and selective catalytic reduction ("SCR") unit for NOx control, a spray dryer absorber ("SDA") for $SO_2$ control, and a fabric filter ("FF") for particulate control. The test matrix included evaluating each coal at 7% and 14% higher iodine coal (Coal B) mixed with a balance of PRB. Each blend test was scheduled for nominally 16 hours with eight hours of system recovery time between tests. Coal A had a native iodine content of less than about 0.5 ppmw while coal B had a native iodine content of about 4.9 ppmw. Coal A sulfur content was 0.6 to 0.8%, dry basis. The blend coals averaged 0.65% sulfur. The coal ash calcium content, based on typical analysis of Coals A and B, was between 17 and 20% (CaO, dry basis).

For the first blend test (Coal B at 7.2%), there was a significant decrease in both the SDA inlet and stack mercury concentrations at the beginning of the test. However, there was no increase in oxidized mercury ($Hg^{+2}$), which would suggest that, if this decrease were due solely to the coal blend, mercury removal occurred in the particulate phase before reaching the SDA inlet sampling location. Based on this assumption, the mercury removal for the first test was about 50%, calculated using the mercury concentration at the beginning of the test and at its lowest point during the test. If removal is calculated strictly based on SDA inlet and outlet mercury concentrations, then removal increased from 10% to 27% due to coal blending.

During the second test (Coal B at 13.2%), the stack mercury levels gradually decreased, but the inlet did not. Based on the SDA inlet and stack concentrations, the mercury removal for the second test increased from about 15% to 51%. The iodine content of the coals was not analyzed at the time of testing, but the iodine content of Coal B has since been analyzed. Iodine enrichment compared to the baseline PRB coal was approximately 0.7 ppmw at the 14% blend ratio, based on typical iodine analysis for Coal B. The iodine/mercury molar ratio was approximately 30. Surprisingly, mercury removal was more than 50% even at this low additive rate.

Experiment 7

A trial of mercury control when firing an iodine treated coal was completed on a 70 MW, wall-fired unit firing a Powder River Basin coal. The purpose of this test was to compare the mercury removal of the treated coal product on mercury emissions compared to the identical coal at the same process conditions without treatment. The coal was treated remotely by application of an aqueous iodine-containing solution by spray contact with the coal. A unit train was loaded with about half untreated and half treated coal. The level of treatment based on coal weight and chemical applied was 7.6 ppmw of iodine in the as-loaded coal. The concentrated chemical spray was applied to substantially all of the coal and was well-distributed.

At the power plant, the untreated coal from this unit train was fired for six days and then the first treated coal was introduced. Treated coal was then burned exclusively in this unit for another seven days. Coal sulfur content averaged 0.35%, dry basis. Coal ash calcium content was 20.9%, dry basis, CaO.

Coal samples taken at the plant from the coal feed to the boiler were analyzed for halogen content by neutron activation analysis (NAA). Samples during the baseline period averaged 26.0 µg/g chlorine as-received, 1.2 µg/g bromine and 0.4 µg/g iodine. Samples taken while firing treated coal averaged 18.9 µg/g chlorine as-received, 1.1 µg/g bromine and 3.0 µg/g iodine. The results for iodine indicated loss during transit and handling (7.6 µg/g as loaded and 3.0 as-received). However, the coal sampling and analytical frequency was lower than necessary to conclusively determine this.

The plant pollution control equipment consisted of a cold-side electrostatic precipitator operating at an inlet flue gas temperature of 360° F. to 400° F. The level of unburned carbon (loss-on-ignition) was 0.7% or essentially none in the PRB fly ash. In addition, the mercury speciation as measured by the outlet mercury monitor was initially almost all elemental mercury. These conditions were expected to be extremely problematic for conventional mercury control such as activated carbon injection (ACI) or bromine treatment of coal. For ACI, the temperature was too high for substantial elemental mercury sorption except at higher injection rates with halogenated activated carbon. This would be expensive and would add carbon detrimentally into the fly ash. Bromine treatment of coal would be expected to increase the oxidation of mercury when applied as typically practiced at 30 to 100 ppm on the coal, but the lack of unburned carbon in the fly ash would limit capture of the oxidized mercury species. It would not be unexpected to see no mercury capture for this condition with bromine added to the coal.

A modular rack Thermo Fisher mercury continuous emission monitor (Hg-CEM) was installed at the ESP outlet (ID fan inlet) to measure the total and elemental mercury in the flue gas. The monitor directly read mercury concentration in the flue gas on one-minute average intervals in units of micrograms mercury per standard cubic meter of flue gas, wet basis (µg/wscm).

The treated coal first reached the boiler from only one of 3 bunkers and the mercury concentration at full load rapidly decreased from 5 to 2.6 µg/wscm (0.0041 to 0.0021 ppmw in the flue gas) or about 50% reduction. After all the coal feed switched to treated, the mercury decreased slightly more and remained lower. Overall, the average baseline mercury concentration measured at the stack outlet when initially burning the coal with no iodine treatment was about 5.5 µg/wscm (0.0045 ppmw) at high load above 70 MW and 1.7 µg/wscm (0.0014 ppmw) at low load of about 45 MW. When firing treated coal, the high load Hg concentration averaged about 2.6 µg/wscm (0.0021 ppmw) and the low load about 0.8 µg/wscm (0.0006 ppmw). The use of treated coal reduced mercury emission by about 53%. In addition, episodes of extreme mercury spikes during high temperature excursions related to soot blowing were substantially eliminated. After the unit came back from an outage, the regular coal feed (untreated) was resumed and the mercury emissions returned to baseline of about 5.5 µg/wscm (0.0045 ppmw) at full load.

In addition to reducing the total mercury by converting to a particulate form, the additive also appears to have converted the majority of the remaining vapor phase mercury to an oxidized form. This creates an opportunity to obtain additional mercury capture with the injection of a low-cost untreated sorbent. If the mercury were not converted to an oxidized form, additional trimming of the mercury emissions would require a more expensive brominated sorbent.

In order to further validate the mercury measurements, a set of independent emissions tests were completed using a sorbent trap method (EPA Method 30B). The sorbent trap emissions agreed well with the Hg-CEM throughout the trial.

Total mercury removal in this trial was more than 50% for a difficult process condition (PRB coal, gas temperature 350 to 400° F., no UBC and undersized electrostatic precipitator) for which zero or minimal removal would be expected by either injection of activated carbon or bromine treatment of feed coal.

Experiment 8

A trial of mercury control by addition of coal additives was completed on a cyclone-fired boiler rated at 600 MW gross electricity production, but capable of short-term peak production of 620 MW. The boiler configuration was 14 cyclone combustors arranged three over four on the front and rear walls. Each cyclone burns approximately 50,000 lb/h of Powder River Basin (PRB) coal at full load. The coal sulfur content was 0.3% (dry basis) and the coal ash calcium content (CaO) averaged 22% (dry basis).

$NO_x$ emissions are controlled on this unit by Overfire Air (OFA) ports located on the front and rear walls, and by a Selective Catalytic Reduction (SCR) system located upstream of the air preheater. There are no Hg controls on this boiler, but a portion of the mercury released during combustion is retained by unburned carbon particles captured in the electrostatic precipitator.

A liquid-phase iodine-containing additive, that was substantially free of bromine and chlorine, and a solid-phase iron-containing additive were added to the furnace. The additives were applied to the coal upstream of the crusher house. The solid-phase iron-containing additive was provided in granular form that was stored in a bulk storage pile located in close proximity to the iron-containing additive conveying equipment. The liquid iodine-containing additive was delivered in Intermediate Bulk Container (IBC) totes. The liquid material was metered by a chemical pump to a dispensing nozzle at the top of the bucket elevator where it was combined with the iron-containing additive prior to being dropped onto the coal supply belt. The feed rate of both the solid iron-containing additive and the liquid iodine-containing additive was controlled to an adjustable set-point based on the weight of coal being fed on the coal belt.

The test period included several days of operation with and without additive coal treatment. The initial test period was deemed the "Baseline Tests" conducted to quantify the native or untreated Hg emissions in the stack and the baseline $NO_x$ emissions. Then, additive treatment using both additives began.

Mercury reduction was demonstrated using data from a Thermo Fisher Mercury CEM on the stack (downstream from the ESP). Based on historical coal analyses, the uncontrolled Hg emissions were expected to vary between 5 and 10 µg/wscm. Coal mercury content was analyzed during the trial and averaged 68.7 ng/g. Based on this and the flue gas flow rate, the expected mercury concentration in the flue gas at the air preheater outlet was 5.8 µg/wscm (0.0005 ppmw).

Due to the high amount of unburned carbon in the fly ash (10-20%) and low flue gas temperatures (<300° F.), there was significant native mercury removal without the iodine additive. During the baseline period, vapor-phase Hg concentrations as measured by the stack outlet Hg-CEM ranged from 0.2 to 1.1 µg/wscm (0.0002 to 0.0009 ppmw) with an average of about 0.6 µg/wscm. Iodine was then added to the coal feed at various concentrations and mercury emissions dropped to the range of 0.03 to 0.13 µg/wscm (0.00002 to 0.0001 ppmw). Overall mercury removal, coal pile to stack, at this condition was >98%. Additional mercury reduction from the baseline condition ranged from 78 to 95 percent, with an average of 78 percent reduction at a feed rate equivalent to 3 ppm by weight of iodine on the coal.

Sorbent Trap method (STMs) using a modified EPA Method 30-B were conducted during baseline tests to substantiate the Hg-CEM measurements. The STMs all agreed with the Hg-CEM agreed within specified limits (% Relative Accuracy<20%). During additive injection, STMs were not conducted at the extremely low mercury conditions, due to the prohibitively long STM sample times in order to collect enough mercury to be above the detection limit of the analysis.

This experiment demonstrates the ability to economically achieve a critical 90% mercury removal with only 3 ppmw iodine in combination with iron additive added to the coal feed, without the need for expensive additional mercury control equipment.

TABLE 5

Experiment 8 Results

| Iodine Addition to Coal (ppmw) | Added Iodine/Hg Molar Ratio | Uncontrolled Mercury (µg/wscm)[1] | Controlled Mercury (µg/wscm) | Mercury Removal above Baseline (%) | Total Mercury Removal (%) |
|---|---|---|---|---|---|
| 0 | 0 | 5.8 | 0.6 | 0% | 90% |
| 3 | 47 | 5.8 | 0.13 | 78% | 98% |

[1]Average uncontrolled mercury concentration based on average coal analysis of 69 ng/g at full load coal rate and APH outlet gas flow.

Experiment 9

The objective of three tests, described below, was to assess the stability of elemental iodine adsorbed on a porous carbonaceous material (i.e., activated carbon) by exposing the loaded carbon to different temperatures for extended periods of time.

In the first test, elemental iodine was formed by oxidizing 1000 ppm iodide solution by acidifying it, and adding a small amount of hydrogen peroxide. The iodine solution was then passed through a bed of activated carbon in a filter funnel. The carbon is considered to be loaded when the yellow color of iodine in water breaks through the carbon bed. Four hundred twenty five milligrams of iodine per gram of carbon was adsorbed on Sabre™ powdered activated carbon ("PAC") with this method.

The loaded carbon was dried, and a weighed amount placed in an Erlenmeyer flask with the neck plugged with a filter paper saturated with soluble starch solution. The temperature of the flask was raised to ~50° C. and held for one hour. Only a faint purple color developed on the starch paper indicating that only a trace of iodine was driven off the carbon at this temperature In a second test, Sabre™ PAC was loaded with iodine using the iodine number procedure. This test indicated that 1,079 mg of iodine was sorbed per gram of carbon. Note that in this procedure the carbon filter cake is not washed; thus some the iodine can be held interstitially and is not strictly sorbed to the carbon.

A slight purple color formed on the starch paper at a temperature of 30° C. and significant color and small iodine crystals developed on the paper when the temperature reached 50° C. The temperature was raised to about 80° C., and dense iodine vapors formed above the carbon.

Once cooled, a 0.25 gram portion was reacted with 50 ml of an alkaline hydrogen peroxide solution for 15 minutes to remove the iodine from the carbon by reducing it to iodide. The percentage of iodine retained on the carbon after heating to ~80° C. was calculated to be about 200 mg/g of carbon.

In a third test, an iodine solution was made so that up to 500 mg/g was available when reacted with two grams of Sabre™ PAC. After washing, filtering, and drying, a portion was analyzed to determine the amount of iodine adsorbed. About 360 mg $I_2$/g carbon was adsorbed.

The method of stripping the iodine from activated carbon by reducing it to iodide with hydrogen peroxide appears to be quantitative as tests performed on the stripped carbon with isopropyl alcohol, which has previously been shown to strip iodine from activated carbon, were negative.

Another portion of the loaded carbon was heated to 50° C. and held at that temperature for 1.5 hours with only a small amount of iodine liberated as indicated by the starch paper. The carbon was cooled and stripped of iodine. The iodide concentration of the strip solution was measured. The amount of iodine retained by the carbon after heating to 50° C. was found to be 280 mg $I_2$/g Sabre™ PAC.

Another portion of iodine loaded carbon was heated to more than 80° C. to drive off more iodine, and the carbon analyzed as in the above paragraph. The amount of iodine retained after this extreme heating was 320 mg $I_2$/g Sabre™ PAC.

These tests indicate that Sabre™ PAC holds between 200 and 300 mg of iodine per gram of carbon with sufficient tenacity to be stable up to about 80° C. and greater amounts are fairly stable at 25° C.

Significantly, loadings of up to 360 mg/g were achieved. In later tests with some high microporosity carbons, loadings of 50 to 100% were obtained. While the iodine becomes less energetically adsorbed and may evolve some vapor off the carbon at very high loadings, these tests demonstrate that a high quality carbon can be used since the quantities required are no more than about 3 lbs. per lb. of iodine. Also, in some configurations, the iodine could be desorbed off the carbon and into the flue gas by heating, for example, and the carbon re-used.

Experiment 10

A trial was conducted to evaluate mercury removal at a 450 MW coal-fired cyclone boiler during treatment of coal with an iodine-containing additive. The plant was configured with an SCR, rotary air preheater (APH) and a cold-side ESP. The plant was burning a mixture of 85% PRB and 15% low-sulfur Eastern bituminous coal. Coal sulfur content was 0.4%, dry basis and coal ash calcium content was about 17% as CaO, dry basis.

A liquid-phase iodine-containing additive, substantially free of bromine and chlorine, was added to the coal at 6 to 13 ppm by weight of halogen to the coal feed for a period of three days. Total and speciated mercury (elemental and oxidized) was measured continuously using a Thermo Fisher Mercury CEM on the stack (downstream from the ESP). Prior to halogen addition, the total mercury was 2 µg/wscm and the oxidized mercury fraction was approximately 50%. Iodine was added to the coal at a first rate of 6 $ppm_w$ and then at a second rate as high as 13 $ppm_w$. Injection of halogen immediately increased the Hg oxidation at the stack from 50% to 90%. However, total mercury emissions as measured at the stack were not substantially affected even after 3 days of injection. Table 6 summarizes the trial results.

TABLE 6

Experiment 10 Results

| Iodine Addition to Coal (ppmw) | Total Mercury (µg/wscm)[1] | Oxidized Mercury (%) | Mercury Removal above Baseline (%) |
|---|---|---|---|
| 0 (Baseline) | 2.0 | 30-60 | 0% |
| 6 | 1.5-2.0 | 70-90 | <25% |
| 13 | 1.5-2.0 | 90-100 | <25% |

The $SO_2$ emissions during the testing were monitored by the stack continuous emission monitors. The $SO_2$ emissions during the trial were 0.75 to 0.8 lb/MMBtu. The air preheater exit temperature fluctuated between about 260° F. at 350 MW and 320° F. at 450 MW. The oxidation rate of $SO_2$ across the SCR was estimated to be 1.9% at full load and 0.3% at low load, based on prior measurements of $SO_3$ made at the SCR inlet and outlet. The formation and deposition of $SO_3$ through the SCR to the stack was modeled to estimate $SO_3$ concentrations after the SCR at low load and full load. At full load, the $SO_3$ at the APH outlet was estimated to be about 7 ppmvd, but at low load (350 MW), less than 1 ppmvd. Table 7 summarizes the model results.

TABLE 7

| $SO_3$ Model Prediction for 85% PRB blend | | |
|---|---|---|
| Load, MW | 450 | 350 |
| ESP Inlet Temperature | 320 | 260 |

TABLE 7-continued

SO₃ Model Prediction for 85% PRB blend

SO₃, ppmvd at 3% O₂

| | | |
|---|---|---|
| SCR inlet | 2.9 | 2.9 |
| SCR outlet | 11.3 | 4.2 |
| ESP inlet | 6.9 | 0.4 |
| Stack | 4.4 | 0.3 |

The SO₃ at the outlet of the APH (ESP inlet) is lower at low load for two reasons (1) lower temperatures in the SCR mean less SO₂ will be oxidized and (2) lower temperatures at the APH outlet mean more removal of SO₃ across the APH. At low load with iodine treatment of the coal, reduced SO₂ to SO₃ oxidation plus reduced ammonia for deNOx, the mercury was 100% oxidized. At full load, however, there was an excess of SO₃ of as much as 7 ppm$_v$ that blocks mercury reaction on ESP fly ash surface sites.

Doubling the rate of halogen coal additive in this case increased the mercury oxidized fraction, but was not effective in increasing mercury removal (due to the excess SO₃). This trial illustrates again that very low levels of halogen (6 ppmw of coal feed) are required with SCR to oxidize the majority of mercury, but it also demonstrates the sensitivity of mercury capture to SO₃ levels at the ESP and, in this case, the undesirable SO₂ to SO₃ oxidation occurring in the SCR. Even though a low-sulfur coal is being fired, the overall emissions of SO₂ is low and the mercury is present almost entirely in an oxidized form when a halogen coal additive is present, the catalytic formation of SO₃ across the SCR and its deposition on mercury capture surfaces, especially in the ESP, are still very detrimental to mercury retention in the fly ash.

A number of variations and modifications of the disclosure can be used. It would be possible to provide for some features of the disclosure without providing others.

For example in one alternative embodiment, coal containing naturally high concentrations of iodine (e.g., greater than about 2 ppmw, even more typically greater than about 3 ppmw, and even more typically greater than about 4 ppmw) is blended with the feedstock coal having no or low concentrations of iodine (e.g., no more than about 2 ppmw and even more commonly no more than about 1 ppm by weight) to increase mercury removal. The coal, when fired, can have high or low UBC content without adversely impacting mercury removal.

The present disclosure, in various aspects, embodiments, and configurations, includes components, methods, processes, systems and/or apparatus substantially as depicted and described herein, including various aspects, embodiments, configurations, subcombinations, and subsets thereof. Those of skill in the art will understand how to make and use the various aspects, aspects, embodiments, and configurations, after understanding the present disclosure. The present disclosure, in various aspects, embodiments, and configurations, includes providing devices and processes in the absence of items not depicted and/or described herein or in various aspects, embodiments, and configurations hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more, aspects, embodiments, and configurations for the purpose of streamlining the disclosure. The features of the aspects, embodiments, and configurations of the disclosure may be combined in alternate aspects, embodiments, and configurations other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed aspects, embodiments, and configurations. Thus, the following claims are hereby incorporated into this Detailed Description, with each claim standing on its own as a separate preferred embodiment of the disclosure.

Moreover, though the description of the disclosure has included description of one or more aspects, embodiments, or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. A method, comprising:
generating from a mercury-containing feed material a mercury-containing gas stream comprising vapor-phase elemental mercury and a vapor-phase halogen;
passing the mercury-containing gas stream through a scrubber to remove, from the mercury-containing gas stream, at least a portion of the vapor-phase halogen and/or a halogen-containing derivative thereof and form a halogen-containing scrubbing medium and a treated gas stream; and
removing a halogen from the halogen-containing scrubbing medium to form a treated scrubbing medium for recycle to the scrubber and a removed halogen and/or halogen-containing material comprising the removed halogen.

2. The method of claim 1, wherein the halogen in the removed halogen and/or halogen-containing material is one or more of bromine and iodine and wherein the scrubber is a wet or dry scrubber.

3. The method of claim 1, wherein the scrubber removes at least most of the vapor-phase halogen from the mercury-containing gas stream and wherein the scrubber removes at least most of an acid gas from the mercury-containing gas stream.

4. The method of claim 1, wherein at least most of the halogen in the halogen-containing scrubbing medium is removed as the removed halogen and/or halogen-containing material.

5. The method of claim 1, wherein the scrubber is a wet scrubber and is capable of removing one or more of HCl, HBr, and HF from the mercury-containing gas stream.

6. The method of claim 1, wherein the halogen is removed from the halogen-containing scrubbing medium by one or more of membrane separation, precipitation, adsorption, and/or absorption.

7. The method of claim 6, wherein the halogen-containing scrubbing medium is contacted with an oxidant to assist halogen removal.

8. The method of claim 1, wherein the scrubber is a wet scrubber and wherein the halogen is removed from the halogen-containing scrubbing medium by one or more of an ion exchange resin, solvent extraction, adsorption, absorption, precipitation, and membrane filtration.

9. The method of claim 1, wherein the halogen can oxidize elemental mercury in the mercury-containing gas stream and further comprising:
   recycling the removed halogen and/or halogen-containing material to the generating, whereby the vapor-phase halogen is derived from the removed halogen and/or halogen-containing material.

10. The method of claim 9, further comprising regenerating the removed halogen and/or halogen-containing material prior to recycle.

11. The method of claim 1, wherein a concentration of the vapor-phase halogen in the treated gas stream is no more than about 25 ppm.

12. The method of claim 1, wherein the vapor-phase halogen is iodide.

13. The method of claim 1, wherein the vapor-phase halogen is bromide.

14. The method of claim 1, wherein the mercury-containing feed material is coal, wherein the mercury-containing gas stream is formed by combusting coal and wherein the vapor-phase halogen is formed from a native halogen-content of the coal.

15. The method of claim 1, wherein the mercury-containing feed material is coal, wherein the mercury-containing gas stream is formed by combusting coal, and wherein the vapor-phase halogen is formed from a halogen-containing additive combusted with the coal.

16. The method of claim 1, wherein the mercury-containing feed material is coal, wherein the mercury-containing gas stream is formed by combusting coal, and wherein the vapor-phase halogen is introduced into the mercury-containing gas stream downstream of a coal combustion zone.

* * * * *